Sept. 16, 1930.   H. M. FRIENDLY   1,776,021
TELEPHONE SYSTEM
Original Filed Jan. 30, 1922    12 Sheets-Sheet 1

Sept. 16, 1930.  H. M. FRIENDLY  1,776,021
TELEPHONE SYSTEM
Original Filed Jan. 30, 1922   12 Sheets-Sheet 4

Inventor
Herbert M. Friendly
Gabel & Mueller
Attys

Sept. 16, 1930.   H. M. FRIENDLY   1,776,021
TELEPHONE SYSTEM
Original Filed Jan. 30, 1922   12 Sheets-Sheet 5

Inventor
Herbert M. Friendly
Gabel & Mueller
Attys

Sept. 16, 1930.   H. M. FRIENDLY   1,776,021
TELEPHONE SYSTEM
Original Filed Jan. 30, 1922   12 Sheets-Sheet 8

Inventor
Herbert M. Friendly
Gabel & Mueller
Attys

Sept. 16, 1930. H. M. FRIENDLY 1,776,021
TELEPHONE SYSTEM
Original Filed Jan. 30, 1922   12 Sheets-Sheet 9
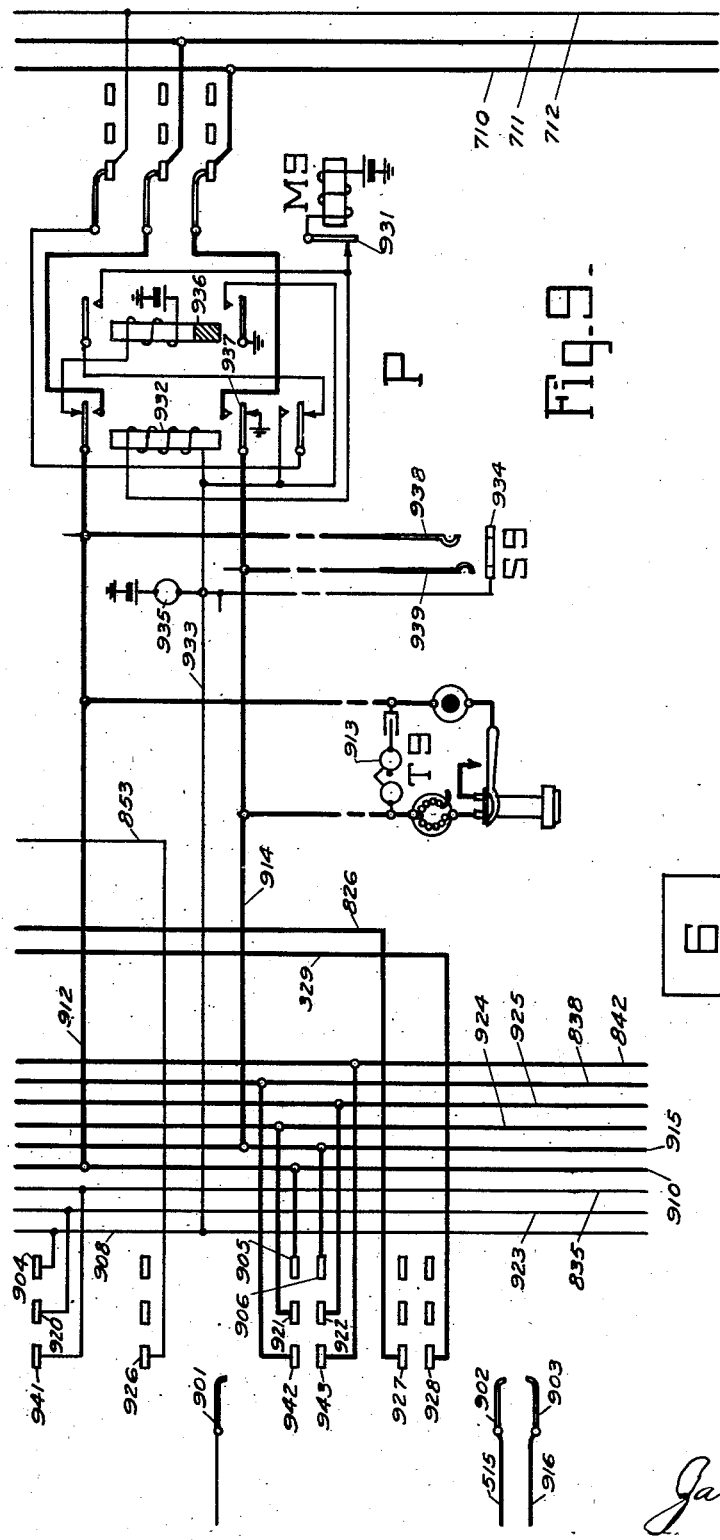
Inventor
Herbert M. Friendly
Gabel + Mueller
Attys Sept. 16, 1930. H. M. FRIENDLY 1,776,021
TELEPHONE SYSTEM
Original Filed Jan. 30, 1922 12 Sheets-Sheet 10
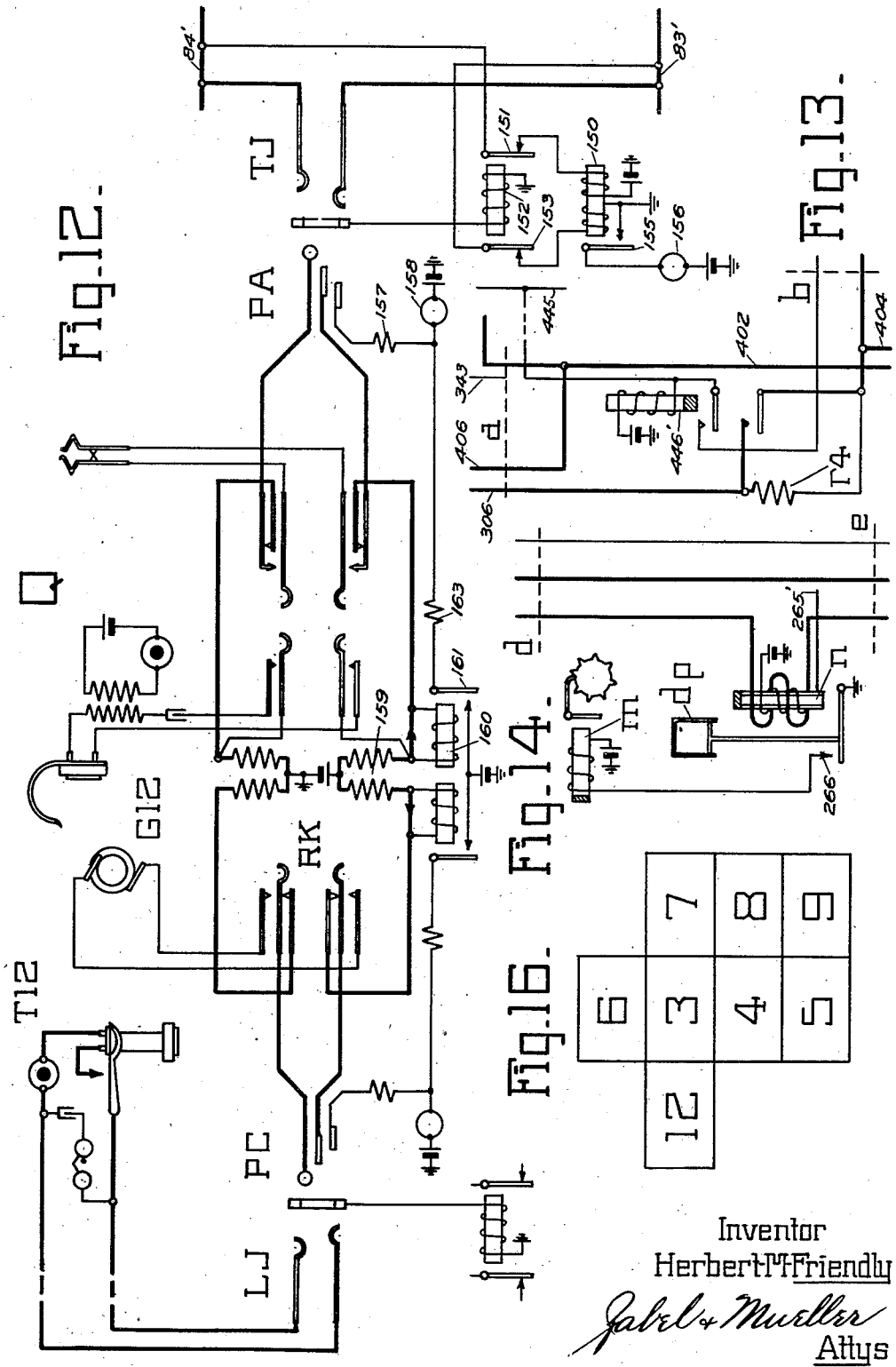
Inventor
Herbert M Friendly
Gabel & Mueller
Attys

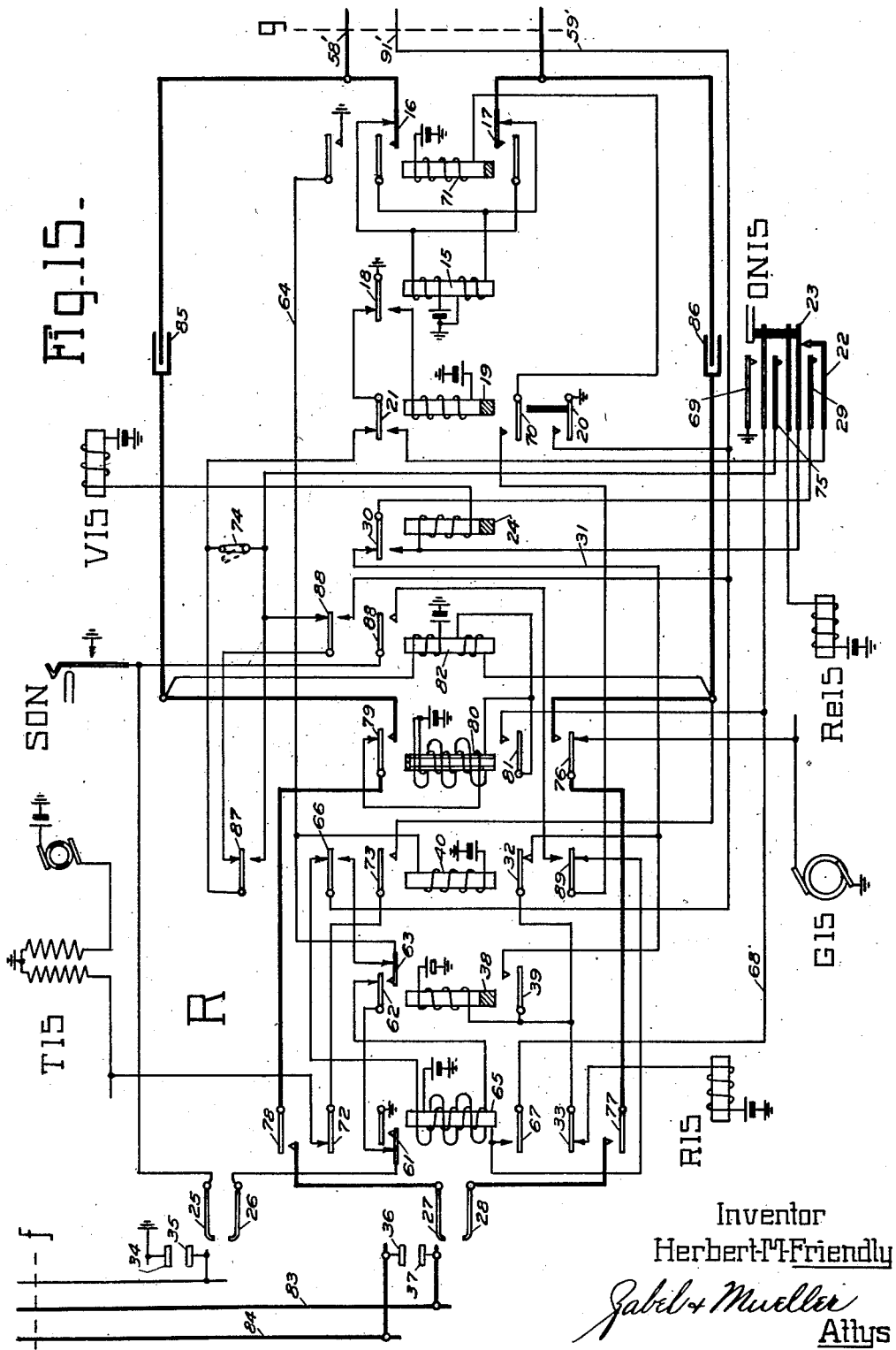

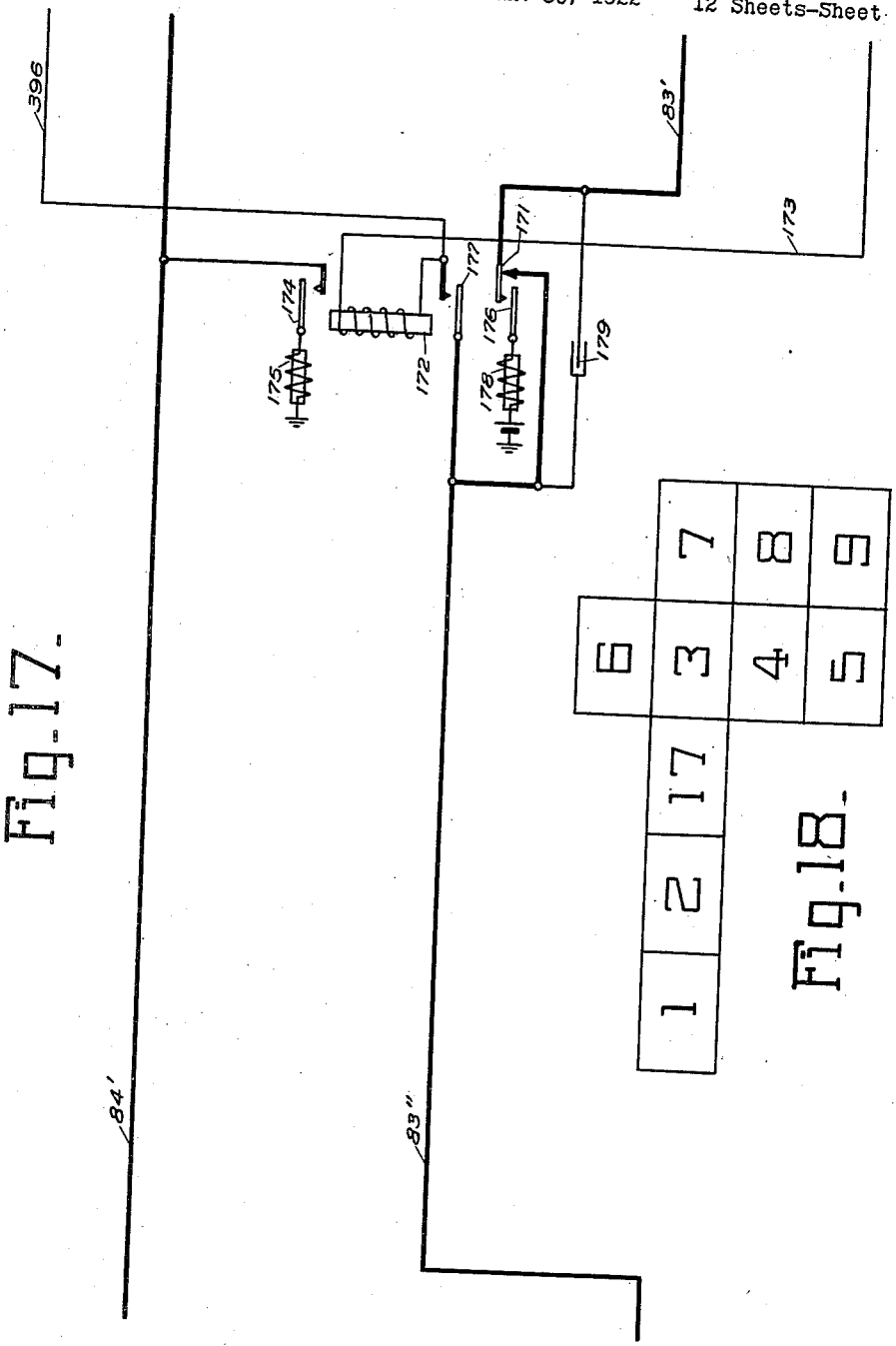

Patented Sept. 16, 1930

1,776,021

UNITED STATES PATENT OFFICE

HERBERT M. FRIENDLY, OF CHICAGO, ILLINOIS

TELEPHONE SYSTEM

Application filed January 30, 1922, Serial No. 532,797. Renewed April 4, 1927.

The present invention relates in general to automatic telephone systems, and is particularly adapted to a system that includes a main exchange having a plurality of branch offices tributary to it.

More specifically, the invention relates to an improved method and apparatus for permitting connections to be transferred or passed successively from station to station in a connection primarily established from a calling telephone to a first called telephone, the calling telephone being tributary to the said main exchange and the called telephone being tributary to a said branch exchange; the latter known in the art as a private automatic exchange, located on the premises of a subscriber having a plurality of sub-stations related for automatic intercommunication and for in-coming and out-going service with the main exchange over trunk lines.

Other systems have been invented which contemplate certain functions of this nature, however, the present invention contemplates novel functions, together with improvements in the structure of such a system consistent with carrying out and affording the novel functions.

A salient object of the present invention, as is also my pending application Serial No. 509,263, filed October 21st, 1921, is to not only enable calls originating in the main exchange to be completed to the private automatic exchange, and then transferred from sub-station to sub-station, but to also allow calls originating within the private branch exchange to be completed over a trunk line to the main exchange and thence to a sub-station therein, and thereafter transfer the connection at the calling end. For example, an attendant or other party at a sub-station within the private automatic exchange, will automatically establish a connection to a desired sub-station in the main exchange and thereafter pass or transfer the calling connection to a successive sub-station in the private automatic exchange, the operative details so far as the users are concerned are as if the call had been extended to the calling sub-station in the private automatic exchange in lieu of the call having been extended therefrom.

From the foregoing general statements it will appear that the present invention contemplates that out-going and in-coming calls will be resolved into the same service relation, so that supervision, operation and service is the same regardless of whether a call is out-going or in-coming. Moreover, the present disclosure (and also the referred-to disclosure), show means wherein the same trunk terminating equipments at the private automatic exchange is brought into requisition in passing connections, regardless of which end of the trunk is the originating end.

In general, the novel operation of the present invention is as follows: On calls originating in the main exchange the first available trunk to the private automatic exchange is attained by operating an automatic calling device whereby the call is directively extended from the calling sub-station through the selectors to a connector having access to the private automatic exchange trunks, in a generally well known way, the connector shown, by way of example, being the same as shown in my said co-pending application. Upon the first disengaged trunk being seized, a busy signal device apprises the attendant at the private automatic exchange that the trunk is in a seized condition. Also, the trunk terminating equipment at the private automatic exchange end is caused to automatically function and thereby extend the trunked connection to the attendant's equipment and cause a calling signal device thereat to display, to apprise the attendant that attention on the corresponding trunk is desired, and that the call is an original one from the main exchange. The attendant may then respond by manipulating a listening key. If it is desired to extend the call to some local sub-station in the private automatic exchange, the attendant has two means available for so extending it, as will appear presently.

In the exampled instance, the terminating equipment at the private automatic exchange end of the trunk consists of two companion, interlinked switching elements, generally similar to the main and auxiliary switching elements shown in Figs. 4 and 5 of the said co-pending application. The main element primarily automatically functions as a group-selecting connector on its normal level consequent to the seizure of the trunk at the main exchange end. However, upon the releasing of the wipers to normal, without releasing its leading-in trunk at the main exchange end, the said main element is thereafter capacitated to be operated vertically and then horizontally directively. This functioning, however, will depend upon whether the said releasing was accomplished by a second local sub-station to which the call has been passed, or whether the releasing was due to operative manipulations of the attendant, as will appear presently.

In this connection it is to be noted that the present invention contemplates that connectors which also serve as out-going trunking selectors are provided for local switching between the stations of the private automatic exchange. Also, that springjacks are multipled to the respective local lines and appear before the attendant as a single springjack, or as a plurality before a plurality of attendants. Thus, it is contemplated that the respective local sub-stations of the private automatic exchange be reachable through the trunk terminating main and auxiliary elements thereat; the local connectors thereat; a switching plug permanently associated with the trunk leading to the said main and auxiliary elements, or through a plug of an ordinary switching cord pair, not shown in the drawings.

It will now be assumed that a trunk has been seized at the main exchange end and that the main element at the private automatic exchange end of the trunk automatically extended the call to the attendant's equipment and caused a busy signal device and a calling signal device to display. The attendant, after responding, ascertains what local sub-station is wanted. Assuming that it is desired to pass the call through the agency of the auxiliary trunk terminating element. The attendant will manipulate a key, and thereby introduce a calling device into the responding circuit, and thereafter manipulate the said calling device operative to the said auxiliary element whereby the line extending to the desired sub-station is seized (if not busy) and signaled upon. The attendant may restore the auxiliary element at any time before a response is obtained therethrough, directively, or in case the desired line is found busy to efface the passed or extended connection and, if desired, pass the call to another sub-station by any of the recited means for so doing. The attendant may retain connection until after a response is obtained, and in fact remain in conference relation with the calling and the last called party, unless directively released by the last called party or by voluntarily restoring the listening key of the attendant's equipment. If the attendant disconnects from the connection after passing the call, before a response is obtained, a supervisory signal device is caused to display observable to the attendant which will be automatically effaced consequent to the last called party responding, and the main element will be coincidently restored, in readiness for its extending a call directed by the said last called party through the agency of the calling device of the latter's sub-station set. The main element will function vertically and then horizontally in a manner generally similar to that of the auxiliary element referred to, and not horizontally primarily, as when primarily seized. If no response is obtained, as indicated by the continued display of the signal device at the attendant's station, the attendant can reconnect with the trunk and state the facts to the calling party, and then release the auxiliary element and cause the call to be repassed to some other sub-station.

In lieu of passing the call through the agency of the auxiliary element, or re-passing it if no response is obtained, the attendant may simply insert a switching plug individual to the trunk (or connectable to it by means of a manually controlled key or a finder switch) into the springjack of the desired line, whereupon the shaft of the main element will be released and started automatically in group selection on its normal level wherein it will seize bank contacts corresponding to the inserted plug. The line will be rung upon from the main element and the main element will otherwise function upon response as if the call had been passed through the main element, controlled from a sub-station through the auxiliary element: In this connection it is to be borne in mind that had the call been passed through the auxiliary element as set forth and no response obtained, the operation on the part of the attendant in re-passing, through the agency of the connecting plug, would be the same as if so passed forthwith after the first response. However, in this instance, both the main and auxiliary elements are in a connected condition. The inserting of the said connecting plug will cause both elements to restore and the main element only to automatically function as described to complete the connection from the calling party in the main exchange through the connecting plug to the wanted sub-station. Upon the party called through the connecting plug replacing the receiver the main element will be restored and the line will become available for normal in-coming or out-going service, though the connecting plug has not been withdrawn.

A supervisory signal device is provided which will operate consequent to the connecting plug being inserted into a springjack of a local sub-station. This signal will be effaced consequent to a response being obtained, and a second signal device will be prepared to operate consequent to the called party replacing the receiver. The attendant thus has positive information as to whether a response has been obtained, regardless of whether the responding party has replaced the receiver when the signal devices are observed.

In case a called party in the private automatic exchange wishes to refer a calling party in the main exchange to the attendant, upon calling the proper local number by way of passing the connection through the element companion to the one connected with the passing line, the attendant will be signaled by means of a signal device specific to the trunk concerned and to the local extension also, so that the attendant is not only apprised of a call, but that the call has been passed from within the private automatic exchange, and that it is not a primary one from the main exchange. The call can be further passed by the attendant as if the call had been a primary one from the main exchange.

Calls originating at the private automatic exchange destined to a sub-station in the main exchange are effected through the agency of a local connector operating as a selector on its "0" level. Upon the response of the called party in the main exchange wherein the direction of current traversing the trunk is reversed, the main element at the private automatic exchange end of the trunk which, upon the trunk being seized by the local connector selectively operated on its normal level, now seizes the extension from the local connector and disconnects the same from the trunk leading from the private automatic exchange at the same time. It also causes the said trunk to be continued to the main and auxiliary elements in the private automatic exchange, so that in lieu of the primary connection from the "0" level of the local connector extending directly to the main exchange over the trunk, the trunk is now reached through the "0" level of the local connector and the normal level of the main element, and through the said main element to the trunk. Upon both the main and auxiliary elements being restored, the trunk will be opened sufficiently long to release the interlinked switches in the main office. If the called party in the main exchange replaces the receiver first, the main or auxiliary element, or both of them, will be restored, so that the operation so far as users are concerned is essentially as if the call had been made to the private automatic exchange from the main exchange. The local sub-stations and the attendant in the private automatic exchange are enabled to pass calls after gaining the response of the called party in the main exchange, as if the call had originated within the main exchange and had been extended over the trunk into the private automatic exchange.

From the last foregoing, it will appear that the attendant may, at the instance of a party at a sub-station in the private automatic exchange, call a sub-station in the main exchange, and thereafter pass the connection to the sub-station of the instructing party (or other sub-station), from whence it may be further passed, as if the call had been an in-coming call to the private automatic exchange. Auxiliary control means is also provided enabling the attendant to set up a condition in the circuits by the directive operation of a key, for example, whereby the call may be thereafter passed by the attendant to the sub-station of the instructing party before a response has been obtained from the called sub-station in the main exchange, so the desired connection will be complete before the wanted party in the main exchange responds. The operation wherein so-called reverse passing can be carried out, is under the control of all sub-stations in the private automatic exchange, however, it is not contemplated in the first generally described exampled disclosure herein to permit such passing until after a response has been obtained in the main exchange. That is to say, in the description of the apparatus arrangement to be taken up first, wherein passing of calls may be accomplished before a response at the called sub-station in the main exchange is obtained, is reserved to the attendant's station only, though, of course, it may be further applied, if desired. However, a preferred adaptation, as will appear presently, discloses how the said passing can take place forthwith by any calling sub-station, upon a called line being seized.

The latter said preferred adaptation contemplates a novel type of connector and proper adaptation to the meter device, if one is employed in the trunk for metering calls to the main exchange, so that a momentary reversal (of course, also involving its restoration of direction) of current will take place over the private automatic exchange trunk of sufficient duration to operate the adapting relay at the private automatic exchange, wherein the circuits are capacitated to permit passing forthwith, upon the called line in the main exchange being seized. Where a meter device is associated with the private automatic exchange trunk, the said meter device is made slow-actuating, so that the momentary reversal of current will not durate long enough to operatively affect it. However, if the line called in the main exchange is one to which a charge is entailed, upon the party thereon responding a second reversal, which will endure dependent upon the receiver thereon being kept off the switch-hook, will cause the meter device on the said trunk to register the toll charge. If the called line is not one to which a toll charge is contemplated, being a service line of the operating concern, perhaps, the said brief reversal will occur incidental to the called line being seized, but no subsequent reversal will occur incidental to the response on the called line. In commercial systems, the "free" called lines may be only in certain levels reached by the connector concerned, and an off-normal spring set arranged to prevent the reversal occurring incidental to the response which would be effective to the meter device on the calling private automatic exchange trunk. Again, certain groups may be set apart reached by specific connectors, which are only capacitated to effectuate the said brief reversal, and not the subsequent reversal incidental to the response.

The foregoing specifically mentioned novel functions of the present invention and other novel features thereof will be more fully discussed hereinafter.

Referring to the drawings:—

Fig. 9 shows a portion of the auxiliary element of Fig. 5 and a local sub-station.

Figure 1:
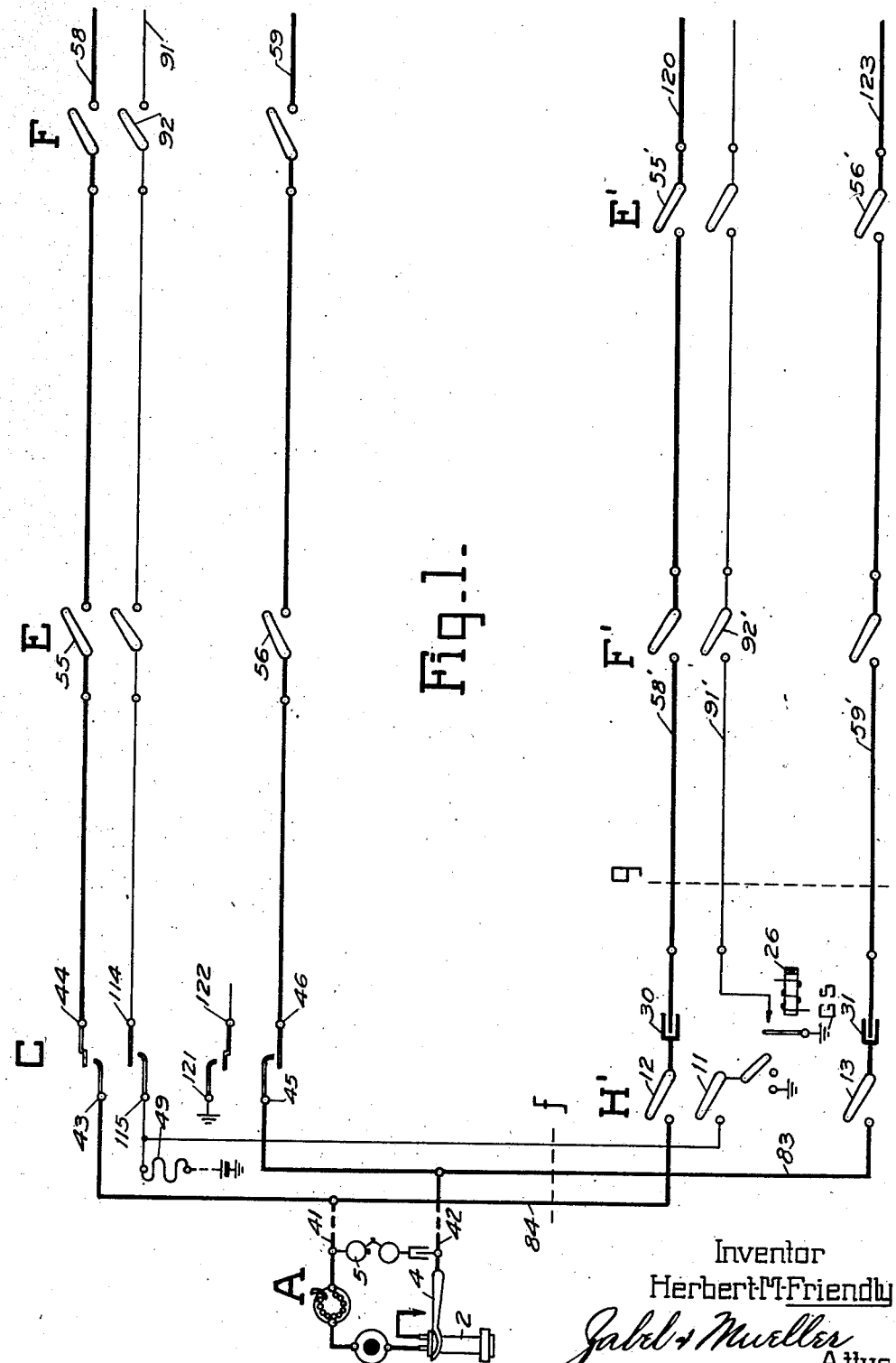
Fig. 1 is a subscriber's station leading into a main exchange, together with a lineswitch and a first and a second selector adapted to extend a connection in the direction of a called line. A connector adapted to complete a connection to the line leading to the said subscriber's station is shown, together with preceding selectors adapted to be interlinked therewith in establishing the connection.

Fig. 10 shows the manner in which the accompanying sheets of drawings are assembled to display the complete system contemplated in a form of the invention to be first described. The lines extending towards the margins and registering with lines on other sheets when placed in the indicated relation are to be assumed as continuations of the same line, though not designated by reference characters. The latter have been omitted where possible without obscuring the clearness of the complete disclosure, with due reference to the prior art and its relationship to the devices of the present invention.

Fig. 11 shows the relative plan location in which the connecting plug, keys and lamp signal devices may be placed in a commercial assembly, and refers to equipments of a single trunk extending between the main exchange and the private automatic exchange.

Figure 2:
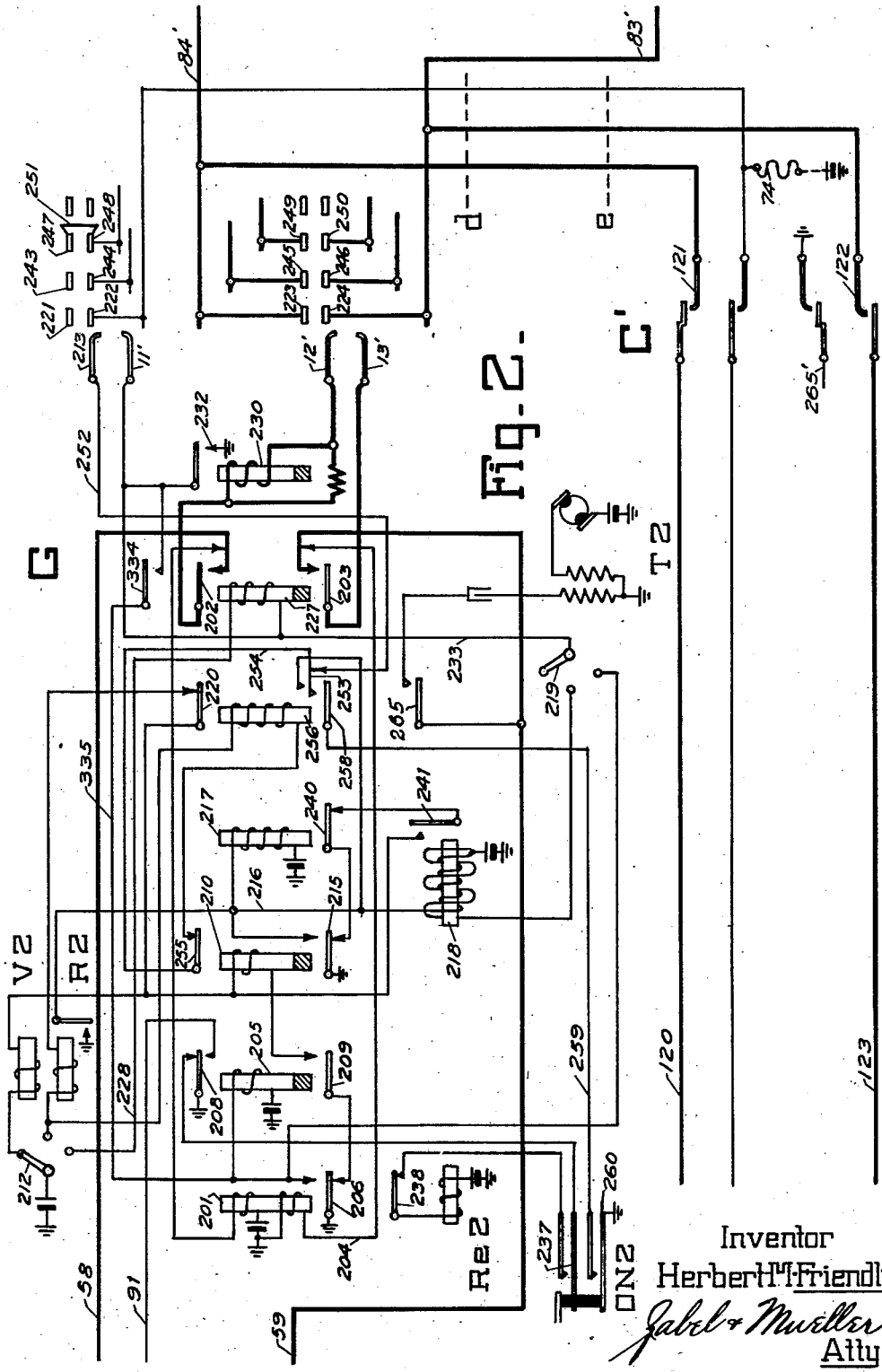
Fig. 2 is a group-selecting connector in the main exchange for seizing a trunk leading to the private automatic exchange. It also shows a lineswitch for extending incoming calls from the trunk.
Figure 3:
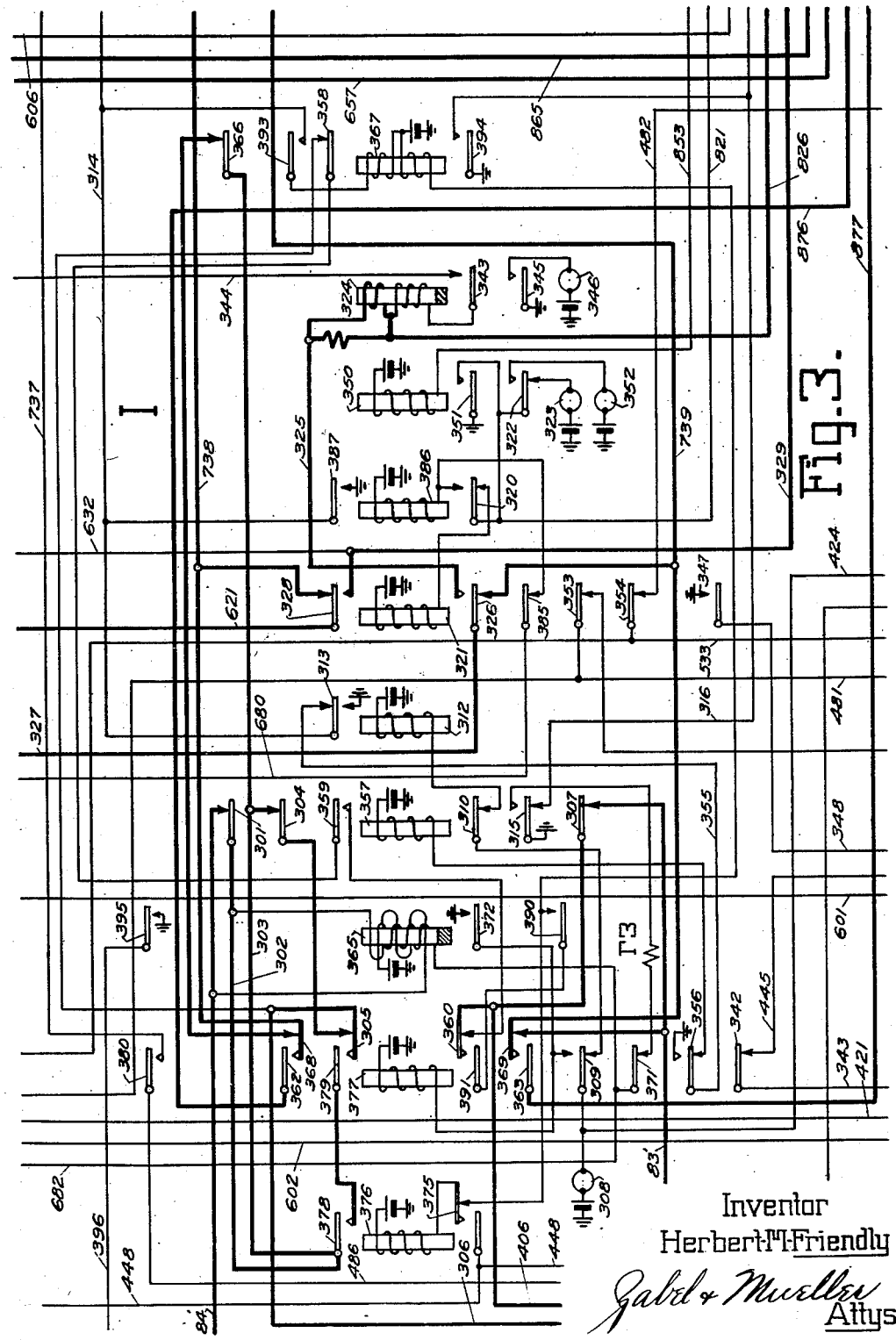
Fig. 3 shows auxiliary apparatus at the private automatic exchange end of a trunk connecting the main exchange and the private automatic exchange.

Fig. 12, which attaches to the left of Fig. 3, alternatively with Fig. 2, shows well known manual exchange equipment, such as has been widely used in terminating private branch exchange trunks in main offices of manual systems, together with a well known switching cord pair Q adapted to connect with the trunk through a springjack and extend the connection to or from the springjack of an accessible line.

Fig. 13 shows an alternative relay for excluding a resistance from the battery side of the trunk, in lieu of reversing the trunk. In the event the main exchange is manual, in lieu of automatic, the said Fig. 11 will be introduced in the main element J of Fig. 4 where indicated by the section lines a and b.

Fig. 14 shows meter equipment, consisting of a control relay and associated meter device, both the said relay and meter device having a retarded actuating characteristic so the said meter device will not be responsive to brief applications of operative current. Fig. 14 is applied into Fig. 2, where indicated by section lines d and e.

Fig. 15 is a novel connector R of the present invention which causes the current projected back from the leading-in terminals thereof to be momentarily reversed in direction incidental to the said connector seizing a called line, and which is adapted to also reverse the current of the said path dependent upon the responded condition of the called line and the class of the said called line. Fig. 15 is applied to Fig. 1 where indicated by the section lines f and g.

Fig. 16 shows the manner in which the accompanying sheets of drawings are assembled to display the complete system contemplated in a form of the invention wherein the main exchange is manual.

Fig. 17 shows the manner of introducing a holding relay in the private branch exchange trunk.

Fig. 18 shows the manner in which the accompanying sheets of drawings are assembled to display the complete system wherein a meter device Fig. 14, and the connector R in Fig. 15 is employed, and wherein there are two classes of called lines, one of which involves toll charge and the other of which does not.

In embodying the present invention in a system as contemplated, apparatus elements are employed which are well known in the art. For example, the subscriber's sub-station (and others not shown) in the main exchange may be of the same class, and in fact of the exact type as the sub-station designated A in U. S. Patent No. 13,901 re-issued to Frank Newforth, April 13th, 1915. To extend a call in the direction of the called line, lineswitch C will function upon initiating the call and automatically extend the call to first selector E. Upon operating the calling device at the calling station in accordance with the first digit (as will appear presently), the first selector E will operate responsive thereto and seize a trunk leading to second selector F. And likewise, upon operating the calling device in accordance with the second digit, selector F will operate responsive thereto and seize a trunk leading to connector G in Fig. 2. In order not to unduly involve the descriptions, the lineswitch C and the selectors E and F have been indicated, rather than detailed, as well known forms of these elements may be employed. In fact, G, E and F may be of the exact types designated C, E and F respectively in the said cited patent to Newforth.

Referring to Fig. 2, it will be clear, presently, that the connector G is a group-selecting connector controlled vertically and rotarily by directive impulses, and which disassociates its operative circuits from the normal bridge relation, consequent to the connector seizing. The connector G has access by first choice to the trunk of a group leading to a private branch exchange terminated by the equipments shown in Figs. 3, 4, 5 and 6. The said trunk is designed for two-way service in the present exampled system, though it will be manifest that trunks employing the present invention may be reserved for one-way service only. The said trunk has a lineswitch C' permanently associated with it at the main exchange end. The lineswitch C' will operate and automatically extend the trunked connection to the first selector E' in Fig. 1 upon a conductive path being closed between the limbs of the trunk, or upon the battery side of the trunk becoming grounded or applied to battery potential of the opposite polarity.

Upon the connection being extended from the private automatic exchange over the trunk to first selector E', operating a calling device whereby the series relation of the trunk is interrupted one time in conformance with digit "1", (for example), the selector E' will operate responsive thereto and seize a trunk leading to second selector F', thus extending the connection to said F'. Again operating the calling device, but now in accordance with digit "2", the second selector F' will function by way of seizing a trunk leading to connector H'. Operating the calling device in accordance with the final two digits "1—1" will cause the connector to seize and signal upon the line leading to said A. While other forms of selectors, connectors and lineswitches can be substituted for the said elements indicated only, in order to simplify the disclosure, the lineswitch C', selector E', selector F' and connector H' may for the present be assumed of the exact types as C, E, F and H, respectively, in the said cited patent to Newforth.

Attention is directed to the fact that connector H in the said cited patent to Newforth causes the current projected over its leading-in line conductors to be reversed in direction consequent to a response being obtained from the called line. That is, when the called party responds, the current traversing the calling line is reversed in direction consequent thereto. This reversal of current may be used for supervisory, metering, and other uses, but it will appear presently, this condition is herein employed for the novel purpose of causing circuit changes affecting the relationship of the calling line to the trunk on calls out-going from the private automatic exchange to the main exchange. The restoration of the said connector H' is controlled by the party calling therethrough.

In order to more conveniently correlate the elements in Figs. 1 and 2 to the corresponding elements in the said cited patent to Newforth, conductors and parts in Fig. 1 and 2 corresponding to conductors and parts in the said cited patent to Newforth will be similarly designated. In order to avoid confusion, designations with reference to E' and F' have a prime added.

Figs. 1 and 2 thus clearly disclose a main exchange system wherein a call may be initiated from a sub-station therein and extended therefrom to a first selector automatically through the agency of a lineswitch, and then directively extended through a second selector and through a group-selecting connector to the first available trunk of a group extending to a private automatic exchange system on the premises of a subscriber. Figs. 1 and 2 also clearly disclose a means of extending a connection initiated on the said trunk and extended therefrom to a first selector automatically through the agency of a lineswitch in the main exchange and then directively extended through a second selector to a connector and likewise, through the said connector to a line leading to a sub-station. In fact, Figs. 1 and 2, with the exception of details and functions incorporated in connector G thereof (also disclosed in my said pending application) sets forth a well known organization of well known equipments constituting a main exchange system. The present invention is, however, particularly directed to a novel organization forming a private automatic exchange which is cooperative with the said well known organization constituting the main exchange, correlated through the agency of the connector G in the main exchange for calls destined to the private automatic exchange. And, as will also appear, is directed to the novel organization wherein the connector R is concerned in calls destined to called lines in the main exchange.

Figure 4:
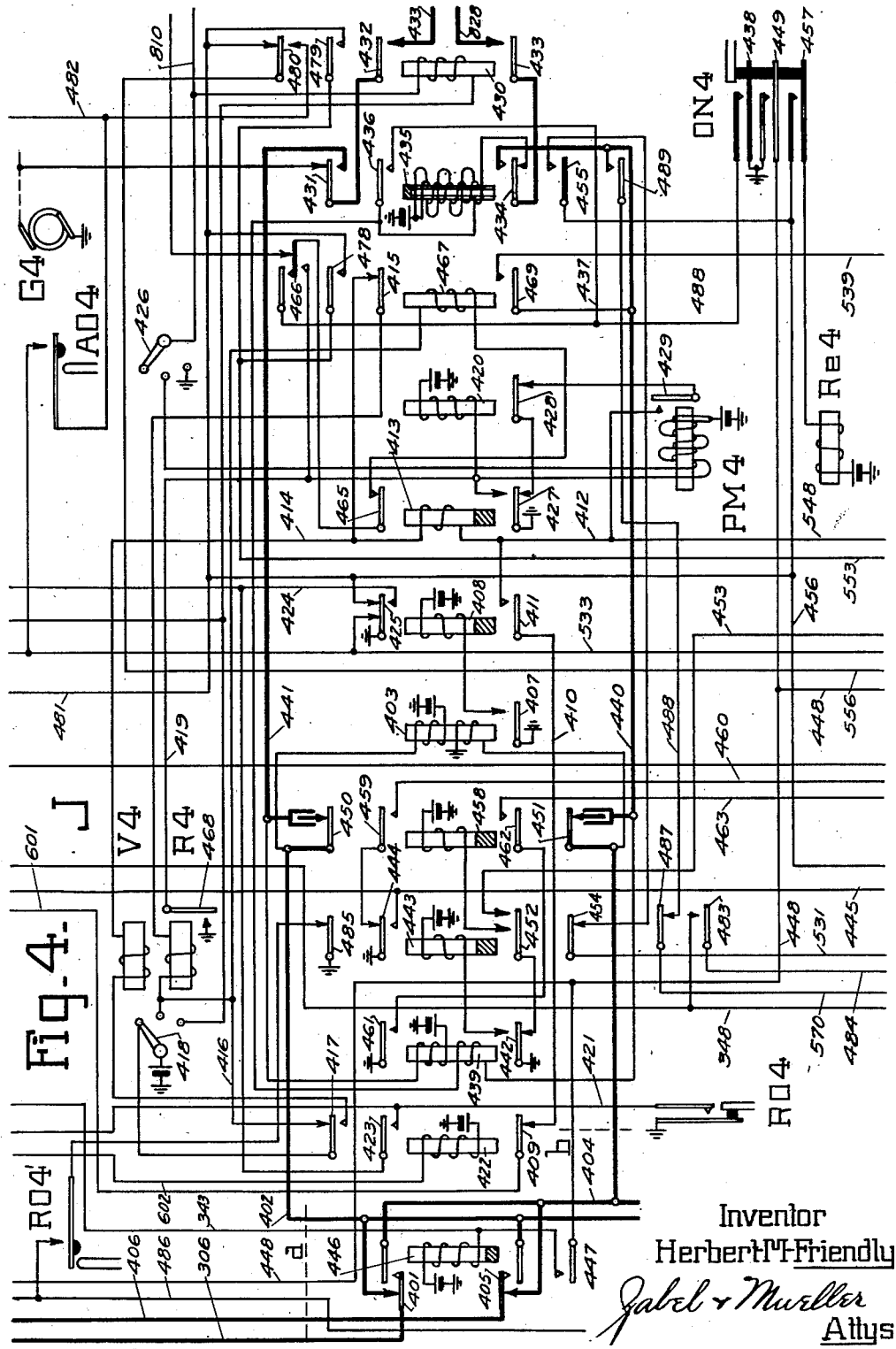
Fig. 4 is a main element J of a pair of trunk terminating switch elements of the present invention.
Figure 5:
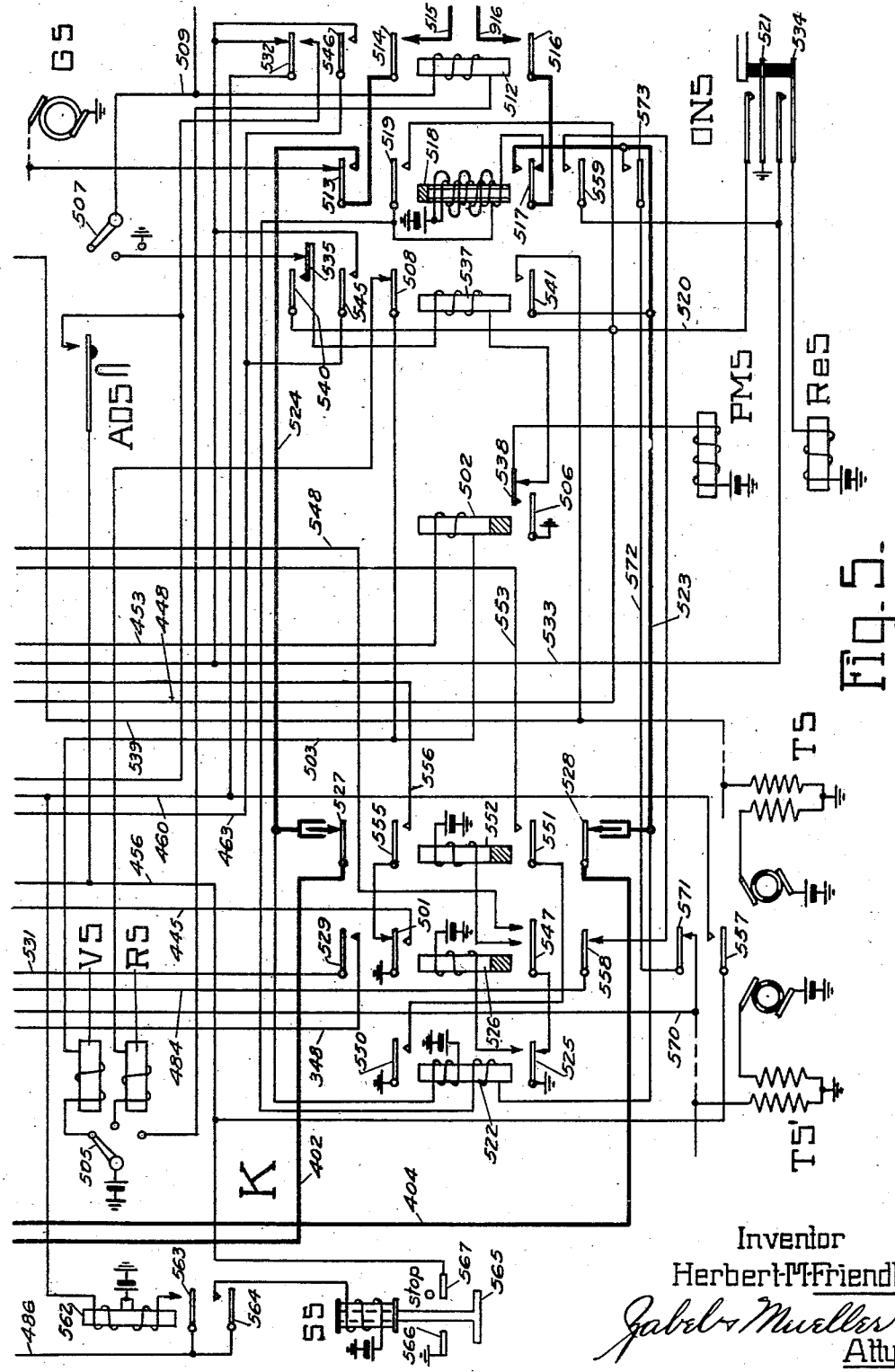
Fig. 5 is an auxiliary element K of the said main element.

Referring to Figs. 4 and 5, the elements J and K are of the general class shown in Figs. 9 and 10 of British patent to Friendly (the present applicant) No. 139,000, the circuits of which are modified in accordance with the present invention.

Figure 7:
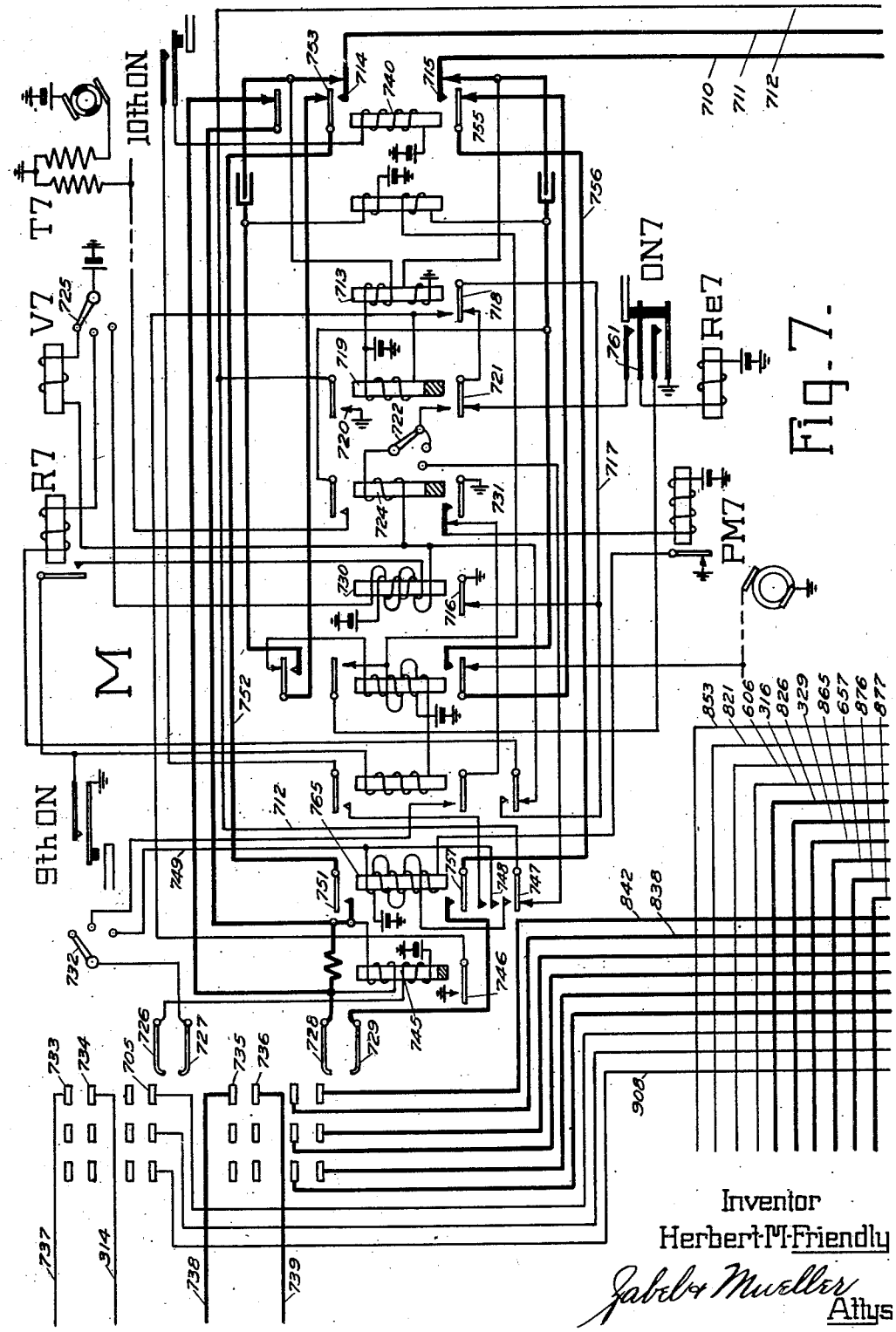
Fig. 7 is a connector M which will function as a selector on certain levels, and has other functions well known.

Referring to Fig. 7, the connector M belongs to the general class as set forth in U. S. patent to Deakin, No. 1,164,479, granted December 14th, 1915.

Figure 8:
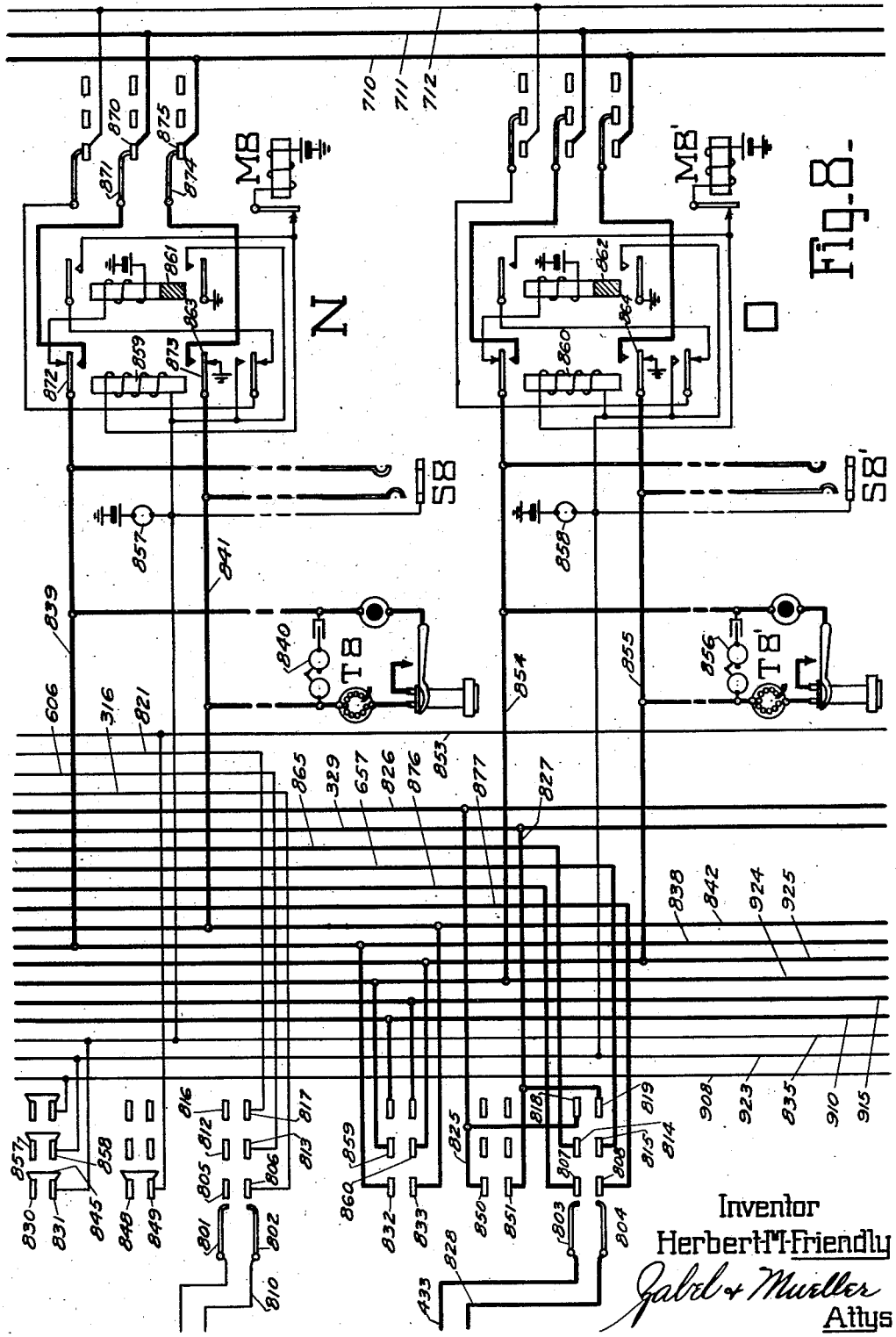
Fig. 8 shows a portion of the main element of Fig. 4 and two local sub-stations.

Referring to Figs. 8 and 9, the line switches N, O and P are of the general class as set forth in U. S. patent to Lamb, No. 1,193,160, granted August 1st, 1916, and are well known in the art. The telephones or sub-stations $T^8$, $T^{8'}$ and $T^9$ are of the same class as A in Fig. 1.

To simplify the drawings and descriptions, the battery (which has its negative pole grounded), and ground are shown as independent sources throughout, wherever applied, but it is to be understood that the system is of the common battery type, and therefore, one only or a lesser number of sources may be employed than indicated. In the descriptions, when a circuit is traced to a winding, the opposite terminal of which is shown applied to grounded battery or to ground, the described circuit is to be considered as traced to ground through the winding and battery, or direct to ground, as indicated.

In this connection, attention is directed to the connector H of the cited patent to Newforth, wherein line relay 16 has its battery winding normally connected to the conductor leading to condenser 30, and has its ground winding normally connected to the conductor leading to condenser 31. That is to say, conductor 58' and conductor 59' in Fig. 1 will normally have battery and ground connected to them through a relay winding, respectively. It will be borne in mind that the said cited patent fully discloses that the above referred to battery and ground windings are reciprocated with respect to the talking conductors leading into the connector, incidental to a response being obtained on the called line.

The operation of this improved system will now be described, in general, by tracing and discussing the functioning under different assumed operative conditions.

Assume a call from telephone A to the private automatic exchange, the telephone number of which is "1111". Upon the calling party initiating the call by removing the receiver 2 from the switch-hook 4, the lineswitch C will plunge-in and seize the first selector E. Upon sending the first digit "1", constituted of one open impulse, the selector E will respond by stepping its wipers into alignment with the first level of bank contacts thereof and automatically rotate-in thereat and seize the first disengaged trunk leading to second selector F. Upon sending the second digit "1", the selector F will respond by stepping its wipers into alignment with the first level of bank contacts thereof and automatically rotate-in thereat and seize the conductors 58, 91 and 59 leading to connector G. A circuit can be traced from the upper winding of line relay 201, make-before-break spring cooperative with armature 202, conductor 58, wiper 55, spring 44, spring 43, conductor 41, receiver 2, switch-hook 4, conductor 42, spring 45, spring 46, wiper 56, conductor 59, make-before-break spring cooperative with armature 203, conductor 204 to the lower winding of relay 201, relay 201 actuating. A circuit can now be traced from the winding of slow-releasing relay 205 to grounded armature 206, relay 205 actuating. Armature 208 applies its ground to conductor 91 and thus maintains lineswitch C and selectors E and F seized, in the well known manner.

Upon the calling party sending the third digit "1", relay 201 will deactuate and reactuate one time responsive thereto, armature 206 applying its ground to its resting contact, armature 209, series winding of slow-releasing relay 210, winding of the vertical magnet $V^2$, sideswitch wiper 212 to grounded battery, relay 210 actuating and the vertical magnet stepping the wipers 213, 11', 12' and 13' into alignment with the first level of bank contacts thereof.

At the time relay 210 actuated, armature 215 applied its ground to conductor 216, operatively energizing interrupter relay 217 and private magnet 218. Upon relay 210 deactuating, following the impulse to the vertical magnet, causing the private magnet 218 to retract, sideswitch wiper 212 and its companion sideswitch wiper 219 will be permitted to advance into their second position, the connector G being now in readiness to receive the fourth digit. Upon the calling party sending the fourth digit "1", relay 201 will again deactuate and reactuate one time responsive thereto, armature 206 applying its ground to its resting contact, armature 209, series winding of relay 210, armature 220, winding of the rotary magnet $R^2$, sideswitch wiper 212, to grounded battery, actuating the rotary magnet to step the wipers in one rotary position into engagement with bank contacts 221 to 224 (inclusive) respectively. Upon the relay 210 actuating, energized in series with the rotary magnet, the relay 217 and the private magnet 218 will be operatively energized in the manner as before set forth, and when the relay 210 deactuates following the said impulse to the rotary magnet, the private magnet will retract, permitting the sideswitch wipers 212 and 219 to advance into their third position. A circuit can now be traced from grounded armature 206, sideswitch wiper 219, winding of slow-releasing relay 227, conductor 228, sideswitch wiper 212 to grounded battery, relay 227 actuating. The circuit path traced from the calling telephone A to talking conductors 58 and 59 is now continued from conductor 58, armature 202, winding of slow-releasing shunted relay 230, wiper 12', bank contact 223, conductor 84', armature 301, conductor 302, conductor 303, armature 304, make-before-break spring 305, conductor 306, make-before-break spring 401, conductor 402 to upper winding of line relay 403 and from the lower winding of said relay, conductor 404, make-before-break spring 405, conductor 406, armature 307, conductor 83', bank contact 224, wiper 13', armature 203 to conductor 59, relay 403 actuating. Relay 230 will be operatively energized from the current derived through the windings of relay 403 and therefore, applies the ground on working contact 232 to conductor 233, and through armature 334, conductor 335, to the winding of relay 205, before it has deactuated consequent to relay 201 deactuating, resultant of armatures 202 and 203 on relay 227 attracting. Relay 205 being maintained actuated, maintains ground on conductor 91, however, the maintaining of ground on conductor 91 will depend upon the actuated condition of relay 230, which in turn, depends upon the continuity of the traced circuit including the winding of relay 403. That is to say, if the traced circuit including the windings of the relay 403 is opened, relay 230 will deactuate consistent with its slow-releasing characteristic, whereupon relay 205 will deactuate, removing the ground from conductor 91 and from the lower winding terminal of relay 227. Relay 227 will deactuate just after the relay 205, and the relays maintaining the lineswitch C and the selectors E and S will also deactuate, causing the said C, E and F to restore in the well known manner. A circuit can now be traced from armature 208, spring 237 of off-normal set ON² (which set operates on the first off-normal movement of the shaft), armature 238 to the winding of the release magnet Re², the release magnet operating to restore the wipers to normal.

Assuming that at the time the wipers 213, 11', 12' and 13' engaged bank contacts 221 to 224, respectively, bank contact 222 constituted ground potential, due to its corresponding trunk being busy by reason of the trunk having been previously seized by a switch having common access with G to the said trunk, it being clear that when a connector seizes and its conductor corresponding to 233 becomes grounded as described, the bank contact corresponding to 222 seized will constitute ground potential. The ground encountered by wiper 11' will be conducted over conductor 233, sideswitch wiper 219 to the outside winding of private magnet 218, maintaining the latter actuated, notwithstanding relay 210 has deactuated, as described. Upon the relay 210 deactuating, followed by its dependent relay 217, a circuit can be traced from grounded armature 215, armature 240, armature 241 on the private magnet, armature 220, winding of the rotary magnet R², sideswitch wiper 212 to grounded battery, the rotary magnet operating to drive the wipers 213, 211', 212' and 213' into engagement with bank contacts 243 to 246, respectively. At the time the rotary magnet operates, ground is applied to its armature and to conductor 216, causing relay 217 to actuate and interrupt the traced circuit energizing the rotary magnet, and also to maintain the private magnet attracted, energized by its inner winding. Upon the rotary magnet retracting and relay 217 deactuating, consequent thereto, the before traced circuit, including wiper 11'. will become closed to ground, provided bank contact 244 constitutes ground potential due to its corresponding trunk being busy and in that event, the said wiper set will be advanced into engagement with bank contacts 247 to 250, respectively, these being the bank contacts of the third trunk of a group of trunks extending to the private automatic exchange concerned. Assuming further that when the wipers have been advanced, as last stated, bank contact 248 constitutes ground potential, bank contact 247 will likewise constitute ground potential due to their being electrically tied together by tie conductor 251. At the time wiper 213 engages grounded bank contact 247, and before relay 217 has deactuated consequent to the last advancement of the wipers, a circuit can be traced from grounded bank contact 247, wiper 213, conductor 252, make-before-break spring 253, conductor 254, armature 255, winding of relay 256, sideswitch wiper 212 to grounded battery, relay 256 actuating and locking to ground from said spring 253, armature 258, conductor 259 to grounded off-normal spring 260. Relay 256 cannot unlock unless spring 260 is disengaged, which can only occur upon the shaft returning to normal, and therefore, the switch will not seize after relay 256 is actuated notwithstanding ground is removed from bank contact 247 by reason of the trunk becoming idle. From the foregoing, it is manifest that whenever wiper 213 encounters ground, that the group-selecting functions of the connector G ceases, and by reason of armature 265 being attracted, busy tone from tone source T² is applied to conductor 59 audible to the calling party.

From the foregoing description relating to connector G, it is manifest that the said connector does not project ringing or signaling current to the seized trunk, nor does it supply talking battery to the called and the calling line as is usual in connectors. It will also be manifest that the connector G introduces no bridged attachments and that the talking circuits thereof are clear upon the connector seizing. Further, that the said connector is dependent upon other switch elements for its restoration to normal, all of which are novel, so far as I am aware.

The illustration chosen to elucidate the present invention so far as the private automatic exchange is concerned, involves a single trunk line, although it is to be understood that in commercial installations there would usually be a plurality of trunks terminating in the private automatic exchange, each having equipments similar to the equipments on the trunk illustrated. So we are concerned chiefly with the trunk leading from the first set of bank contacts constituted of conductors 84' and 83'.

Going back to the condition of the circuits at the time relay 403 was described as actuated, a circuit can be traced from grounded armature 407 to the winding of slow-releasing relay 408, causing the latter to actuate. A circuit can now be traced from grounded armature 600, conductor 601, armature 409, conductor 410, armature 411, conductor 412, winding of slow-releasing relay 413, conductor 414, armature 415, winding of rotary magnet $R^4$, conductor 416, armature 417, sideswitch wiper 418 to grounded battery, the rotary magnet operating to advance wipers 801 to 804 one rotary step into engagement with bank contacts 805 to 808, respectively. Incidental to the first rotary off-normal movement, off-normal spring set $RO^4$ operates. Also, the armature on the rotary magnet applies the ground on its working contact to conductor 419, operatively energizing interrupter relay 420, and the private magnet $PM^4$ through its outer winding.

At the time the rotary off-normal springs $RO^4$ operate, ground is applied through them, conductor 421, armature 601, conductor 602 to the winding of relay 422, causing it to actuate. A locking circuit for relay 422 can then be traced from conductor 421, armature 423, conductor 424 to grounded armature 425. In view of the fact that the winding of relay 422 is locked through armature 601', relay 422 will become unlocked if relay 640 actuates. The object of relay 640 will appear presently.

In this connection, at the time conductor 424 becomes grounded at armature 425, busy lamp 308 will glow to indicate to the attendant at the private automatic exchange that the corresponding trunk is busy, so that an attempt will not be made to connect with the trunk manually, and for other reasons. Also, the ground will be extended through armature 309, armature 310 to the winding of relay 312, the latter relay operating, and its armature 313 will apply ground received from its working contact to conductor 314 and to a private bank contact of connector M, to guard the trunk against intrusion by the said connector, and other connectors of its group. At the time the rotary magnet $R^4$ retracts, deenergizing relay 420 and the private magnet $PM^4$, sideswitch wiper 418 and its companion wiper 426, are permitted to advance into their second position. In this connection it will be noted that the resting grounded armature 315 applies its ground to conductor 316 and to bank contact 806, engaged by wiper 802. Therefore, a circuit can be traced from the grounded bank contact 806, wiper 802, conductor 810, sideswitch wiper 426 to the inner winding of the private magnet $PM^4$, maintaining it energized, although the ground has been removed from conductor 419 incidental to the retraction of the armature of the rotary magnet $R^4$ when its energizing circuit was opened at armature 409. A circuit can now be traced from grounded armature 427, armature 428, armature 429, conductor 412, winding of relay 413, conductor 414, armature 415, winding of rotary magnet $R^5$, sideswitch wiper 418 to grounded battery, the rotary magnet operating to advance the wipers 801 to 804, a rotary step into engagement with bank contacts 812 to 815, respectively. It will be assumed that bank contact 813 constitutes ground potential received from armature 605 over conductor 606, and therefore, this ground will be communicated to wiper 802, conductor 810, sideswitch wiper 426 to the inner winding of private magnet $PM^4$, maintaining the said private magnet actuated, so that the before traced energizing circuit of the rotary magnet, including armature 429, will be reestablished to cause the rotary magnet, $R^4$ to again operate and advance the wipers 801 to 804 an additional rotary step into engagement with bank contacts 816 to 819, respectively. Bank contact 817, under this condition, will not constitute busy ground potential, because conductor 821 leading therefrom to armature 320 and to the winding of relay 321, and from the said conductor 821 to armature 322 and to the lamp 323, is individual to the main element J. Wiper 802, not finding ground potential, the inner winding of private magnet $PM^4$ will deenergize, permitting the sideswitch wipers 418 and 426 to advance into their third position, whereupon a circuit can be traced from ground, sideswitch wiper 426, conductor 810, wiper 802, bank contact 817, conductor 821 to the winding of relay 321 and to lamp 323 over the before traced path, the relay 321 actuating and the lamp 323 glowing. A circuit can also be traced from the grounded conductor 810, winding of relay 430, sideswitch 418 to grounded battery, relay 430 actuating to affect the seizure of main element J.

Upon the attendant observing the glowing of lamp 323, the call will be responded-to by manipulating listening key LK, whereupon, a circuit can be traced from grounded ringing generator G⁴, armature 431, armature 432, conductor 433, wiper 803, bank contact 818, conductor 825, conductor 826, upper shunted winding of slow-releasing relay 324, conductor 325, armature 326, conductor 327, make-before-break spring 608 of calling device key CK, conductor 610, spring 612 of listening key LK, operator's circuit conductor 613, conductor 614, through the operator's receiver of set T⁶, conductor 615, conductor 617, spring 618, conductor 619, make-before-break spring 620, conductor 621, armature 328, conductor 329, conductor 827, bank contact 819, wiper 804, conductor 828, armature 433, armature 434, inner winding of relay 435 to grounded battery, relays 324 and 435 actuating. When relay 435 actuates, it locks its outer winding by way of its armature 436, conductor 437 to grounded off-normal spring 438 of set ON⁴ (the set ON⁴ operating upon the first rotary or vertical off-normal movement of the shaft of the main element J), this occurring before armature 431 disengages. A circuit can now be traced from grounded spring 438, conductor 437, armature 436, lower winding of relay 439, conductor 440, armature 434 over the traced path including operator's set T⁶ to conductor 433, armature 432, armature 431, conductor 441, upper winding of relay 439 to grounded battery, maintaining relay 334 actuated and causing relay 439 to actuate and apply its grounded armature 442 to the winding of slow-releasing relay 443, the latter relay actuating. A circuit can now be traced from grounded armature 444, conductor 445, armature 342, conductor 343 to the winding of slow-releasing relay 446, the latter relay actuating. It will now appear that the circuit traced from spring 401 to the upper winding terminal of relay 403 now extends from said spring to the lower winding terminal of said relay, and that the circuit traced from spring 405 to the lower winding terminal of relay 403 now extends from said spring to the upper winding terminal of said relay. That is to say, the current derived from the windings of relay 403 traversing the trunk and the calling telephone A has been reversed in direction consequent to the actuation of relay 446. The reversing of the current has no operative object in the present exampled system, but may be employed in amplifications of it to effect supervision or to operate meter devices associated with the subscriber's line leading to telephone A, for example, as has been done heretofore in other systems. At the time relay 446 actuates, a locking circuit for it is closed by way of armature 447, conductor 448, off-normal spring 449 to its engaged grounded spring, the relay 446 being locked until conductor 448 becomes ungrounded. The latter will only occur when the shafts of the main element J and the auxiliary element K are at normal and that conductor 445 is ungrounded. The latter can only occur under the stated calling condition when armature 444 and 501 are retracted. The calling party at telephone A is now in talking relation with the attendant at operator's set T⁶ by way of the traced circuits in both directions up to armatures 450 and 451 and the respectively associated condensers.

At the time relay 324 actuated, its armature 343 attracts, so that if the listening key LK is restored to normal after it has been operated, due to the slow-releasing characteristic of relay 324, a locking circuit can be traced from conductor 826, lower winding of relay 324, armature 343, conductor 344, spring 630, spring 631, conductor 632 to conductor 329, the said lower winding of relay 324 being therefore substituted in the traced circuit including the windings of relay 439 for the operator's set T⁶. However, the resistance value of the said lower winding of relay 324 is such, that while it will maintain its relay locked over its energized circuit including the windings of relay 439, the current traversing the said circuit will not be strong enough to maintain relay 439 actuated, so it will deactuate. The deactuation of relay 439 followed by its dependent relay 443 will not cause the restoration of the shaft of the main element J, due to the fact that relay 321 is actuated, and that therefore, no circuit will be closed including its release magnet Re⁴, as will appear presently. However, armature 345 applies its ground to the lamp 346, and it glows to indicate that the windings of the relay 439 are still associated with the traced circuit including the lower winding of relay 324, and that therefore, the shaft of the main element J has not been restored to normal. The object of relay 324 will appear presently.

Assume that it is desired to pass the trunked connection to telephone T⁹, for example. The attendant has two alternative methods for accomplishing this. First, by manipulating the calling device key CK, and thereby introducing the calling device represented by 625, so that the circuit traced to conductor 327 now continues to spring 626, armature 627, armature 628, calling device 625, spring 629 to conductor 621, the circuit including the calling device thus having been substituted for the traced circuit including the operator's set T⁶, the substitution occurring without deenergizing the traced path including the windings of relay 439. Relay 324 being locked, as hereinbefore referred to, it will now become unlocked by reason of spring 631 disengaging, but it will be maintained by reason of its winding being now energized. However, relay 439 will now be operatively energized through the lower resistance path including the upper winding of relay 324 and the calling device 625. If the attendant now manipulates the calling device 625 in accordance with the first digit "2", (the calling number of telephone T⁹ being "23") relay 439 will deactuate and reactuate two times responsive thereto, whereupon two impulses will be applied from grounded armature 442, armature 452, conductor 453, winding of slow-releasing relay 502, conductor 503, winding of vertical magnet V⁵, sideswitch wiper 505 to grounded battery, the vertical magnet operating two times to step the wipers 901 to 903 two vertical steps into alignment with the bank contacts of the second level. At the time relay 502 actuated, armature 506 applied its ground to the private magnet PM⁵ causing it to actuate preparatory to retracting following the last said vertical impulse being applied, permitting the sideswitch wipers 505 and 507 to advance into their second position. Upon the attendant now manipulating the calling device 625, in accordance with the second digit "3", relay 439 will deactuate and reactuate three times responsive thereto, its armature 442 applying three ground impulses to armature 452, conductor 453, winding of relay 502, armature 508, winding of rotary magnet R⁵, sideswitch wiper 505 in second position to grounded battery, the rotary magnet operating three times to step the wipers 901 to 903 into engagement with bank contact 904 to 906, respectively. Relay 502 will actuate as before and cause the private magnet PM⁵ to be re-attracted, preparatory to retracting to permit the sideswitch wipers 505 and 507 to advance into their third position following the last said impulse to the rotary magnet. A circuit can now be traced from ground, sideswitch wiper 507 in third position, conductor 509, wiper 901, bank contact 904 to conductor 908. Bearing in mind that the conductor 908 will lead to corresponding bank contacts accessible to all the trunk terminating element pairs, such as J and K, and the connectors such as M, the line leading to telephone T⁹ is barred against intrusion. Another circuit path from grounded sideswitch wiper 507 is by way of relay 512, sideswitch wiper 505 to grounded battery, the relay 512 actuating to effect the seizure of the auxiliary element K. A circuit can now be traced from grounded ringing generator G⁵, armature 513, armature 514, conductor 515, wiper 902, bank contact 905, conductor 910, conductor 912 to the ringer 913 of telephone T⁹, conductor 914, conductor 915, bank contact 906, wiper 903, conductor 916, armature 516, armature 517, inner winding of relay 518 to grounded battery, the ringer 913 vibrating to signal the called party, but the current traversing the last described circuit not being effective to operate the relay 518. However, upon the called party responding by removing the receiver from the switch-hook of telephone T⁹, thereby completing a conductive path for the last traced ringing circuit, the relay 518 will be operatively energized. Before armature 513 disassociates from its resting contact, a locking circuit can be traced from the outer winding of relay 518, armature 519, conductor 520 to grounded spring 521 of off-normal set ON⁵, (the set ON⁵ operating upon the first vertical off-normal movement of the shaft of the auxiliary element K) a circuit can now be traced from grounded spring 521, conductor 520, armature 519, lower winding of relay 522, conductor 523, armature 517, armature 516, conductor 916, wiper 903 and over the traced path including the receiver of telephone T⁹ to wiper 902, conductor 515, armature 514, armature 513, conductor 524, upper winding of relay 522 to grounded battery, the relay 522 actuating and applying its grounded armature 525 to the winding of slow-releasing relay 526, the latter relay also actuating. A talking circuit can now be traced from conductor 524, condenser, armature 527, conductor 402, and from conductor 523, condenser, armature 528 to conductor 404. The calling party at telephone A and the last called party at telephone T⁹ are now in talking relation, and upon the attendant restoring calling device key CK, (listening key LK being assumed operated), the attendant will also be in talking relation with the calling party, and in fact, the three parties may talk mutually.

Assuming that forthwith after operating the calling device 625 to set the wipers of auxiliary element K on the bank contacts corresponding to telephone T⁹, and after relay 512 actuated, the calling device key CK is restored, the listening key LK being in its operated position, the operative conditions would be as last described, due to the relay 439 being maintained actuated under either condition. However, if the listening key LK is in its normal position, and the calling device key CK is restored to its normal position under this condition, the locking circuit traced for relay 324 will become closed before it will deactuate because of its slow-releasing characteristic, though its upper winding becomes deenergized when both keys LK and CK are in their normal position. Under this condition, the lower winding of relay 324 is energized in series with the windings of relay 439, and it will be remembered here that relay 439 will deactuate under this condition due to its marginal adjustment. Under this condition, lamp 346 will be glowing, indexing to the attendant that the party at telephone T⁹ has not responded. However, upon the response of the party at telephone T⁹, wherein relays 522 and 526 actuate, a circuit can be traced from grounded contact 347, its co-operating armature, conductor 348, armature 529, conductor 531, armature 454, armature 455, conductor 456, off-normal spring 457 to the release magnet Re⁴, the release magnet operating to restore the shaft of main element J to normal. The energizing circuit of relay 324 is now opened and it will deactuate and extinguish lamp 346, indexing to the attendant that a response has been obtained at telephone T⁹. If no response is obtained from telephone T⁹, indexed by the continued glowing of lamp 346, the attendant can, by manipulating listening key LK, again become into talking relation with the calling party at telephone A.

Assuming that at the time after the attendant sent digit "2", and before digit "3" was sent, or at least before the auxiliary element K seized, responsive thereto, the attendant restored the calling device key CK and also the listening key LK, relay 439 will deactuate, though the lower winding of relay 324 would be included in series with it. A circuit can now be traced from grounded armature 442, armature 452 to the winding of slow-releasing relay 458 causing it to actuate and sustain for a brief period after armature 452 retracts. After armature 444 retracts, and while armature 459 is attracted, a circuit can be traced from grounded armature 444, armature 459, conductor 460, armature 532, conductor 533, off-normal spring 534 to the winding of the release magnet Re⁵, the release magnet operating to restore the shaft of auxiliary element K to normal. This function would be employed if an error had been made, for example, and it was desired to efface the effect of the directive impulses previously sent.

Assume that at the time wiper 901 engaged bank contact 904, the latter bank contact constituted ground potential due to the line leading to telephone T⁹ being busy. Bearing in mind that the sideswitch wipers 505 and 507 are in their second position in this instance, a circuit can be traced from said grounded bank contact, engaged wiper 901, conductor 509, sideswitch wiper 507, make-before-break spring 535, winding of relay 537, make-before-break spring 538 to the winding of release magnet PM⁵. The latter circuit is established upon the retraction of armature 506, so the private magnet PM⁵ is maintained actuated, and thus retains the sideswitch wipers 505 and 507 from advancing into their third position to effect the seizure of the auxiliary element K. The relay 537 will be operatively energized in this circuit and a locking circuit for it and the private magnet PM⁵ will be closed through armature 540, conductor 520 to grounded off-normal spring 521, relay 537 and the private magnet PM⁵ thus being maintained locked until the shaft of auxiliary element K is restored to normal. The path to the rotary magnet R⁵ is opened at armature 508, and armature 541 closes a path from grounded busy-tone source T⁵ to talking conductor 523, audible to the attendant (assuming key CK restored and key LK operated) and also to the calling party at telephone A. The attendant can restore the shaft of auxiliary element K preparatory to again directively operate it to set its wipers on some other set of bank contacts corresponding to another local telephone, by re-including the calling device 625 and sending digit "1" constituted of one open impulse. Relay 439 will deactuate and reactuate one time responsive thereto, and bearing in mind that relay 458 will actuate and sustain for an appreciable period due to armature 442 retracting, a circuit can be traced from grounded armature 461, armature 462, conductor 463, armature 545, conductor 533, off-normal spring 534 to the release magnet Re⁵, the release magnet operating to restore the shaft of auxiliary element K to normal. In view of the fact, that armature 545 is attracted only under the condition of a busy line having been encountered, and that armature 546 cannot be attracted under that condition, but would be attracted if the auxiliary element K would have seized a non-busy line and that perhaps no response was attained and that the attendant desired to restore the shaft of auxiliary element K to normal so that a new connection could be effected through the said auxiliary element K. The sending of digit "1" under the condition described in connection with the auxiliary element K, when it has its wipers set upon the bank contacts corresponding to a busy line, the described impulse applied to conductor 463, through armature 545 to conductor 533, would under this condition be applied from conductor 463, armature 546 to said conductor 553 and to the release magnet Re⁵. Thus, the restoring of the wipers of auxiliary element K from a set of contacts found busy or if no response is attained, for example, would be effectuated by the sending of digit "1", in either instance.

Assume that the calling party at telephone A is in talking relation with the party at telephone T⁹ and that the main element J has been restored to normal, as hereinbefore described, and it is then desired to include the telephone T⁸ into the connection, the calling number of telephone T⁸ being "21". The party at telephone T⁹ will manipulate the calling device thereat in accordance with the first digit "2" whereupon relay 522 will deactuate and reactuate two times responsive thereto, two impulses being applied from grounded armature 525, armature 547, conductor 548, winding of relay 413, winding of vertical magnet V⁴, armature 417, sideswitch wiper 418 to grounded battery, the vertical magnet operating to step the shaft of main element J so the wipers 801 to 804 are in alignment with the second level of bank contacts. The relay 413 will actuate consequent to the first said impulse and deactuate following the last impulse. Upon its actuation its grounded armature 427 is applied to operatively energize relay 420 and the outer winding of private magnet PM⁴ as hereinbefore described and for the stated objects.

In this connection it will be remembered, that relay 422 locked to conductor 424, and due to armature 425 not having retracted, the said relay 422 will have remained locked, notwithstanding the off-normal contact set RO⁴ opened consequent to the shaft of main element J restoring as before described. Relay 413 having retracted, and the sideswitch wipers 418 and 426 having advanced to their second position consequent thereto, as hereinbefore described, the second digit "1" may now be sent. Upon the party at telephone T⁹ manipulating the calling device thereat in accordance with digit "1", the armature 525 will apply a ground impulse to conductor 548, winding of relay 413, armature 415, winding of rotary magnet R⁴, sideswitch wiper 418 in second position to grounded battery, the rotary magnet operating one time to step the wipers 801 to 804 into engagement with bank contacts 830 to 833, respectively. Assuming that bank contact 831, (and its tied bank contact 830) does not constitute ground potential, due to the conductor 835 and its attached multipled bank contacts not constituting ground potential, it being borne in mind that the said conductor is attached to corresponding bank contacts in other trunk terminating pairs of elements as J and K, and connectors as M, and that the line leading to telephone T⁸ can be reached through the said trunk elements and connectors.

Upon relay 413 retracting, following the said impulse to the rotary magnet R⁴, the outer winding of the private magnet PM⁴ deenergizes, and no ground being received over conductor 810 to the sideswitch wiper 426. The inner winding of the private magnet PM⁴ is not energized, therefore, it will retract and permit the sideswitch wipers 418 and 426 to advance into their third position, ground being applied through said wiper 426, conductor 810, wiper 802 to bank contact 831, and to the bank contacts attached to conductor 835, thus guarding the line leading to telephone T⁸ against intrusion through other switches. A circuit can also be traced to said wiper 426, through the winding of relay 430, through sideswitch wiper 418 to grounded battery, the said relay actuating to effect the seizure of the main element J, in the manner as hereinbefore described. A circuit can now be traced from grounded ringing generator G⁴, armature 431, armature 432, conductor 433, wiper 803, bank contact 832, conductor 838, conductor 839, ringer 840 of telephone T⁸, conductor 841, conductor 842, bank contact 833, wiper 804, conductor 828, armature 433, armature 434, inner winding of relay 435 to grounded battery, the ringer 840 vibrating to signal the party at telephone T⁸, the relay 435 not being operatively energized. Upon the party at telephone T⁸ removing the receiver from switch-hook thereat, closing a conductive path through the relay 435, it will operatively energize in the manner as hereinbefore described, and effect the seizure of the main element J, whereupon the telephone T⁸ is in talking relation with the calling party at telephone A and the passing party at telephone T⁹, over the talking conductors of the main element J before traced.

Assume that at the time wiper 802 engaged bank contact 831, conductor 835 constituted ground potential by reason of the line leading to telephone T⁸ being busy. Upon the retraction of armature 465, a circuit can be traced from ground on conductor 435, bank contact 830, wiper 801, make-before-break spring 466, armature 465, winding of relay 467, sideswitch wiper 418 in second position to grounded battery, relay 467 actuating closing a locking circuit from spring 438, armature 466, armature 465 to the winding of relay 467, this locking circuit remaining closed until the shaft of main element J is restored. Under the condition of relay 467 being actuated armature 469 will close a path from tone source T⁵, conductor 539 to talking conductor 440, audible to the parties at telephones A and T⁹. In this connection, in the event that telephone T⁸′ were a second choice telephone of a group of two lines containing telephone T⁸, the tie conductor 845 would be removed and under that condition, the traced energizing circuit for relay 467 would not be established since wiper 801 would not receive ground. However, due to wiper 802 receiving ground, this ground would be conducted to the inner winding of the private magnet PM⁴ so that when the rotary magnet R⁴ retracted its armature 468 and the interrupter relay 420 deactuated, the hereinbefore described energizing circuit for the rotary magnet R⁴ would be established by way of armature 429 to automatically advance the wipers an additional rotary step, where the engaged wipers would test as in the manner described wherein they encountered the first set of bank contacts 830 to 833 and the main element J was caused to either seize or supply a busy tone audible to the calling party at the telephone A and the party at telephone T⁸.

Assume that the line leading to telephone T⁸ is busy when the wipers 801 to 804 are set upon its corresponding bank contacts 830 to 833, and therefore, armature 478 will be attracted and that it be further assumed, that the party at telephone T⁹ desires to restore the shaft of main element J to normal in order to directively operate it to effect a connection to another line. The party at telephone T⁸ will manipulate the calling device thereat in accordance with digit "1", whereupon relay 522 will deactuate and reactuate one time responsive thereto, and grounded armature 550 will apply a ground impulse to armature 551, (since the slow-releasing relay 552 was caused to actuate when armature 525 retracted, in the manner as described with relation to main element J), conductor 553, armature 478, conductor 456, off-normal spring 457 to the release magnet $Re^4$, the release magnet operating to restore the shaft of main element J to normal. Had the main element J seized, armature 479 would be attracted and armature 478 would be normal as the relay 467 would not have actuated, and therefore, had digit "1" been sent after the said seizure, either before or after the party at telephone T⁸ removed the receiver from the switch-hook thereat, the impulse applied over conductor 553 would be continued through armature 479 to conductor 456 and to the release magnet $Re^4$, to restore the shaft of main element J to normal. From the last foregoing statement it will appear that if the calling party at telephone A and the parties at telephone T⁹ and telephone T⁸ are in a conference relation, the party at telephone T⁸, by sending digit "1" will thereby disassociate the main element J from the line leading to telephone T⁸. It will likewise be manifest, that if the party at telephone T⁸ should have sent digit "1" first, a ground impulse would be applied to conductor 463 in the manner as hereinbefore described, effective through armature 546 and over the described path to the release magnet $Re^5$, disassociating the auxiliary element K from the line leading to telephone T⁹.

Assume that instead of the party at telephone T⁹ introducing telephone T⁸ into the connection, it was desired to refer the calling party at telephone A to the attendant, the local telephone number of which is "11", it being borne in mind that the attendant's station is automatically selected upon the trunk to the private automatic exchange being seized at the main exchange by the connector G. Instead of sending digits "23", the digits "11" would be sent, in this instance, the wipers 801 to 804 being thereby set upon bank contacts 848 to 851, respectively, the bank contacts 850 and 851 being in multipled relations with bank contacts 818 and 819, respectively. However, this multipled relation does not exist between private bank contacts 849 and 817 for reasons as will appear presently. Upon the main element J seizing, in the manner before described, ground will be applied from wiper 802 to bank contact 849, conductor 853 to the winding of relay 350, the said relay actuating and a guarding potential will exist on bank contact 926, it being understood that the said conductor 853 is common to the main element J and its auxiliary element K only, and not to elements of other trunks. Of course, it would be operatively possible to multiple the attendant's circuit concerned from bank contacts 848 to 851 with the corresponding bank contacts of other trunk terminating elements and, in fact, connectors such as M, but under such condition, confusion would arise in that the attendant would not know what main office trunk was concerned when recalled from one of the local telephones, as telephone T⁹, exampled.

Upon relay 350 actuating as set forth, armature 351 applies its ground through armature 322 to lamp 352, causing it to glow, and this ground is also applied to conductor 821 and to bank contact 817. However, the latter is to no operative purpose, as will appear presently. Also, ground from armature 351 will be communicated through armature 320 to the winding of relay 321, causing it to actuate to extend the talking conductors 826 and 329 to conductors 327 and 621, respectively, in the manner as hereinbefore described. The operation with respect to the attendant's equipment is the same as when it was reached through bank contacts 816 to 819, with the exception that lamp 323 is not glowing and lamp 352 is glowing. That is to say, a specific calling lamp glows corresponding to whether a call is an original one from the main exchange or whether it is a call that has been referred from a local telephone, and it will appear presently that it is possible to refer a call that was originally an out-going call, from a local telephone, to the attendant. The attendant in all cases will respond by manipulating listening key LK, which will cause relay 439 and its dependent relay 443 to actuate over the before traced circuit, bearing in mind that wipers 801 to 804 are now in engagement with bank contacts 848 to 851 in lieu of bank contacts 816 to 819, as in the before described instance, wherein the call was automatically extended to the attendant's station upon the trunk being seized by connector G.

It will be recalled that in the first described call to the attendant's station, and wherein the attendant thereafter passed the call to the line leading to telephone T⁹ and then disassociated by restoring both the calling device key CK and the listening key LK, that the main element J did not restore, notwithstanding the fact that relays 439 and 443 deactuated. This is because, due to relay 321 being actuated in each case, a circuit is not completed to the release magnet $Re^4$, as will appear presently.

It will now be assumed that the party at telephone T⁹, after sending the first digit "1", desired to efface the effects of same. The receiver would be replaced on the switch-hook at telephone T⁹ for an appreciable period whereupon, relays 522 and 526 will deactuate in sequence and relay 552 will actuate, so that a circuit can be traced from grounded armature 501, armature 555, conductor 556, armature 480, conductor 456, off-normal spring 457 to the release magnet Re⁴, the release magnet operating to restore the main element J to normal. However, had the second digit "1" been sent, and the connection been completed to the attendant's station, as described, and the party at telephone T⁹ then desired to disconnect from the connection before the attendant responded, the receiver would be placed on the switch-hook at telephone T⁹ as before, causing the last before described operation of relays 522, 526 and 552, whereupon a circuit can be traced, as before, from grounded armature 501 to armature 480, but the latter armature being now attracted, the circuit will now continue over conductor 482, off-normal spring set AO⁴, (off-normal spring set AO⁴ being adjusted to operate only when the wipers of main element J are set upon bank contacts "11", which corresponds to the attendant's station) conductor 533, off-normal spring 534 to the release magnet Re⁵, the release magnet operating to restore the shaft of auxiliary element K to normal.

Assume that the party at telephone T⁹ retained the receiver off the switch-hook until after the attendant responded, the party at telephone A, the party at the telephone T⁹ and the attendant being in talking relation mutually, and the party at telephone T⁹ wished to disconnect from the connection. The receiver would be replaced on the switch-hook of telephone T⁹, whereupon the last described circuit including off-normal spring set AO⁴ and the release magnet Re⁵ would be established to restore the auxiliary element K to normal. However, if the attendant wished to disconnect from the connection, the calling device key CK and the listening key LK, would be restored, causing relays 439 and 443 to restore in sequence and relay 458 to actuate, whereupon a circuit can be traced from grounded armature 444, armature 459, conductor 460, armature 557, conductor 456, off-normal spring 457 to the release magnet Re⁴, the release magnet operating to restore the main element J to normal. In this connection it will be noted that the establishment of the last connection was dependent upon the party at telephone T⁹ having the receiver off the switch-hook wherein armature 557 would be attracted, and it will also be noted that relay 324 would be actuated until the main element J disassociated the attendant's line incidental to its restoration. From the foregoing it will be manifest that if the party at telephone T⁹ had replaced the receiver on the switch-hook thereat, and restored the shaft of auxiliary element K to normal as described, the armature 557 would be retracted and if the attendant continued the connection with the party at telephone A, and then disassociated from the connection by restoring calling device key CK and listening key LK, no release circuit will be established to the release magnet Re⁴, so that the main element J under that condition would remain set upon the line leading to the attendant's station. However, as long as the party at telephone A retained the receiver off the switch-hook thereat, the line relay 403 would be maintained energized, but upon the receiver being replaced on the switch-hook at telephone A, the relay 403 will become deenergized and upon the retraction of grounded armature 425 on its dependent relay 408, a circuit will be established from said grounded armature, conductor 456, off-normal spring 457 to the release magnet Re⁴, the release magnet operating to restore the main element J to normal. Ground being removed from conductor 424, relay 422 will unlock, and due to the off-normal springs 449 and 521 being free, relay 446 will deactuate. Lamp 308 will extinguish, indexing that the trunk is disengaged, and the guarding potential will be removed from conductor 314 due to the retraction of relay 312, so the trunk is now unguarded and in condition to being seized from either end.

Assume that in the last described connection, the party at telephone T⁹ replaced the receiver on the switch-hook and disassociated from the connection thereby, and that the attendant and the party at telephone A still maintained telephonic connection. Assuming further, that it was desired to pass the connection to telephone T⁸′, the calling number of which is "22". The attendant would manipulate the calling device key CK and then manipulate the calling device 625 in accordance with digits "22", whereupon the auxiliary element K will be caused to function in the manner as hereinbefore described wherein the connection was extended to telephone T⁹, however, in this instance the wipers 901 to 903 will be set upon bank contacts 920 to 922, leading to conductors 923 to 925, respectively. Conductors 924 and 925 lead to conductors 854 and 855 respectively, extending to the telephone T⁸′. The signal bell 856, will be caused to vibrate from current applied from ringing generator G⁵ in the manner as hereinbefore described. Upon response of the party at telephone T⁸′, relays 522 and 526 will operate, and the party at telephone A, the attendant and the party at telephone T⁸′ will be in talking relation mutually. Assuming that the attendant upon effectuating the impulses constituting the called number "22" restores the calling device key CK and the listening key LK, the relay 324 will remain locked and lamp 346 will continue to glow, indicating that the main element J is still in connection. Due to the attraction of armature 353, no circuit will be established to the winding of release magnet $Re^4$ consequent to relay 439 deactuating. However, upon the party at telephone $T^{8'}$ removing the receiver from the switch-hook, causing relays 522 and 526 to actuate, a circuit can be traced from grounded contact 347, conductor 348, armature 529, conductor 531, armature 454, armature 455, off-normal spring 457 to the winding of release magnet $Re^4$, the release magnet operating to restore the shaft of main element J to normal, the relay 324 deactuating and causing lamp 346 to extinguish to evidence the condition.

Assume that it is desired to pass the connection from telephone $T^{8'}$ to telephone $T^8$, the shaft of main element J being at normal. The party at telephone $T^{8'}$ will manipulate the calling device thereat in accordance with digits "21" and thereby cause the wipers 801 to 804 of main element J to be set upon bank contacts 830 to 833, respectively, and the signal bell 840 at telephone $T^8$ to be vibrated, all in a manner as hereinbefore described wherein the wipers of main element J were caused to be set upon the said bank contacts 830 to 833 under directive control of the party at telephone $T^9$. Upon response of party at telephone $T^8$, the party at telephone A, the party at telephone $T^{8'}$ and the party at telephone $T^8$ are in talking relation mutually. Assuming that the party at telephone $T^{8'}$ now replaces the receiver on the switch-hook thereat, causing relays 522 and 526 to deactuate in sequence and relay 552 to actuate, a circuit will be established from grounded armature 501, armature 555, conductor 556, armature 480, conductor 482, armature 354, conductor 553, off-normal spring 534 to the release magnet $Re^5$, the release magnet operating to restore the shaft of auxiliary element K to normal. The party at telephone A and the party at telephone $T^8$ are now in talking relation through the main element J.

Assume that it is desired to pass the last foregoing connection to the attendant's station through the agency of the auxiliary element K, the shaft of which is now at normal. The party at telephone $T^8$ will manipulate the calling device thereat in accordance with digits "1—1" and thereby cause the auxiliary element K to function in a manner as hereinbefore described when it was caused to set its wipers 901 to 903 upon bank contacts 920 to 922, respectively, leading to telephone $T^{8'}$, however, in this instance, setting its said wipers on bank contacts 926 to 928, extending the connection to conductors 853, 826 and 329, respectively. The auxiliary element K will cause the conductor 853 to become grounded, causing relays 350 and 321 to become actuated and the lamp 352 to glow, as the calling signal to the attendant that attention is desired from a call that has been passed by a local telephone, the latter specific information being indexed by the specific calling lamp 352, as hereinbefore referred to.

Assuming that the party at telephone $T^8$ now replaces the receiver on the switch-hook thereat, causing relays 439 and 443 to deactuate and relay 458 to actuate, a circuit can be traced from grounded armature 444, armature 459, conductor 460, armature 532, off-normal spring set $AO^5$ to conductor 456, (off-normal spring set $AO^5$ being adjusted to operate only when the wipers of auxiliary element K are set upon bank contacts "11", which corresponds to the attendant's station), off-normal spring 457 to the release magnet $Re^4$, the release magnet operating to restore the shaft of the main element J to normal. The off-normal spring set $AO^5$ is provided to enable the main element J to be released under the condition of relay 522 of the auxiliary element K being deactuated, while armature 353 on relay 321 is attracted, it being remembered that relay 321 is only actuated when a connection to the attendant's station exists by way of the normal level of main element J or from bank position "11" of either main element J or auxiliary element K. In this connection it will be manifest that the off-normal sets $AO^4$ and $AO^5$ may be displaced by attaching the conductors leading to the said sets to the armature and its working contact of each of two armatures placed on relay 324, respectively. Relay 324 actuates under the condition of either main element J or auxiliary element K having its wipers set upon bank contacts occupying position "11". This is to say, the said off-normal sets $AO^4$ and $AO^5$ may be assumed as mounted as armatures on relay 324, in lieu of being mechanically operated.

Assume that the party at telephone $T^8$ did not restore the receiver to the switch-hook before the attendant responded in the last assumed connection, then upon the attendant manipulating the listening key LK, causing relays 522 and 526 to actuate, incidentally, telephone A, telephone $T^8$ and the attendant's set $T^6$, being now in talking relation. If the party at telephone $T^8$ now restores the receiver to the switch-hook thereat, causing relays 439 and 443 to deactuate and relay 458 to actuate, the last before traced circuit to the release magnet $Re^4$ will be established by way of off-normal spring set $AO^5$, though a parallel circuit will exist from conductor 460, armature 557 to conductor 456. So that the off-normal spring set $AO^5$ is not operatively necessary under the last assumed condition, that is, if the party connected through the wipers of the main element J restores the receiver of the concerned telephone after a response has been obtained and held through the auxiliary element K. But in view of the hereinbefore description, the main element J would not be directively released by the party connected thereto restoring the receiver of the concerned telephone to the switch-hook if the line leading from the auxiliary element K is conductively open, either by reason of a response not having been obtained when the party at the telephone connected through the element J restores the receiver to the switch-hook of the said concerned telephone, or that a response has been obtained through the auxiliary element K and the circuit of the responding line is operatively or directively opened, so that relay 522 will be deactuated thereby.

Assume that the attendant responded and also, that the shaft of the main element J is restored under the last foregoing condition. Relays 522 and 526 will be actuated, following the actuation of relay 518 which operatively energized upon the circuit being completed through the attendant's set T⁶. It will next be assumed that it is desired to pass the connection through the agency of the main element J to telephone T⁸′, the calling number of which is "22". The attendant will manipulate the calling device key CK, and then manipulate the calling device 625 in accordance wth the digits "22", whereupon the main element J will be caused to function in the manner as hereinbefore described when it was caused to set its wipers 801 to 804 upon bank contacts 830 to 833, respectively. However, in the present instance the said wipers 801 to 804 are caused to be set into engagement with bank contacts 857 to 860, respectively, and the signal bell at telephone T⁸′ caused to vibrate from current projected from ringing generator G⁴, in the manner as hereinbefore described with relation to the call passed to telephone T⁸, for example. Assuming that the attendant now restores the listening key LK, and that the lower winding of relay 324 is now included in the energizing circuit of relay 522 in lieu of the attendant's set T⁶, the relay 324 will remain actuated through the energization of its lower winding. However, the adjustment of relay 522 is such that the current derived from the lower winding of relay 324 is not sufficient to maintain its armatures attracted. Following the deactuation of relay 522 and its dependent relay 526, in view of the actuation of relay 552, a circuit path can be traced from grounded armature 501, armature 555, conductor 556, armature 480, conductor 482 to the disengaged contact cooperative with armature 354, so that the circuit to the winding of the release magnet Re⁵ is thus not completed and the auxiliary element K therefore maintains its connection with the circuit leading to the attendant's equipment, and the relay 324 maintains actuated, causing the lamp 346 to continue to glow, the latter indexing that the party at telephone T⁸′ has not responded. Upon the response of the party at telephone T⁸′, relays 439 and 443 will be energized in the manner as hereinbefore described, whereupon a circuit can be traced from grounded contact 347, conductor 348, armature 483, conductor 484, armature 558, armature 559, off-normal spring 534 to the winding of the release magnet Re⁵, the release magnet operating to restore the shaft of the auxiliary element K to normal, disassociating the lower winding of relay 324, whereupon the lamp 346 will be extinguished, evidencing that a response has been attained.

From the foregoing exampled operations it is manifest that when a call has been extended to the attendant's station, the call can be passed and the attendant can forthwith disconnect telephonically and still maintain supervision, without restoring the element connected with the line leading to the attendant's station. However, upon any other station passing the call, and then disconnecting telephonically from the connection, the element connected with the line leading to the station having disconnected will have its shaft restored to normal incidental thereto.

With relation to the functions wherein the attendant is enabled to telephonically disassociate from a connection and still maintain supervision over a passed call, it will be manifest that if no response is attained, or for other reasons, the attendant manipulates the listening key LK to associate the set T⁶, the primary connection will be restored and the back-bridge relay (439 or 522) of the element having seized the line to the attendant's station primarily, will actuate, whereupon the attendant will again be in talking relation with the party at telephone A. If it is desired to release the connection passed, the attendant may introduce the calling device 625 by manipulating key CK and thereafter send one open impulse to operate the back-bridge relay of the element related to the attendant's line, whereupon the companion element will be caused to restore its shaft to normal in the manner as has been fully described hereinbefore.

An alternative means is provided for directively restoring either the main or the auxiliary element from the attendant's station, through the agency of self-restoring keys 633 and 634. That is to say, depressing key 633 applies ground over conductor 481, off-normal spring 457 to the winding of release magnet Re⁴, the release magnet restoring the shaft of the main element J to normal, and depressing key 634 applies ground over conductor 533, off-normal spring 534 to the winding of release magnet Re⁵, the release magnet operating to restore the shaft of auxiliary element K to normal. The attendant may thus efface any partly or completely passed connection, or may even efface a talking connection under way by depressing the release key 633 or 634 corresponding to the element J or K concerned.

It was stated hereinbefore that the attendant had two alternative means for extending or passing a connection primarily extended from the trunk to the said attendant's station incidental to the trunk being seized at the main exchange by the connector G, and it has been described how a connection subsequently passed to the attendant's station by one of the local stations could be further passed under directive control of the attendant, through the agency of one of said elements, J or K. The second means referred to hereinbefore, for passing or extending the primary calls to the attendant's station from the said attendant's station to local stations, and also, calls which have been subsequently passed to the attendant's station by a local telephone, will now be described.

Assume that lamp 323 glows, indexing a primary call to the attendant's station, and that the attendant thereat responds by manipulating listening key LK in the manner before described, and that the calling party at telephone A desires connection with telephone $T^9$. The attendant will insert switching plug $P^6$ into springjack $S^9$. A circuit can now be traced from the winding of motor magnet $M^9$, its armature 931, winding of relay 932, private conductor 933, sleeve 934 of springjack $S^9$, sleeve 636 of plug $P^6$, conductor 637, make-before-break spring 638, make-before-break spring 639, winding of slow-releasing relay 640 to ground, relay 640 and relay 932 actuating. The resistance of relay 640 is low enough to admit of sufficient current being derived through lamp 935 associated with springjack $S^9$ to cause it to glow. The further purpose of lamp 935 is to glow when the line leading to telephone $T^9$ is seized by either element J or K, or by connector M, the seizure involving the grounding of conductor 933. That is to say, when element J seizes, wiper 802 becomes grounded from the element J, when element K seizes, wiper 901 becomes grounded from element K and when connector M seizes its wiper 727 becomes grounded from connector M. Under the condition of the lamp 935 glowing, the attendant will know the concerned line is busy, however, it is not new in the art to connect busy lamps to the private conductors of lines, simply. In the same manner lamps 857 and 858 will be caused to glow when conductors 835 and 923 become grounded, respectively. The lineswitches N, O and P are of well known type, and their relays 859, 860 and 932 disassociate relays 861, 862 and 936, respectively, and ground on armatures 863, 864 and 957, upon conductors 835, 923 and 908 becoming grounded, respectively. Relay 640 will become operatively energized upon the plug $P^6$ being inserted into springjack $S^9$, its armature 600 applying ground to the upper winding of relay 643, the said relay actuating and locking from its lower winding, make-before-break spring 639, make-before-break spring 638, conductor 637 over the last traced path to the winding of motor magnet $M^9$. Relay 640 will be deenergized due to the actuation of relay 643, however, its armatures 645 and 646 will apply ground derived through the winding of relay 640 to conductors 481 and 533. Conductor 533 leads to the off-normal spring cooperative with off-normal spring 534, though under the assumed condition the said spring 534 is in its normal position due to auxiliary element K being at normal. Conductor 481 leads to off-normal spring 457 and thence to the release magnet $Re^4$, the release magnet operating to restore the shaft of main element J to normal. From the last foregoing statements it will appear that if the auxiliary element K had been off-normal when relay 640 actuated, the ground traced over conductor 533 would be continued through off-normal spring 534 to the release magnet $Re^5$, the release magnet operating to restore the auxiliary element K to normal. The winding of relay 640 being of low resistance will operatively energize either or both release magnets $Re^4$ and $Re^5$, and it will also appear that the relay 640 will remain actuated due to its slow-releasing characteristic for a brief period after current ceases to energize it, due to the element J or element K, or both, as will appear presently, having restored to normal. This is to insure that ground received from armature 600 over conductor 601 cannot be applied to armature 409 until both the main and auxiliary elements, J and K, have restored their shafts to normal. Relay 643 being operated, a circuit can be traced from grounded armature 648, armature 649 to clearing lamp 650, the latter lamp glowing.

In this connection it will be remembered that at the time the main element J rotated in on its normal level, in reaching the line extending to the attendant's station, relay 422 actuated and locked by way of armature 601'. This was to insure that thereafter as long as the said relay 422 remained locked, the vertical magnet $V^4$, and not the rotary magnet $R^4$, will be subject to receiving the first impulse operative to move the shaft of the main element J, after the shaft has been restored to normal following the said primary movement on the normal level. However, upon the actuation of relay 640, the locking circuit of relay 422 is opened, and the ground removed from armature 409 by reason of armature 600 being attracted, so no false impulse can reach either the vertical or rotary magnets of main element J, incidental to the restoration of the main element J.

Upon the shaft of main element J restoring to normal, followed by the deactuation of relay 640, a circuit can be traced from grounded armature 600, conductor 601, armature 409, armature 411, winding of relay 413, conductor 414, armature 415, winding of rotary magnet R⁴, armature 417, sideswitch wiper 418 to grounded battery, the rotary magnet operating to advance the wipers 801 to 804 into engagement with bank contacts 805 to 808, respectively. It will be recalled that when the trunk was seized by the connector G at the main exchange, bank contact 813 was grounded by way of armature 605, which ground is now removed due to the fact that relay 643 is locked, and bank contact 806 is still grounded on armature 315, so that the described functioning of the main element J will again ensue wherein the wipers thereof will be driven an additional rotary step, after its first rotary step, to test bank contact sets 812 to 815. Bank contact 813 being now free of ground, the main element J will now seize the latter set of contacts as in the manner hereinbefore described, so that a circuit can be traced from wiper 803, bank contact 814, conductor 865, listening key spring 651, tip conductor 652 of plug P⁶, tip conductor 938 of springjack S⁹, conductor 912, telephone T⁹, conductor 914, ring spring 939, ring conductor 653, spring 654, conductor 655, winding of shunted relay 656, conductor 657, bank contact 815 to wiper 804. Current is applied from ringing generator G⁴, armature 431, armature 432, conductor 433 to wiper 803 and a return path from wiper 804 extends over conductor 828, armature 433, armature 434, inside winding of relay 435 to grounded battery, the signal bell 913 at telephone T⁹ being caused to vibrate. Upon the party at telephone T⁹ removing the receiver from the switch-hook thereat, closing a conductive circuit including the inner winding of relay 435, the latter relay actuates, followed by the actuation of relays 439 and 443 in the manner as hereinbefore described. Upon the party at telephone T⁹ responding, relay 656 is energized coincident with relay 435. A circuit can now be traced from grounded armature 648, armature 649 to the winding of relay 659, the latter relay actuating and locking by way of its armature 660 to armature 648, lamp 650 extinguishing, indicative that the called party has responded. The party at telephone A and the called party at telephone T⁹ are now in telephonic relation. Upon the party at telephone T⁹ replacing the receiver on the switch-hook thereat, relays 656, 439 and 443 will deactuate and relay 458 will actuate, whereupon due to relay 656 deactuating, a circuit is prepared from the lower winding of relay 662, armature 663, armature 664 to conductor 481, and conductor 481 not constituting ground potential, the lower winding of relay 662 will not be energized at this time, relay 659 remaining locked as traced. At the time that relay 656 deactuated, relay 439 and its dependent relay 443 deactuated in sequence and relay 458 actuated. A circuit can thus be traced from grounded armature 444, armature 459, conductor 460 to the upper winding of relay 562, relay 562 actuating, whereupon a locking circuit for it is closed from its lower winding, armature 463, conductor 486, off-normal spring set RO⁴′ to grounded armature 485, (off-normal spring set RO⁴′ being adjusted to operate when the wipers 801 to 804 of the main element J are in engagement with bank contact sets 805 to 808, sets 812 to 815, 816 to 818 and 848 to 851, respectively). Incidental to the actuation of relay 562, a circuit is closed from conductor 486, armature 464 to the winding of the solenoid S⁵. The solenoid S⁵ has a plunger-arm 565 which will electrically connect contacts 566 and 567, but due to its design, an adjusted predetermined period, of perhaps fifteen seconds, will elapse after the solenoid is energized before the plunger-arm engages the said contacts 566 and 567. This characteristic in the solenoid is to delay the establishment of the circuit from grounded contact 566, contact 567, conductor 456, off-normal spring 457 to the release magnet Re⁴, wherein the release magnet will not operate to restore the shaft of the main element J to normal, until sufficient time has elapsed after the party at telephone T⁹ replaces the receiver on the switch-hook thereat, to evidence that the service has been terminated and that therefore, the replacing of the receiver was not by way of restoring the shaft of auxiliary element K to normal, in a manner as will appear presently. At the time conductor 456 received ground from contact 566, this ground is communicated over attached conductor 481 to the contact engaged by armature 664, and therefore, the circuit traced from the lower winding of relay 662 is completed, and relay 662 is caused to actuate. Upon the actuation of relay 662, its armature 665 engages spring 638 and incidentally unlocks relay 643 so that it deactuates, its armature 605 causing ground to be re-applied to bank contact 813, and armature 648 thereof opens the locking circuit of relay 659. It will thus be manifest that the upper winding of relay 662 has displaced the lower winding of relay 643 with the respect to the conductor 637. However, the resistance of the said upper winding of relay 662 is of such high value that current derived through it from the motor magnet M⁹ will not operatively maintain relay 932, nor will the ground on the said upper winding of relay 662 be of low enough potential, as applied to the bank contacts attached to conductor 933 to guard the line leading to telephone T⁹ against seizure. So that although the plug P⁶ is still in springjack S⁹, it does not operatively affect the line leading to telephone T⁹, it being manifest that talking conductors 657 and 865 are open at bank contacts 814 and 815 due to the shaft of the main element J being at normal. However, the current derived through the upper winding of relay 662 from the winding of the motor magnet M⁹ is sufficient to maintain the relay 662 operated, and therefore, a circuit can be traced from its grounded armature 669 to clearing lamp 670, the said lamp glowing to indicate that the party at telephone T⁹ has terminated the service and that the plug P⁶ may now be withdrawn at the attendant's convenience. Upon restoring the plug P⁶, the locking circuit for relay 662 is opened, whereupon it will deactuate.

Assume that in lieu of the party at telephone T⁹ not terminating the service as last assumed, the said party desired to pass the connection to telephone T⁸, of course, not knowing if the connection had been extended by the attendant through the auxiliary element K wherein its wipers 901 to 903 would have been set upon bank contacts 904 to 906, respectively, or that the connection has been established, as it was, by the insertion of plug P⁶ into spring-jack S⁹, or was passed from a local station as has been hereinbefore described. Upon the party at telephone T⁹ manipulating the sending device thereat in accordance with the first digit "2", relay 439 will be caused to deactuate and reactuate two times responsive thereto, due to the openings of the path including the winding of the relay 656. The latter relay, due to its shunt 672, has a slow-releasing characteristic, and thus does not deactuate during the current lapses constituted in the impulses sent. The auxiliary element K is caused to function in the manner as hereinbefore described, to raise its shaft so that its wipers 901 to 903 will align with the second level of bank contacts, and the said auxiliary element K will otherwise function to cause its sideswitch wipers 505 and 507 to advance into their second position, preparatory to the last digit "1", constituted of one open impulse, being sent by the party at telephone T⁹. The relay 439 will deactuate and reactuate one time responsive to the said impulse, whereupon the wipers 901 to 903 will be set upon bank contacts 941 to 943, respectively, and the ringer 840 at telephone T⁸ vibrated in a manner as hereinbefore described. Upon the party at telephone T⁸ removing the receiver from the switch-hook thereat, relays 522 and 526 will actuate in sequence, in the manner as hereinbefore described, whereupon the party at telephone A, the party at telephone T⁹ and the party at telephone T⁸ are in talking relation, mutually.

Assume that at the time wipers 901 to 903 were set upon bank contacts 941 to 943, respectively, the line leading to telephone T⁸ was busy. The auxiliary element K would function to cause busy tone from source T⁵ to be applied audible to the parties at telephones A and T⁹ in a manner as hereinbefore described. In case it is desired to restore the shaft of auxiliary element K to normal and perhaps pass the call to another telephone, the party at telephone T⁹ will send an impulse corresponding to digit "1", whereupon a circuit can be traced from armature 461, armature 462, conductor 463, armature 545, conductor 533, off-normal spring 534 to the release magnet Re⁵, the release magnet operating to restore the shaft of auxiliary element K to normal, after which the auxiliary element K may be directively operated to set its wipers 901 to 903 upon any accessible set of bank contacts. If the party at telephone T⁸ did not respond, and it is desired to restore the shaft of auxiliary element K to normal, and perhaps pass the call to another telephone, the party at telephone T⁹ will send an impulse corresponding to digit "1", whereupon a circuit can be traced from armature 461, armature 462, conductor 463, armature 546, conductor 533, off-normal spring 434 to the release magnet Re⁵, the release magnet operating to restore the shaft of auxiliary element K to normal, after which the auxiliary element K may be directively operated to set its wipers 901 to 903 upon any accessible set of bank contacts.

Assume that after the party at telephone T⁹ had sent the first digit "2", or at least before the auxiliary element K seized, its relay 512 actuating, following the last digit "1", in the exampled call passed to telephone T⁸, the party at telephone T⁹ desired to efface the operated state of the auxiliary element K. This will be accomplished by replacing the receiver on the switch-hook at telephone T⁹, whereupon relays 439 and 443 (also relay 656) will deactuate in sequence and relay 458 will actuate. A circuit can now be traced from grounded armature 444, armature 459, conductor 460, armature 532, conductor 533, off-normal spring 534 to the release magnet Re⁵, the release magnet operating to restore the shaft of auxiliary element K to normal, after which the party at telephone T⁹ may remove the receiver from the switch-hook thereat, and thereby again become in telephonic relation with the party at telephone A and can reinitiate the directive operation of the auxiliary element K as primarily. The relay 656 deactuating, responsive to the said restoration of the receiver at telephone T⁹, will have no operative effect since conductor 481 has not become grounded, so when the receiver is removed as stated, relay 656 will re-operate so that the circuits will be in a condition as after the party at telephone T⁹ responded.

Assume that when the party at telephone T⁹ directively passed the connection to telephone T⁸, and the party thereat responded the party at telephone T⁸ desired to directively disconnect the telephone T⁹ from the connection. Digit "1" will be sent from the sending device at telephone T⁸, whereupon relay 522 will deactuate and reactuate one time, responsive thereto, relay 552 actuating upon the retraction of armature 525. A circuit can be traced upon the reattraction of armature 550 from its ground, armature 551, conductor 553, armature 479, conductor 456, off-normal spring 457 to the release magnet Re⁴, the release magnet operating to restore the shaft of the main element J to normal. Incidental to the wipers 801 to 804 retracting from engaged bank contacts 812 to 815, respectively, the energizing circuit of relay 656 is opened, whereupon it will deactuate. In this connection it will appear, that in view of the slow-releasing characteristic of relay 656, ground will have been removed from conductor 481, incidental to the retraction of armature 479, so the lower winding of relay 662 will not become energized by way of armature 664. However, since the armature 663 is attracted, this ground will be applied from said conductor 481 through armature 663 to the lower winding of relay 662 before armature 479 retracts, causing it to actuate and lock in the manner as hereinbefore described. The line leading to telephone T⁹ is now unguarded and relay 932 is deactuated so that the lineswitch P will function as if the party at telephone T⁹ is initiating a call. The relay 662 being operated, clearing lamp 670 will glow to indicate that the plug P⁶ may be withdrawn from the springjack S⁹.

Assume that instead of the party at telephone T⁸ directively restoring the shaft of main element J to disassociate the telephone T⁹, the party at telephone T⁹ replaced the receiver on the switch-hook thereat. Relays 439 and 443 will deactuate in sequence and relay 458 will actuate, whereupon a circuit can be traced from grounded armature 444, armature 459, conductor 460, armature 557, conductor 456, off-normal spring 457 to the release magnet Re⁴, the release magnet operating to restore the shaft of main element J to normal, ground being applied over conductor 481 and through armature 663 to the lower winding of relay 662, the latter relay operating and causing clearing lamp 670 to glow.

Assume that at the time the party at telephone T⁹ caused the wipers of auxiliary element K to set upon bank contacts 941 to 943, respectively, and the signal device 840 at telephone T⁸ vibrated, the receiver was replaced upon the switch-hook at telephone T⁹ thereafter, and before a response is attained from telephone T⁸. Relays 439 and 443 will deactuate in sequence (also relay 656), and relay 458 will actuate, establishing the before traced circuit from grounded armature 444 to the upper winding of relay 562, the latter relay actuating and locking through off-normay spring set RO⁴'' to grounded armature 485. The solenoid S⁵ will be energized by way of armature 564 and grounded conductor 486, and in accordance with its characteristic closes a circuit from grounded contact 566, plunger-arm 565, contact 567, conductor 456, off-normal spring 457 to the winding of release magnet Re⁴, the release magnet operating to restore the shaft of main element J to normal. Conductor 481 thus becoming grounded, completes a circuit from the lower winding of relay 662, armature 663, armature 664 to the said grounded conductor 481, causing relay 662 to actuate and the clearing lamp 670 to glow. If the party at telephone A replaced the receiver on the switch-hook thereat, before the solenoid S⁵ caused the said restoration of the shaft of main element J, relays 403 and 408 will be caused to deactuate and establish a circuit from grounded armature 425 to conductor 456 to restore the main element J and actuate the relay 662 forthwith.

Assume that the party at telephone A and the party at telephone T⁸ are in talking relation, the party at telephone T⁹ having directively disconnected, or having been directively disconnected from the connection, the plug P⁶ still being in the springjack S⁹, and that the party at telephone T⁸ then wished to pass the connection to the attendant's station. Digits "1—1" would be sent from telephone T⁹ and the wipers 801 to 804 of the main element J would be set upon bank contacts 848 to 851, respectively, and the lamp 352 caused to glow as a calling signal. The attendant would respond in the manner as hereinbefore described, the plug P⁶ which may possibly have been withdrawn from the springjack S⁹, having no operative effect. If the attendant desires to pass the call through the plug P⁶, for example, the said plug would be inserted into the springjack of the desired line, whereupon the shafts of the main element J and the auxiliary element K will be restored to normal.

Assume that at the time the connection was extended by the main element J to the attendant's station, through bank contacts 848 to 851, and wherein calling lamp 352 was caused to glow, and the attendant responded, it was desired to extend the connection to telephone T⁸. Switching plug P⁶ would be inserted into springjack S⁸ and the lamp 857 caused to glow, and the relay 859 caused to disassociate relay 861, and the armature 863 to disassociate from its resting grounded contact. Due to relay 640 actuating in the manner as hereinbefore described, the shaft of the main element J will be restored, and upon its restoration will forthwith function on its normal level. The latter functioning is automatically initiated as hereinbefore described, whereupon due to bank contact 813 being unguarded, due to relay 643 being locked consequent to inserting the plug P⁶ into springjack S⁸, the wipers 801 to 804 would seize bank contacts 812 to 815, respectively, as hereinbefore described in relation to extending the call to telephone T⁹ by way of springjack S⁹. Ringing current will be projected as in the said before described instance, and the connection will otherwise proceed as in the said description.

Assume that at the time the party at telephone T⁸ passed the connection to the attendant's station through the agency of the auxiliary element K functioning and its wipers 901 to 903 seized bank contacts 926 to 928, respectively, and the attendant responded, as described, it was desired to extend the connection to telephone T⁸′, this time through the agency of switching plug P⁶ and springjack S⁸′. Upon the said switching plug being inserted into springjack S⁸, busy lamp 858 will glow and relay 860 will disassociate relay 862, and armature 864 will disassociate its grounded resting contact. Assuming further that the party at telephone T⁸ has not replaced the receiver on the switch-hook thereat and that, therefore, both the main element J and the auxiliary element K are in a seized condition, the element J being connected with the line extending to the telephone T⁸′ and the auxiliary element K being connected to the conductors leading to the attendant's station. Upon the relay 640 actuating, consequent to the plug P⁶ being inserted into springjack S⁸′, the shafts of both the elements J and K will simultaneously restore, due to their respective release magnet Re⁴ and Re⁵ actuating from being grounded through armatures 645 and 646 and the winding of said relay 640. And upon both said elements having restored to normal, thereby permitting relay 640 to restore consistent with its slow-releasing characteristic (relay 643 having actuated and locked), the relay 422 having been unlocked at armature 601′. The before described circuit from grounded armature 600, conductor 601, armature 409, through the rotary magnet will be re-established, whereupon the main element J will hunt and seize bank contacts 812 to 815, and the signal bell 856 at telephone T⁸′ will be caused to vibrate in the manner as hereinbefore described. Upon the called party at telephone T⁸ responding, and later terminating the connection, relay 656 and other elements of the attendant's plug equipment L will function as hereinbefore described.

From the foregoing it is clear that regardless of the condition or the position of either or both the main and auxiliary element, at the time the attendant inserts the switching plug P⁶ into the springjack of a wanted line, the off-normal state of the said element or elements, will be forthwith effaced and that the main element J will thereafter forthwith hunt and seize the conductors leading to the switching plug used in extending the connection. It is manifest that the switching plug used will be the one corresponding to the trunk over which the call exists and that therefore, the terminating elements of other trunks will not necessarily have access to the said switching plug. The attendant will know the trunk concerned by reason of the call lamp 352 indexing. The elements of equipment at the attendant's station referring to a particular trunk are associated as a unit, for example, as is indicated in Fig. 11.

In this connection, attention is called to the fact that whenever relay 439 deactuates, resultant of the called party replacing the receiver on the switch-hook while the shaft of the auxiliary element K is at normal, an impulse will be applied from grounded armature 442, armature 452, conductor 453, winding of relay 502, winding of vertical magnet V⁵, sideswitch wiper 505 to grounded battery, the vertical magnet operating to step the shaft of the auxiliary element K off-normal, its wipers aligning with the first bank level, and in view of relay 458 operating, coincidentally, upon the retraction of grounded armature 444, an impulse will be applied from the latter armature, armature 459, conductor 460, armature 532, conductor 533, off-normal spring 534 to the release magnet Re⁵, the release magnet operating to restore the shaft of auxiliary element K to normal. Likewise, whenever relay 522 deactuates resultant to the called party replacing the receiver on the switch-hook, while the shaft of the main element J is at normal, an impulse will be applied from grounded armature 525, armature 547, conductor 548, winding of relay 413, winding of vertical magnet V⁵, conductor 416, armature 417, sideswitch wiper 418 to grounded battery, the vertical magnet operating to step the shaft of main element J off-normal, its wipers aligning with the first bank level, and in view of relay 552 operating, coincidentally, upon the retraction of grounded armature 501, an impulse will be applied from the latter armature, armature 555, conductor 556, armature 480, conductor 456, off-normal spring 457 to the release magnet Re⁴, the release magnet operating to restore the shaft of main element J to normal. In this connection it will be noted that where one of the elements is directively restored and the companion element automatically steps its shaft off-normal and restores, that ground is not removed from conductor 448 until after the shafts of both elements have become normal, and therefore, if relay 446 is locked before the restoration is directed, it will remain locked until the shafts of both elements have been restored to normal. The unlocking of relay 422 under such condition will only occur when the party at telephone A replaces the receiver on the switch-hook thereat.

Attention is called to the fact that if the attendant after inserting switching plug $P^6$ into the springjack of a line, and has thereby caused the signal bell on the connected line to vibrate, manipulates the listening key NK when the called party responds, a talking condition ensues between the attendant and the called party, the called party deriving transmitter energizing battery from the windings of retardation coil 670, the party calling, at telephone A, for example, being disassociated from the connection, but will be associated upon the listening key NK being restored.

Attention is called to the fact that while directive impulses are being sent from a station connected through the wipers of main element J, relay 458 is actuated, and therefore, the interruptions caused by the impulses are not audible to the calling party at telephone A, for example. Likewise, while directive impulses are being sent from a station connected through the wipers of auxiliary element K, relay 552 is actuated, and therefore, the interruptions caused by the impulses are not audible to the calling party at telephone A, for example.

Attention is directed to the fact that if the attendant's station is conneced through the wipers of main element J, and the attendant then passes the call through the agency of the auxiliary element K, setting the wipers of the latter upon the bank contacts of a called line, and thereafter restores keys CK and LK before the party on the called line responds, as hereinbefore described, relay 443 will deactuate, applying a tone from grounded source $T^{5\prime}$, conductor 570, armature 487, conductor 488, armature 489, to conductor 440, audible to the calling party at telephone A, for example. Likewise, if the attendant's station is connected through the wipers of auxiliary element K and the attendant then passes the call through the agency of the main element J, setting the wipers of the latter upon the bank contacts of a called line, and thereafter restores keys CK and LK before the party on the called line responds, as hereinbefore described, relay 526 will deactuate, applying a tone from grounded source $T^{5\prime}$, armature 571, conductor 572, armature 573, to conductor 523, audible to the calling party at telephone A, for example.

Attention is directed to the fact that the plug $P^6$ may be inserted into springjacks leading to telephones which are not accessible to either the main element J or the auxiliary element K and under such conditions, the called telephone will be enabled to pass the call in the manner described, wherein the line associated with a spring-jack to which the plug $P^6$ is connected, may be an independent, manual line, for example.

Attention is directed to the fact that while the trunk line leading to the private automatic exchange was described as seized, through connector G, it would be equally feasible and practicable for the trunk to be seized directly, as by lineswitch C, it only being required to close a circuit path operatively effective to relay 403 to cause the described automatic functioning of the main element J to extend the connection to the attendant's station.

Figure 6:
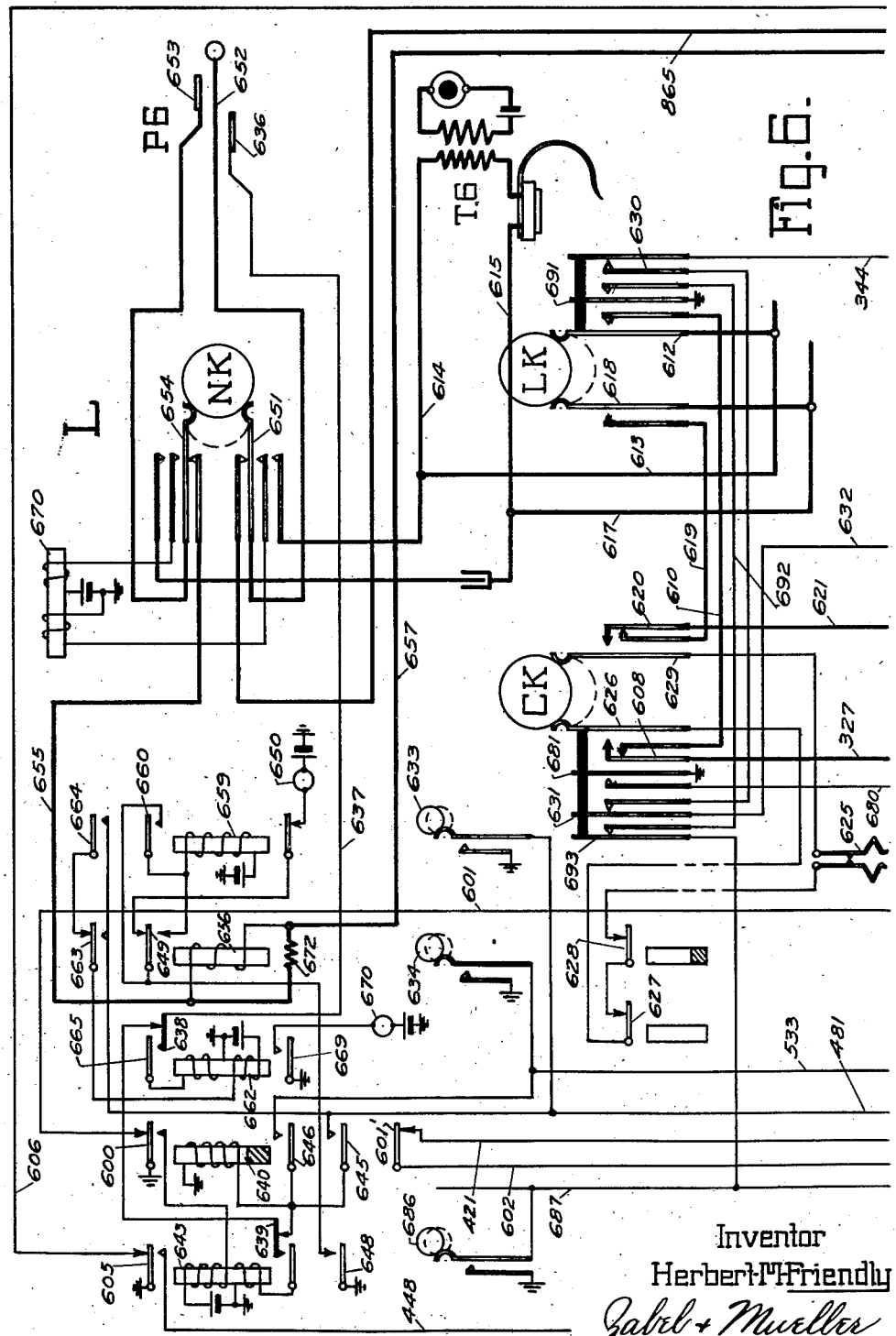
Fig. 6 shows a connecting plug and associated attendant's apparatus.

In connection with Fig. 6, armatures 627 and 628 may be assumed as on relays of a calling device which may be pre-set. For example, the said armatures may be considered as armatures 116 and 117 of relays 88 and 110, respectively, of pending application Serial No. 302,807, filed June 9th, 1919, by Friendly and Fisher, co-inventors.

It will now be assumed that a call is directively extended to telephone A in the main exchange, from a local telephone $T^8$, for example, and that after a response is attained the connection at the private automatic exchange will be transferred to telephone $T^9$, for example, the latter being accomplished as if the call were primarily an in-coming call to the private automatic exchange, and that the telephone $T^8$ was subsequently reached through a passing operation as has been set forth hereinbefore.

It will be noted that the lineswitch N, O and P have a common relation through corresponding bank contacts thereon, respectively, with trunk conductors 710, 711 and 712, leading to connector M which latter normally functions as a connector, but which functions as a selector on its tenth or "0" level; the cooperating levels shown being the first and "0" levels. The said lineswitches N, O and P being well known in the art, their operation will not be detailed, suffice it to say, however, upon the calling party at telephone $T^8$ removing the receiver from the switch-hook, the lineswitch N will seize and extend the connection to connector M. Of course, had the wipers of lineswitch N been resting on the bank contacts of a busy trunk, it would automatically function and advance the said wipers to a first idle set of bank contacts, which may be assumed as those of the trunk leading to connector M. In a commercial installation, the lineswitches would have access to ten or more connectors similar to M, so that any number of telephones, one hundred, for example, would have access to a common group of connectors similar to M. The complete functioning of the connector M will not be detailed, since its general structure is well known in the art, however, it may be stated that through the first level it has access to the same telephone as elements J and K through corresponding bank contact sets similarly disposed numerically, so the telephones of a private automatic exchange can inter-connect locally, as has been a common practice. In this connection it is to be noted that the connector M has a function involved in the lower winding of its left hand relay which is claimed in a pending application of the applicant.

At this juncture, a circuit can be traced from the upper winding of relay 713, make-before-break spring 714, conductor 711, bank contact 870, wiper 871, armature 872 through the telephone T⁸, armature 773, wiper 774, bank contact 775, conductor 710, make-before-break spring 715 to the lower winding of relay 713, the said relay actuating. A circuit can now be traced from grounded armature 716, conductor 717, armature 718 to the winding of slow-releasing relay 719, the said relay actuating. A circuit can now be traced from grounded contact 720 to conductor 712, the said ground serving to sustain the lineswitch N in a seized condition in the well known manner.

The listed telephone number of telephone A is "1111", and therefore, it is necessary for the calling party at telephone T⁸ to first call "0" by manipulating the calling device thereat in accordance therewith, effectuating ten open impulses constituted thereof. The relay 713 will deactuate and reactuate ten times, responsive thereto, and upon each retraction of its armature 718, its ground will be applied to armature 721, sideswitch wiper 722 (relay 719 sustaining over the lapses), winding of slow-releasing relay 724, winding of vertical magnet V⁷, sideswitch wiper 725 to grounded battery, the vertical magnet operating ten times to set the wipers 726 to 729 into alignment with the "0" bank level. Off-normal contact set ON⁷ operates on the first off-normal movement of shaft of the connector; off-normal contact set 9thON operates upon the shaft of the connector attaining the ninth vertical position; off-normal contact set 10thON operates upon the shaft of the connector attaining the "0" level. Upon the retraction of armature 731, following the last impulse to the vertical magnet, whereby the private magnet PM⁷ deenergizes, the sideswitch wipers 722, 725 and 732 advance into their second position, whereupon the rotary magnet R⁷ will operate to drive the wipers 726 to 729 over the bank contacts of the "0" level, seeking an idle trunk line to seize, all in the well known manner. It will be assumed that the first set of bank contacts 733 to 736, leading to trunk conductors 737, 314, 738 and 739, respectively, are thus seized, and due to the actuation of relay 740 by reason of the closure of the tenth off-normal contact set relay 713 is disassociated. However, due to the actuation of shunted series relay 745 energized over the circuit to be described presently, its armature 746 applies ground to the winding of relay 719 for the purpose of maintaining ground on conductor 712, dependent upon the relay 745 remaining energized.

Wiper 727 applies ground to bank contact 734 consequent to sideswitch wiper 732 advancing into its third position incidental to the seizure of connector M, in the well known manner, so a circuit can now be traced from grounded contact 720, conductor 712, armature 747, spring 748, conductor 749, sideswitch wiper 732, wiper 727, bank contact 734, conductor 314, armature 313, conductor 355, armature 356 to the winding of relay 357, said latter relay actuating. A circuit can now be traced from the upper winding of relay 403, conductor 402, make-before-break spring 401, conductor 306, armature 358, armature 359, make-before-break spring 360, conductor 406, make-before-break spring 405, conductor 404 to the lower winding of relay 403, relay 403 actuating, followed by the actuation of its dependent relay 408. The main element J having been at normal, the hereinbefore described function of the said main element will ensue, as wherein it automatically initiated its rotary functioning on the normal level consequent to the actuation of relay 403 when seized by connector G, and a closed circuit including conductors 306 and 406 was formed as in the last described functioning. It will be noted in this connection, that due to relay 357 being actuated, ground has been removed from conductor 316 leading to bank contact 806, and therefore, the bank contact set 805 to 808 is unguarded and will be seized upon the wipers 801 to 804 engaging them, respectively, the said wipers will therefore not progress and seize one of the succeeding sets of bank contacts, leading to the attendant's station, or the switching plug P⁶, for example. Ringing current will be applied to conductors 876 and 877, but to no operative purpose, since they are opened at armatures 362 and 363, respectively. A circuit which will appear presently, can also be traced at this juncture which will include the upper winding of relay 745 and the winding of line relay of lineswitch C', causing the latter to function in the well known manner and plunge-in and seize the trunk leading to the first selector E', whereupon a circuit can be traced from the upper winding of the line relay of the said selector E' over conductor 120, and lineswitch spring 121, trunk conductor 84', series winding of slow-releasing, electro-polarized relay 365, conductor 302, conductor 303, armature 366 on relay 367, (the object of the latter relay appearing presently) make-before-break spring 368, conductor 738, bank contact 735, upper winding of relay 745, armature 751, conductor 752, armature 753, make-before-break spring 714, conductor 711, bank contact 870, wiper 871, armature 872, conductor 839, telephone T⁸, conductor 841, armature 873, wiper 874, bank contact 875, conductor 710, make-before-break spring 715, armature 755, conductor 756, armature 757, wiper 729, bank contact 736, conductor 739, make-before-break spring 369, conductor 83', lineswitch spring 122, conductor 123, to the lower winding of the line relay to the selector E'. Relay 745, which has the characteristic of sustaining over directive impulse lapses thus remains energized dependent upon the sustained continuity of the traced circuit including the telephone T⁸. Should the receiver be replaced on the switch hook on the telephone T⁸, causing relay 745 to deactuate, dependent relay 719 will deactuate in sequence, and the ground will be removed from conductor 712, which will cause the lineswitch N to terminate its seizure in the well known manner. A circuit can under the latter condition, be traced from grounded armature 716, armature 718, armature 721, off-normal spring 761 to the winding of the release magnet $Re^7$, the release magnet operating to restore the shaft of connector M to normal, in the well known manner.

Continuing the description with relation to the connection extended from the calling telephone T⁸, to the first selector E', upon the calling party at telephone T⁸ manipulating the calling device thereat in accordance with the first digit "1", the selector E' will function in the well known manner and extend the connection to the second selector F', and upon the second digit "1" being sent, the said selector F' will function in the well known manner and extend the connection to connector H'. Upon the last two digits "1—1" being sent, the connector H' will function in the well known manner to set its wipers 11 to 13 on the bank contacts of the line leading to called telephone A and to operate the line cut-off relay of the lineswitch C associated with the line leading to called telephone A, and signal said A, all in the well known manner and in view of the cited patent of New- forth.

Upon the calling party at telephone A responding, the current projected from the front-bridge or line relay of the connector H' will be reversed in direction, so the current traversing the series winding of relay 365 will now flow in the opposite direction to that originally established. In this connection, it will be understood that at the time relay 357 actuated, a circuit was established from the polarizing winding of relay 365, armature 371, resistance $r^3$ to grounded armature 315, and that the current traversing this winding will magnetize the core of relay 365 in the opposite direction from that traversing the series winding thereof when the current was primarily established through it. However, the armature 372 of relay 365 is marginally adjusted to be thus inoperative until the windings of relay 365 energize cumulatively, as ensues upon the party at telephone A responding and the connector H' reverses the direction of current from it over the calling trunk, as set forth. The adjustment of armature 372 is such that after it attracts, the current in the series winding of its relay 365 will maintain it actuated, although no current traverses its inner electropolarizing winding, and it will deactuate retardedly, partly due to the short circuit applied at armature 301, upon relay 357 deactuating (and upon its inherent characteristics), as will appear presently.

Incidental to the attraction of armature 372, consequent to the response of the called party at telephone A, a circuit can be traced from grounded working contact and its armature 372, to the winding of relay 377, causing the said relay to actuate and lock to conductor 424, which latter conductor became grounded at armature 425. In this connection it will be noted that relay 376 will energize through lower armature of relay 365, lower inside armature of relay 377, spring 360, conductor 406 to the ground winding of relay 403, relay 376 actuating and locking to conductor 448, which latter conductor will remain grounded until the shafts of both the said main and auxiliary elements have restored to normal. The relay 377 will be maintained locked until the relay 403 deactuates, and the latter, it is to be borne in mind, is controlled from the main exchange, due to armature 356 being attracted. The latter armature opens the energizing circuit of relay 357, thereby causing it to deactuate and thus remove the short circuit between conductors 306 and 406 at armature 359.

A circuit can now be traced from trunk conductor 84', armature 301 (series winding of relay 365 being short circuited), conductor 302, armature 378, armature 379, make-before-break spring 305, conductor 306, make-before-break spring 401, conductor 402 to the upper winding of relay 403, and from the lower winding of relay 403, conductor 404, make-before-break spring 405, conductor 406, armature 307 to conductor 83'. In view of the reversed current projected back over the trunk, the battery windings of the line relay of the connector H' at the main exchange, will energize in series with the ground winding of the said relay 403, and the battery winding of the said relay 403 will energize in series with the ground winding of the line relay of the said connector H', the said relays therefore remaining actuated.

By reason of the armatures 362 and 363 being attracted, the trunk conductors 738 and 739 leading-out from the contacts 735 and 736 seized by connector M are disassociated from conductors 84' and 83' and associated with conductors 876 and 877 at springs 368 and 369, respectively. The said conductors 876 and 877 being seized through bank contacts 807 and 808 by wipers 803 and 804 of the main element J, the relay 435 will operatively energize over the traced path including the upper winding of relay 745 and the telephone T⁸, and apply the upper and lower windings of relay 439 to the conductors 738 and 739, respectively. That is to say, the telephone T⁸ is now energized from the current derived through the upper and lower windings of relay 439, and the talking connection completed to the trunk conductors 84' and 83' over the traced circuit, and the main element J is related to conductors 84' and 83' in the effective circuit disposition as when the call originating at the main exchange was completed to the main element J and to the line leading to the attendant's station, or in fact to any local telephone, to which a call may be subsequently passed, under the condition of an in-coming call to the private automatic exchange.

It will now be assumed that the party at telephone T⁸ replaces the receiver on the switch-hook thereat to terminate the service before the party at telephone A replaces the receiver on the switch-hook thereat. The energizing circuit for relay 439 will be opened, and it will retract, followed by dependent relay 403 in sequence. Also, the series winding of relay 745 will deenergize but the said relay will not deactuate and cause the release of the connector M due to the fact that a circuit can be traced from grounded armature 485, through off-normal spring set RO⁴' (which it will be recalled is only operated when the wipers 801 to 804 are engaged with bank contact sets 805 to 808, 812 to 815, 816 to 819, and 848 to 851, respectively) conductor 486, armature 380, conductor 737, bank contact 733, wiper 726 to the lower winding of relay 745, thus retaining the latter relay actuated and therefore preventing the restoration of the shaft of connector M and the unseizing of the line-switch N. At the time that relays 439 and 443 deactuate, the conductor 460 is grounded for a brief period, as hereinbefore described. This ground is extended to the upper winding of relay 562 causing it to actuate and lock its lower winding through armature 563 to conductor 486. The solenoid S⁵ will operate, so that in a predetermined time it will apply a ground to conductor 456 operative to the release magnet Re⁴ to cause the main element J to restore its shaft to normal. Upon the shaft of main element J restoring to normal, ground will be removed from conductor 448 which will unlock relay 376. This will open the trunk circuit at armature 378, which will in turn cause the line relay of the connector H' to deactuate and release the said connector in the well known manner, and it will also deenergize relay 403 and its dependent relay 408 in sequence. The relay 408 has a characteristic of being slower in releasing after deenergization than the slow-releasing relay in connector H' dependent on the line relay thereof, to insure that ground will not be removed from conductor 424 until the connector H' has restored or has permitted the preceding selectors F' and E' to restore. When ground has been removed from conductor 424 the locking circuit for relay 377 is opened and the latter relay deactuates. Armature 380 retracting removes ground from bank contact 733, deenergizing the lower winding of relay 745, the relay 745 deactuating, followed by relay 719, whereupon the circuit for operating the release magnet Re⁷ is established to restore the connector M as hereinbefore described, the lineswitch N incidentally unseizing.

From the foregoing it is clear that if the party at telephone T⁸ replaces the receiver on the switch-hook under the stated condition, a predetermined period which may be adjusted to suit operative conditions must elapse before the trunk is released and the shaft of the main element J is restored to normal. This retarded restoring function is provided so that in the event the calling party at telephone T⁸ had desired to pass or transfer the call to telephone T⁹, for example, by manipulating the calling device thereat in accordance with the telephone number "23" of telephone T⁹, wherein relay 439 will be caused to deactuate and reactuate in accordance therewith, and the auxiliary element K functions in a manner as hereinbefore described responsive thereto, it will be possible for the said calling party at telephone T⁸ to have effaced the call after the first digit "1" was sent by replacing the receiver on the switch-hook for an appreciable period, wherein the auxiliary element K will be caused to be released from ground received from armature 444 in the manner as hereinbefore described. Therefore, were it not for the retarded releasing function provided through the agency of solenoid S⁵, the main element J would restore its shaft to normal without allowing for a reasonable period in which the party at telephone T⁸ could remove the receiver from the switch-hook and thereafter again directively operate the auxiliary element K to set its wipers upon a desired local line in the manner as hereinbefore described.

Assume that the response at telephone T⁹, for example, is attained, the called party at telephone A, the calling party at telephone T⁸ and the transferred-to party at telephone T⁹ are now in talking relation. Assuming that the calling party at telephone T⁸ replaces the receiver on the switch-hook causing relays 439 and 443 to deactuate in sequence, a circuit can be traced from grounded armature 444, armature 459, conductor 460, armature 557, conductor 456, off-normal spring 457 to the release magnet Re⁴, the release magnet operating to restore the shaft of main element J to normal. Off-normal contact set RO⁴' will restore and open the traced circuit to the lower winding of relay 745, the connector M thereupon restoring to normal and the lineswitch N unseizing in the manner hereinbefore described. The called party at telephone A and the party at telephone T⁹ are now in talking relation. It will be noted in this connection that ground is maintained on bank contact 734 from armature 356, relay 377 being actuated and relay 312 being normal, so that the trunk cannot be intruded upon by a connector of the group containing connector M until after the locking circuit of relay 377 is opened. It will also be noted in this connection that when a call is initiated at the main exchange, as has been described, conductor 424 becomes grounded forthwith, and this ground is communicated through armature 309, armature 310 to the winding of relay 312, causing armature 313 to be applied to its grounded working contact and thereby apply ground potential to conductor 314 to guard the trunk against intrusion. A hunting connector, such as M for example, therefore, passing over the bank contacts of the corresponding trunk and testing the successive trunk.

Assume that the party at telephone T⁹ desires to pass the connection to telephone T⁸', for example, the telephone number of which is "22". The calling device at telephone T⁹ will be manipulated in accordance with digits "2—2," whereupon the main element J will be caused to operate and set its wipers 801 to 804 upon bank contacts 857 to 860, respectively, and seize and ring upon the line conductors 852 and 853, leading to said telephone T⁸', in the manner as hereinbefore described, it being clear that after the first transfer operation under the condition of the call having been initiated at the private automatic exchange, the subsequent passing operation and the functioning of the main element J and the auxiliary element K will be as in the described instances wherein the call was initiated at the main exchange, it being borne in mind that at the time the main element J rotated off-normal on its normal level that the rotary off-normal set RO⁴ operated and caused relay 422 to actuate and lock as hereinbefore described, so that after the main element J released, responsive to the party at telephone T⁸ replacing the receiver on the switch-hook thereat, the main element J was capacitated to be thereafter stepped vertically and thence rotarily directively, and that it will not thereafter function on its normal level.

Assume that while the connection between the called party at telephone A and the party at telephone T⁹ ensued, the called party wished to terminate the service. Upon the restoring of the receiver on the switch-hook at telephone A, the current projected over the trunk in the direction of the automatic exchange will be reversed back to the normal direction as when the trunk was primarily seized by the connector M. This will mean that instead of the windings of relay 403 energizing cumulatively with the line relay windings of the connector H', the battery windings will be opposed, and there will be no current in the ground windings, and therefore, the said relays will deactuate. Under this condition the connector H' will operate in the well known manner to restore itself to normal, and the armature 425 of relay 408 will retract to cause the restoration of the shaft of auxiliary element K to normal as hereinbefore described. It is manifest that had the called party at telephone A restored the receiver on the switch-hook thereat, when calling party at telephone T⁸ was still holding the receiver off the switch-hook, just after the called party at telephone A responded when the connection was first established, the line relay in the connector H' and the relay 403 will deactuate in the manner as last above described, operating to restore the main element J to normal.

At the time the wipers 801 to 804 retract from the engaged bank contacts 805 to 808, respectively, the upper winding of relay 745 is deenergized and the lower winding thereof, is also deenergized, by reason of the retraction of armature 380 of relay 377, due to the fact that the locking circuit of the latter relay has become opened because of the retraction of armature 425.

In this connection attention is called that at the time relay 365 actuated, followed by relays 376 and 377, a circuit can be traced from the lower winding of relay 367, armature 390, armature 391, spring 360, conductor 406, spring 405, conductor 404, lower winding of relay 403 to ground, the relay 367 actuating and locking its upper winding through armature 393 to grounded conductor 314. The relay 367 will thus remain actuated dependent upon the conductor 314 remaining grounded. Armature 366 being attracted, prevents the circuit path including the trunk conductors 83' and 84' being energized, whereby the call through the lineswitch C' to the first selector E' cannot be initiated. Armature 358 being attracted, prevents the circuit path including the armature 359 and the windings of relay 403 being energized to cause the main element J to automatically initiate its functioning on its normal level, since relay 357 will be caused to actuate. Under this condition, the relays 745 and 719 will deactuate consistent with their accrued slow-releasing characteristics, causing the connector M to release and the lineswitch N to unseize in the manner described hereinbefore. The relay 367 (also, relay 357 will deactuate) will become unlocked and deactuated when the wiper 727 retracts from bank contact 734, but the latter only occurs incidental to the connector disassociating from the trunk terminals leading to the main exchange. The object of armature 394 on relay 367 will appear presently. It will thus be manifest that if the called party at telephone A replaces the receiver on the switchhook, the connector H' (and selectors E' and F') will be caused to restore, and the fact the calling party has not replaced the receiver on the switch-hook will not cause a call to be falsely initiated, wherein the lineswitch C' will plunge-in and seize selector E'. After relay 367 deactuates, the circuits are at normal.

It is manifest that the party at telephone $T^8$, in the last before described functioning, could cause the auxiliary element K to set its wipers 901 to 903 upon bank contacts 926 to 928, respectively, by the sending of digits "1—1", and thereby extend the connection to the attendant's station in the manner as hereinbefore described. Also, it is manifest that the party at telephone $T^9$, in the last before described functioning, could cause the main element J to set its wipers 801 to 804 upon bank contacts 848 to 851, respectively, by the sending of digits "1—1", and thereby extend the connection to the attendant's station in the manner as hereinbefore described. Further, that the attendant can re-pass the connection directively through the companion element of the element linking the connection to the attendant's station, or by inserting plug $P^6$ into the springjack of the wanted line in the manner as hereinbefore described. However, to guard against removing the ground from conductor 448 and thereby unlocking the relay 376 at the time the main element J and the auxiliary element K is restored to normal, incidental to the actuation of relay 640 consequent to the insertion of plug $P^6$ into the springjack of the wanted line, ground is applied to conductor 448 by armature 605 of relay 643 when it attracts upon the actuation of relay 640 so that the off-normal ground removed consequent to the shafts of both said elements J and K being directively restored by the attendant, will be supplemented by the ground on armature 605 in time to prevent a lapse of ground occurring thereto, it being remembered that the requirement of this supplemental ground, applied by armature 605, is only until the main element moves off-normal on its normal level, seeking bank contacts 812 to 815 corresponding to the plug $P^6$. Armature 605 will become retracted at the time the shaft of the main element J is subsequently restored to normal so that the ground applied through armature 605 will not affect the operation of the circuits whereby relay 376 is caused to deactuate when the service has been terminated from the private automatic exchange end of the trunk.

Assume that the attendant at the private automatic exchange desires to call a telephone A in the main exchange, perhaps at the instance of a party at a local telephone of the said private exchange. Key CK will be manipulated after observing the lamp 308 is not glowing, indicating that the trunk is idle. This will introduce the sending device 625 between conductors 327 and 621. Conductor 680 will be grounded at spring 681, and this ground will be applied through armature 385 to the winding of relay 386, the latter relay actuating. Armature 320 will apply ground to conductor 821, thus guarding the set of bank contacts 816 to 819 leading to the attendant's station against seizure, however, to no operative object. Armature 387 applies ground to conductor 314, guarding the corresponding trunk against seizure by connectors of the group containing M. Ground from conductor 314 is also applied through armature 313, conductor 355, armature 356 to the winding of relay 357, causing the said relay to actuate, whereupon the inner polarizing winding of relay 365 is energized. Incidental to the actuation of relay 357, the before traced local path including the windings of relay 403 and armature 359 is closed, so that the wipers of main element J are caused to rotate-in. And, due to armature 315 being attracted, bank contact 806 will not be grounded, so the first set of bank contacts 805 to 808 will be seized. However, due to armatures 362 and 363 being retracted, it will be to no operative purpose, other than in preparation for the subsequent actuation of relay 377, as will appear presently.

A path may be traced from conductor 621, armature 328, conductor 738, spring 368, armature 366, conductor 303, conductor 302, outer winding of relay 365 to trunk conductor 84', and over the traced path to the winding of the line relay in the lineswitch C'. Also, from conductor 327, armature 326, conductor 739, spring 369 to trunk conductor 83' and over the traced path to ground in the lineswitch C', the lineswitch C' plunging-in and extending the trunk circuit to first selector E', as when the trunk was seized by connector M. It will appear presently that had the key LK been manipulated in lieu of key CK, the same generally equivalent functioning would have transpired as described with relation to key CK, since conductor 687 becomes grounded through springs 693 and 691.

The call to the wanted line in the main exchange leading to telephone A will be directively progressed by manipulating the calling device 625 in accordance with the telephone number of the said called line, whereupon the apparatus in the main exchange will function as when the said line was called through the connector M. Forthwith, after completing the sending of the directive impulses, the key 686 may be depressed, applying ground to conductor 687, operative to relay 365 (the inner winding of relay 365 operatively energizing it when the resistance $r^3$ is not included), followed by the actuation of relays 376 and 377, relay 357 deactuating. Conductors 738 and 739 will be thus disassociated from trunk conductors 84' and 83' directly, and telephonically reconnected to the said 84' and 83' by way of bank contacts 805 to 808 and wipers 801 to 804, respectively, of main element J, and over said 84' and 83' in the manner as before described. The attendant can restore the interlinked switches in the main exchange, followed by the restoration of the main element J, by opening the path closed by key CK, or LK, which is equivalent to opening the path including telephone $T^8$ when it was described as connected to conductors 738 and 739 through connector M. That is to say, relays 439 and 443 will deactuate in sequence, and relay 438 will actuate and cause a ground impulse to be applied to the upper winding of relay 562, causing the actuation of the solenoid $S^5$ to be initiated, to the end of applying ground to conductor 456, to cause the restoration of the main element J, in the manner hereinbefore described.

In this connection it will be noted that if the attendant directively sets up a connection to a called line in the main exchange and then restores the key CK, and thereafter manipulates the key LK to connect the set $T^6$, a circuit can be traced from grounded spring 691, conductor 692, spring 693 to conductor 687, the relay 365, and dependent relays, operating as before described.

After the attendant's station is connected through the wipers of main element J as last above described, the call may be forthwith passed to another station directively, through the agency of the auxiliary element K, by means of the sending device 625, in the manner hereinbefore described, wherein the party at telephone $T^8$, operating through the connector M and the wipers of the main element J, directively operated the auxiliary element K.

It will be manifest that the attendant may pass the connection through the agency of plug $P^6$ after relays 376 and 377 have operated in the last described functioning, by simply applying the said plug into the springjack of the wanted line, whereupon the shaft of the main element J will be caused to restore to normal and forthwith rotate-in and seize the conductors extending to the plug $P^6$, and signal upon the called line in the manner as hereinbefore set forth.

The operation of the exampled system being now clear, its operation with a modified arrangement in the main office wherein a meter device is employed on the private automatic exchange trunk to record the number of calls completed to a certain class of main exchange lines, will be discussed. The present invention, in its preferred form, under the last stated use, contemplates a novel connector R introduced where indicated by section lines $f$ and $g$ in Fig. 1, connector H' being thereby displaced. Also, the meter device shown in Fig. 14 will be introduced where indicated by section lines $d$ and $e$ in Fig. 2. Also, Fig. 17 will be introduced between Figs. 2 and 3, so the sheets will be assembled according to Fig. 18.

In this connection, it is to be understood, the connector R, is of the same general class of connectors as H', however, also incorporating the "sideswitchless" features well known in the art. In addition, the connector R has novel structural and operative features, among which is the momentary reversal of the direction of current projected out over the leading-in conductors incidental to the connector seizing, and to thereafter effect such reversal under control of the responding party of a certain class of lines. The meter device consists of an electro-polarized relay $n$ which has a dash-pot device $dp$ to retard the effective operation of the said relay $n$ when its windings energize cumulatively. The inner, electro-polarizing winding of relay $n$ energizes when the lineswitch C' plunges-in and conductor 265 becomes grounded. The current normally traversing the outer winding of relay $n$ will energize in opposition to the inner winding. However, upon the current projected back over the trunk changing in direction, the two windings on relay $n$ will energize cumulatively. Under the latter condition the armature of relay $n$ will be attracted against the restraining influence of the dashpot device $dp$, so it requires an appreciable time before the working contact 266 will become grounded and the magnet of meter device $m$ will be energized to effect a registration. The meter device $m$ may be of well known type, though it may also involve any of the well known means for retarding the effectiveness of its electro-magnet, such as slugging the core, for example. The latter statement also applies to relay $n$, wherein said means for retarding may either supplement or displace the said dash-pot device.

In view of the foregoing descriptions and statements, it is manifest that if a momentary reversal of current takes place incidental to the line to the telephone A being seized in any of the instances wherein a call was described as being extended thereto, the relay 365 will be caused to actuate. That is to say, the actuation of the said relay 365 will not then depend upon the party at telephone A responding, or upon a specific directive operation, but the said actuation of relay 365 will, in effect, occur automatically incidental to the sending of the last digit of the number called. Under such condition, the party calling from the private automatic exchange may forthwith pass the connection by annexing the proper digits of the desired local station in the private automatic exchange, without first awaiting the response of the called party at telephone A, or by first directively causing relay 365 to operate by depressing key 686, or by manipulating listening key LK to apply ground to conductor 687, as described, or by any other specifically directive operation.

When selector F' seizes the connector R, a circuit can be traced from the upper winding of line relay 15, make-before-break spring 16, conductor 58', wiper 55', conductor 120, spring 121, outer winding of relay $n$ (the latter relay now being energized differentially to the inner winding thereof), conductor 84'. over the traced path including the outer winding of relay 365, the calling telephone, conductor 83', make-before-break spring 171 in Fig. 17, conductor 83'', spring 122, conductor 123, wiper 56'. conductor 59', make-before-break spring 17 to the lower winding of relay 15, the latter relay actuating. A circuit can now be traced from grounded armature 18 to the winding of slow-releasing relay 19, causing it to actuate and apply its grounded armature 20 to conductor 91'. Upon the calling party sending the third digit "1", armature 18 will retract and re-attract responsive thereto, whereupon a ground impulse is applied through armature 21 (relay 19 sustaining over the lapses), off-normal spring 22. spring 23, winding of slow-releasing relay 24 to the vertical magnet $V^{15}$, the vertical magnet operating to step the wipers 25 to 28 into alignment with the first level of bank contacts. In this connection, it is to be understood that the off-normal set $ON^{15}$ operates its springs incidental to the first off-normal movement of the shaft carrying wipers 25 to 28, so that if there had been five impulses imparted to the vertical magnet, in lieu of one, as stated, the spring 22 would have been disassociated incidental to the transmitting of the first impulse and the spring 29 would thereafter be in engagement with spring 22, and in view of the fact relay 24 will actuate incidental to the first impulse and sustain over the lapse to the second impulse, the path of the second and succeeding impulses of the series of five will be by way of attracted armature 30 through the winding of relay 24, in lieu of spring 23. The armature of relay 24 will retract after the last impulse of the series. In the case under description, it is the one impulse. Upon the last digit "1" being sent, wherein relay 15 operates as before, a ground impulse will be applied through armature 21, spring 22, spring 29, armature 30, conductor 31, armature 32, armature 33 to the rotary magnet $R^{15}$, the rotary magnet operating to rotate the wipers 25 to 28 into engagement with the first set of bank contacts 34 to 37, respectively. Incidental to the rotary magnet being energized, the slow-releasing relay 38 will actuate and sustain for a brief period thereafter. During the time relay 38 is actuated, its armature effects a supplementary path from conductor 31 to armature 33, since busy relay 40 may become actuated under conditions, as will appear presently. Suffice it to state here that assuming the last digit constitutes a plurality of five impulses in lieu of one, as stated, and had an intermediate private bank contact then constituted ground, by reason of the corresponding line being busy, a circuit can be traced from said grounded bank contact, private wiper 26, make-before-break spring 61, armature 62, make-before-break spring 63, conductor 64 to the winding of relay 40, causing it to actuate, or tend to do so, in view of the fact it is stiffly adjusted. However. if in passing over the four bank contacts preceding the fifth one concerned, the wiper 26 encounters a plurality of grounded contacts successively, the relay 40 will probably operate, and were it not for the armature 39 attracting, the traced impulse path to the rotary magnet would be opened. Under the condition of relay 40 actuating, due to the slow-releasing characteristic of relay 38, if the wiper 26 finally rests upon a bank contact which does not constitute ground potential, but does constitute battery potential, received through the line-cut-off relay 49, the relay 40 will deactuate before armature 62 retracts, so when the armature 62 retracts a circuit can be traced from said battery source, through wiper 26, spring 61, armature 62, outer winding of relay 65, armature 66, conductor 91' to grounded armature 20, the relay 65 actuating. The relay 65 will be locked by its inner winding through armature 67, conductor 68 to grounded off-normal spring 69. The ground applied through armature 67 will be conducted through the lower armature of relay 40, armature 70 to the winding of slightly slow-releasing relay 71, the latter relay operating to reciprocate the relationship of the windings of relay 15 with reference to conductors 58' and 59', so that the current now traversing the outer winding of relay $n$ will be cumulative with the inner electro-polarizing winding thereof, and the said relay $n$ will therefore be operatively energized. However, its contact armature will not be enabled to engage its working contact 266 for an appreciable time, which time will be somewhat longer than the sustaining period of relay 71. When relay 71 actuates, its upper armature applies ground over conductor 64 to the winding of relay 40, causing it to actuate and lock by way of conductor 64, spring 63, armature 66 to conductor 91', opening the energizing circuit of relay 71, and thus causes the latter relay to deactuate and restore the direction of current traversing the trunk conductors 58' and 59' before the relay n closes its electrical contacts, or at least before the meter device m registers. The duration of the reversed current traversing the outer winding of relay 365 will be sufficiently long under the last stated condition to operatively attract its armatures, so that the relays 376, 377 and 367 will be caused to actuate for the objects hereinbefore set forth, and the calling party at the private automatic exchange can forthwith pass the call in the manner which has been described.

In this connection, it will be assumed that when wiper 26 engaged bank contact 35 responsive to the rotary impulse (which may be the fifth, as assumed, or the single impulse corresponding to the bank position), ground was encountered because the called line is busy. Then, before relay 38 deactuates, a circuit path will exist from said grounded bank contact, wiper 26, spring 61, armature 62, spring 63, conductor 64 to the winding of relay 40, the latter relay actuating before the armature 62 retracts. Upon the retraction of armature 62, a locking path for relay 40 can be traced from conductor 64, spring 63, armature 66 to grounded conductor 91'. In view of relay 65 being normal, it not having energized, because wiper 26 rests on a bank contact constituting ground, in lieu of battery, a path can be traced from grounded tone source $T^{15}$, armature 72, armature 73 to the talking conductor leading to trunk conductor 59', the tone being audible to the calling party. This tone will endure until the ground is removed from conductor 91', by relay 19 deactuating, caused by the calling party terminating the service.

Attention is directed that at the time armature 395 on relay 365 attracts, it applies ground over conductor 396 and through the winding of relay 172, conductor 173 to sideswitch wiper 418 in the third position, the latter relay actuating. The characteristics of relay 71 is such that it will deactuate before relay 365 will deactuate, so when the ground potential is removed from conductor 396, the ground winding of relay 15 will be in series with the conductor 83'' and winding of relay 172 to battery at sideswitch wiper 418. Under this condition both relays 172 and 15 will be locked actuated. At the time relay 172 actuates, its armature 174 grounds conductor 84' through retardation coil 175, the latter said conductor leading to the battery winding of relay 403. Armature 176 opens conductor 83' from conductor 83'', and applies battery to the latter said conductor leading to the ground winding of relay 403. Relay 403 is thus maintained actuated. In this connection it will be manifest that when relay 71 deactuates, before the ground is removed from conductor 396, the relay 15 is maintained actuated because of its battery winding deriving ground from armature 174. And while relay 71 is actuated, and the ground is still on conductor 396, the battery winding of relay 15 derives ground from said conductor 396 by way of armature 177. In any event, a short lapse of energizing current to relay 15 will be to no operative effect, since the relay 19 will sustain, and the rotary magnet $R^{15}$ is disconnected at armature 33.

It will appear presently, that upon the called party responding, the relay 71 will again actuate and reciprocate the normal relation of the windings of relay 15 with respect to conductors 58' and 59', and that the actuated condition of said relay 71 will then depend upon the called party holding the receiver off the switch-hook. In view of the conductor 396 becoming ungrounded upon the deactuation of relay 365, upon the actuation of relay 172, as described, the winding of relay 172 becomes connected between the battery on sideswitch wiper 418 and conductor 83'', independent of the relay 403, the said conductor 83'' being now applied to the ground winding of relay 15, so that both relays 15 and 172 are mutually locked actuated. Relay 403 is locked actuated from ground on armature 174. It will be noted in this connection that due to the application of ground through retardation coil 175 to conductor 84', and battery through retardation coil 178 to conductor 83' leading to the ground winding of relay 403, the trunk, so far as the calling party is concerned, is balanced, and therefore, quiet.

When the relay 71 again actuates, consequent to a response being attained on the called line, as will appear presently, the battery winding of relay 15 will be in series relation with the winding of relay 172 applied to battery of the same polarity, so the path will be unenergized, and relay 172 will deactuate. Relay 15 will not effectively deactuate because its ground winding will forthwith derive battery from the battery winding of relay 403, and its battery winding will find ground through the ground winding of relay 403. Relay 403 will remain actuated under the last stated condition.

In this connection, it will be manifest that while the called telephone is being signaled and ringing tracings are being induced into the outer winding of relay 80 and to conductor 59', the currents constituting it will traverse condenser 179, audible to the calling party.

It will be manifest that had the called line been found busy, the relay 65 would not have actuated, and therefore, the relay 71 would not have momentarily actuated to cause the relay 365 and the other dependent relays to actuate responsive thereto, so the calling party will perceive the busy tone indicative of the condition.

The connector R will restore under the stated condition for connector H', that is, when relay 15 deenergizes. It will also restore under other alternative conditions, which will appear presently. When relay 15 deactuates, a circuit can be traced from grounded armature 18, armature 21, switch-arm 72, spring 75 to the release magnet $Re^{15}$, the release magnet operating to restore the shaft to normal. If the calling party terminates the service before the called party responds, and the relay 172 is therefore, in a locked state, upon the main element J restoring its shaft, in the manner as has been described hereinbefore under conditions of a similar call, but where connector H' was concerned, the sideswitch wiper 418 will remove battery from the live terminal of relay 172, so it will deactuate, whereupon the battery and ground windings of relays 403 and 15 will oppose like windings, causing both latter said relays to deactuate, the connector R restoring consequent thereto, whereupon the trunk concerned is at normal. Of course, had the calling party received the busy tone, and thereafter terminated the service, the relay 15 would become unenergized as the series path including the calling station and the latter said relay would become open thereby, the connector R restoring.

It will now be assumed that a response is obtained at the telephone A. It will be borne in mind that when relay 65 actuated, a circuit is closed from the ringing generator $G^{15}$, armature 76, armature 77, wiper 28, bank contact 37, conductor 83, conductor 42, ringer 5, conductor 41, conductor 84, bank contact 36, wiper 27, armature 78, armature 79, inner winding of relay 80 to grounded battery. The relay 80 will not operate responsive to the said current, but will operate upon a conductive path being closed through the telephone A, as upon the party thereat removing the receiver from the switch-hook. At the time armatures 76 and 79 attract, the armature 81 locks the inner winding of relay 80 to grounded conductor 68, and applies this ground to the upper terminal of the lower winding of relay 82, which terminal was normally applied to battery through the inner winding of relay 80, in order to convey ringing tracings to the calling party, in the manner used in connectors of the other types. The relay 82 will now energize over the traced path including the receiver of telephone A, and the calling party will be in telephonic relation with the called party over the traced paths, joined through condensers 85 and 86. Relay 40 being locked, a circuit can now be traced from grounded bank contact 34 (also through off-normal set SON), armature 88, armature 89 of relay 40, armature 70 to the winding of relay 71, the latter relay operating to effect a reversal of current over the trunk. The latter function will be to the same object as stated with reference to connector H', also having in mind the consequent functioning wherein relay 172 unlocks. It will thus appear, that the party at telephone A can, by replacing the receiver on the switch-hook, cause relays 82 and 71 to deactuate and thereby re-establish the primary current direction along the trunk conductors 58' and 59'. This latter will cause the battery windings and the ground windings of relays 15 and 403 to oppose each other, respectively, so they will deactuate. Under this condition, the main element J, or the auxiliary element K, or both, if both are off-normal (the connection having possibly been passed), will restore to normal in the manner as has been set forth. The connector R will restore to normal in the manner as has been described, due to the deactuation of relay 15, so the concerned trunk is now normal.

Assume that after a response has been obtained at telephone A, the shafts of the said main and auxiliary elements have been restored to normal in the manner hereinbefore described. Bearing in mind that due to the party at telephone A holding the receiver off the switch-hook, the grounded winding of relay 403 will be energized in series with the battery winding of relay 15, the path between the battery winding of relay 403 and the ground winding of relay 15 being open at armature 378, the relay 376 having deactuated incidental to the restoration of the said main and auxiliary elements. The locking circuit for relay 377 is maintained, together with that of relay 367, the latter due to armature 356 being attracted and armature 313 being retracted. Under this condition, the main element J will not rotate-in on its normal level. Conductor 314 is grounded, so the trunk cannot be seized at the private automatic exchange end. However, when the party at telephone A replaces the receiver on the switch-hook and relay 71 deactuates, the relays 15 and 403 will deactuate, restoring the concerned equipments to normal.

The connector R as installed in a commercial exchange, will complete connections from main exchange telephones, directly, as well as from trunks extending between the main exchange and the private automatic exchange. Under the former operation, the relay 15 is maintained energized in a series path not including an exterior battery source, so it will be energized similarly, regardless of the condition of relay 71. That is, not depending upon battery or ground derived from a cooperating serially related relay. Under this condition, the connector R will restore forthwith whenever relay 15 deactuates, regardless of the condition of relay 82.

An alternative method of employing the connector R is secured by opening the path closed by the switch-arm 74. Under this latter arrangement should the calling party terminate the service, causing relay 15 to deactuate, followed by relay 19, while the called party at telephone A holds the receiver off the switch-hook, and maintains relay 82 actuated, a circuit cannot be completed from grounded armature 18 to off-normal spring 75, due to armatures 87 and 88' being attracted. However, upon the armature 20 retracting practically coincident with armature 21, the relay 40 will reactuate. This will open the ground from conductor 91' long enough to permit preceding selectors to unseize, and due to armature 88' being attracted, ground from armature 18 will be applied to conductor 91' to guard the connector R against seizure. When the party at telephone A replaces the receiver on the switch-hook, the relay 82 will deactuate, whereupon a circuit can be traced from grounded armatures 18, armature 21, armature 87, armature 88', spring 75 to the release magnet $Re^{15}$. On the other hand, if the party at telephone A terminated the service first, causing relay 82 to deactuate, while relay 15 is maintained actuated, the ground will be maintained on conductor 91' by armature 20, and the traced ground path to the release magnet $Re^{15}$ will be open at armatures 18 and 21. The connector R therefore restores upon the last party to the connection terminating the service where the calling line leads from a telephone, simply. The armature 20 is adjusted to open last to insure that the relay 40 cannot unlock before armature 70 retracts, as otherwise a false impulse would be applied to the winding of relay 71.

The connector R, in addition to having the function of causing a momentary reversal of current to be projected over the leading-in trunk under all conditions when it seizes a called line, also has the function of differentiating in its operation under the condition of a response being obtained on the called line, depending upon the class of the line. In this connection, it will be assumed that the lines reached on the 1st, 2nd and 3rd levels belong to a class wherein no toll charge is made for calls completed to any of them. Then, the spring set SON is adjusted to be grounded at all levels other than the said three levels. However, since it will be assumed that the called line is in the first level and is a specific line to which a toll charge is to be made, its bank contact 34 is connected to ground, the functioning being as hereinbefore described. Of course, the ground applied through set SON is the equivalent to all contacts engaged by wiper 25 being grounded on the concerned levels. It is therefore manifest that when the wiper 25 does not receive ground when the set SON is open, no ground will be communicated to armature 88 on relay 82, so no actuation of relay 71 can take place incidental to the called party responding.

Under the last stated condition, wherein the relay 71 is not operated incidental to the called party responding, the relay 172 will not unlock. Thus, under the latter condition the talking path between the calling and called parties will include the condenser 179. Grounded retardation coil 175 will be legged from conductor 84', while battery through retardation coil 178 will be legged from conductor 83'. The condition of relays 15 and 403 have thus not been altered by reason of the response. Upon the calling party, or a substituted party or parties therefore, to which the connection has been passed, causing the main and auxiliary elements to restore their shafts to normal, unlocking relay 172 by reason of disconnecting its battery supply over conductor 396, relays 15 and 403 will deactuate, whereupon the connector R will be maintained and the preceding switches thereto will restore, and the concerned equipments at the private automatic exchange will become normal. Conductor 91' will become grounded to guard the connector R against seizure, and the connector R will restore in the manner described, upon the called party at telephone A replacing the receiver on the switch-hook.

It, of course, will be understood that in commercial installations, the connections will often involve a mechanical trunk repeater, the object of which is to localize the battery supply; to repeat control impulses; to reverse the direction of current to its leading-in conductors to conform with the direction of current received from its leading-out conductors, and for other reasons. That is to say, the trunk repeater has a relay with windings corresponding to the windings of relay 15, intermediate of the said relay 15 and the calling station, which windings of relay 15 are not conductively related to the windings of the said relay in the repeater, and that the said latter windings will reciprocate their relation to the leading-in conductors thereto, depending upon such change with relation to the windings of relay 15 and its leading-in conductors. Repeaters of the stated type are well known in the art, however, such a repeater is shown in Fig. 4 of my U. S. Patent No. 1,678,503, granted July 24, 1928. A repeater of the stated type, if used would usually be introduced into the trunk intermediate of the first selector E' and second selector F'.

Assume that the accompanying sheets are assembled in accordance with Fig. 16, the trunk from the private automatic exchange thus terminating in a springjack TJ in the manual exchange in lieu of a lineswitch C' in the automatic exchange as was hereinbefore assumed. It will now be also assumed that Fig. 13 is introduced into the main element J in Fig. 4 as indicated by the section lines a and b, so the relay 446' will displace relay 446, and that conductor 343 leading from the winding of relay 446 is disassociated and the conductor leading from the winding of relay 446' attaches to conductor 445.

It will be observed that conductor 84' is related to the battery winding of line relay 150, by way of armature 151 on line-cut-off relay 152 and that conductor 83' is related to the battery winding of the relay 150 by way of armature 153 on the relay 152. In view of the foregoing descriptions, it is clear that relay 150 will not energize under the condition. However, if a call is initiated at telephone T⁸ and the trunk seized by connector M, in the manner as hereinbefore described, the relay 150 will be operatively energized as was the line relay of lineswitch C' when the trunk was seized by connector M in foregoing descriptions. Upon the relay 150 actuating, armature 155 will apply its ground to energize calling lamp 156. Due to relay 357 actuating incidental to the connector M seizing the trunk, the main element J will be caused to function on its normal level and seize the first set of bank contacts 805 to 808 in the manner before described, preparatory to completing the connection from the calling station T⁸ to the trunk via the main element J, in lieu of being directly connected to the trunk, upon the actuation of relay 365, which will occur upon the response being attained from the operator at the main exchange, as will appear presently, and in view of the foregoing descriptions.

Upon the operator at the main exchange observing the glowing of lamp 156, plug PA will be inserted into springjack TJ. A circuit can now be traced from grounded winding of relay 152, sleeve of plug PA, resistance 157 to the free terminal of supervisory lamp 158, the said lamp glowing and the relay 152 actuating to disassociate the line relay 150 and extinguish the lamp 156. It will now appear that ground is applied through the upper winding of the repeating coil 159 and tip conductor of plug PA to conductor 84', and that battery is applied through the lower winding of said repeating coil through shunted supervisory relay 160, sleeve of plug to conductor 83'. Current is maintained through the telephone T⁸, but in the reversed direction than primarily established involving the windings of relay 150, and due to the reversal of current projected over the trunk incidental to the insertion of the switching plug PA into springjack TJ, upon the operator responding, the relay 365 will operatively energize and cause relays 376, 377 and 367 to actuate in the manner as hereinbefore described when the current was reversed over the trunk in the out-going call from telephone T⁸ to telephone A, incidental to the party at telephone A responding. The main exchange being manual, the party at telephone T⁸ will not manipulate the calling device thereat, further than the sending of the digit "0", to attain connection with the trunk, it being the only directive calling device operation in making such a call. However, it will be manifest that since the circuits and equipments at the private automatic exchange are now in the same state as when the party at telephone A responded in the referred-to call (having in mind that relay 446' does not affect the operation so far as the private automatic exchange is concerned), the party at telephone T⁸ may forthwith manipulate the calling device thereat effective to passing the call through the auxiliary element K to telephone T⁹, for example. The operator at the main exchange may extend the connection to any called telephone, T¹² for example, through the agency of companion calling plug PC.

At the time plug PA was inserted into springjack TJ, relay 160 was energized, attracting its armature 161 to apply grounded battery through resistance 163 to the free terminal of lamp 158, causing the said lamp to extinguish, in the well known manner. If the party at telephone T⁸ in lieu of passing the connection to telephone T⁹, replaces the receiver on the switch-hook thereat, the plunger-arm 565 will operate in the manner as hereinbefore described, and in its predetermined period, cause the restoration of the shaft of the main element J to normal in the manner hereinbefore described, whereupon relays 376 and 377 will deactuate and open the traced circuit including the winding of supervisory relay 160 at the main exchange at armature 378, and in view of the fact that the lower winding of relay 745 became deenergized consequent to the restoration of the shaft of the main element J, and the further fact that relay 367 is locked, the upper winding of relay 745 is now deenergized, the relays 745 and 719 will deactuate in sequence consistent with their releasing periods, causing the connector M to be restored and the lineswitch N to be unseized in the manner as hereinbefore described.

At the time the main element J rotated off-normal consequent to the actuation of relay 357 incidental to the connector M seizing the trunk leading to the main exchange, ground was applied through off-normal spring 449 to conductor 448; this conductor being maintained grounded until the shafts of both main element J and auxiliary element K have been restored to normal, as has been set forth hereinbefore. Then, upon the operator at the main exchange inserting the plug PA into springjack TJ, causing relays 376, 377 and 367 in Fig. 3 to actuate, followed by the actuation of relays 435, 439 and 443 in the main element J, due to relay 435 becoming energized in the path including the receiver of the calling telephone T⁸, in the manner as hereinbefore described, conductor 445 will be grounded through armature 444 and therefore, the relay 446' will be actuated therefrom and locked through its lower armature to conductor 448. The actuation of relay 446' will short-circuit resistance $r^4$ at the lower armature of said relay 446', thus maintaining relay 160 in the switching cord-pair Q fully energized, it being understood that the relay 160 is marginally adjusted so that its armature 161 will retract if resistance $r^4$ is included in its energizing path. The calling party at telephone T⁸ is now related to the trunk leading to the switching cord-pair Q (with particular reference to the direction of current flow over the trunk conductors) as it was when the call was described as from telephone T⁸ to called telephone A in the main automatic exchange, and the party at telephone A had responded.

It will be clear that since the private automatic exchange main and auxiliary elements J and K are disposed as they were wherein a connection was described as extended from telephone T⁸ to telephone A in the main automatic exchange, the party at telephone T⁸ can pass the connection to telephone T⁹ and the party at telephone T⁹ can pass the connection to telephone T⁸', etc., as hereinbefore described.

Going back to the condition in the circuits at the time the party at telephone T⁸ replaced the receiver on the switch-hook thereat, in the last exampled call, relays 439 and 443 will deactuate, causing the stated operation of the plunger-arm 565 and the restoration of the shaft of the main element J to normal, which condition causes the ground to be removed from conductor 448, unlocking relay 446' and thereby introducing the resistance $r^4$ into the energizing circuit of relay 160 in the cord-pair Q, the armature 161 retracting to cause the lamp 158 to glow as a clearing signal, after which the plug PA may be withdrawn. Under the condition described last in which the plug PA is in springjack TJ, the upper winding of relay 403 is energized through the ground winding of the repeating coil 159 in the cord-pair, and the lower winding of relay 403 is energized through the battery winding of the said repeating coil. It will be understood in this connection, that relay 403 will derive enough current through resistance $r^4$, under the condition described, to operatively energize and maintain it, though relay 160 in the cord-pair will deactuate. Under this condition, relays 403 and 408 do not deactuate, and therefore, relay 377 does not unlock, which forestalls a false operation of the main element J on its normal level, and the attracted armature 356 will apply a busy ground to conductor 314 to guard the trunk against being seized for an outgoing connection by any of the connectors of the group containing M, until the operator withdraws plug PA. The inserted plug PA at the main exchange thus maintains the trunk guarded against intrusion at the private automatic exchange end until the said plug is withdrawn, so confusion by way of a new call being completed to the trunk before a previous connection is completely effaced is prevented.

In this connection, it will be understood that the resistance values of the windings of relay 403 are adapted to the special use, wherein the main exchange is manual, and may therefore, be higher than if used where the main exchange is automatic, as it may become by a change of plant.

Assume that it was desired to complete a connection to telephone T¹² after the operator answered the glowing of lamp 156. Plug PC would be inserted into spring jack TJ and ringing key RK depressed to apply signaling current from the generator G¹², effective to the signal device at telephone T¹². Then, upon the party at telephone T¹² responding by removing the receiver from the switch-hook thereat, a talking path will exist between telephone T⁸ and telephone T¹².

Assume that the operator at the main exchange withdraws the plug PA while the party at telephone T⁸ is still connected to the trunk through the main element J. The winding of relays 150 and 403 will be as normally related, so the relay 403 will deactuate and thereby cause the restoration of the shaft of main element J to normal. However, since relay 367 will remain locked until the connector M restores because relay 745 is now deenergized and will deactuate, the trunk line relay 150 will not actuate. Upon relay 367 deactuating, after the connector M restores, the trunk equipment at both ends thereof is at normal.

If the operator at the main exchange re-inserts the plug PA into springjack TJ thereafter, though the connector M has not had time to restore, the said call will cause the main element J to function normally and seize bank contacts 812 to 815, unaffected by the said seized condition of connector M.

Had the connection been passed and telephone T⁹ was connected through the auxiliary element K in lieu of telephone T⁸ through the main element J, if the party at telephone T⁹ replaced the receiver on the switch-hook, the auxiliary element K would restore forthwith, in the manner as hereinbefore described, causing the relay 446' to deactuate, and the lamp 158 to glow as a clearing signal to the main exchange operator. If the operator at the main exchange withdraws the plug AP before the party at telephone T⁹ replaced the receiver, the auxiliary element K will be restored because of the deactuation of relay 408, as described, whereupon the equipments of the trunk are at normal.

It will be manifest, in view of the descriptions, that the attendant can pass the connection through the agency of plug P⁶ under the stated conditions therefore, wherein the main exchange is manual in lieu of automatic, it being only required that a response shall have been attained on an outgoing call from the private automatic exchange or that the relay 408 be held actuated on an in-coming call. The conditions are satisfied when plug AP is in springjack TJ.

It is, of course, understood that the exampled system will be subject to modification in adapting it to meet the various requirements of commercial operation, all without departing from the scope of the present invention, in view of the subjoined claims.

What I claim as new and desire to secure by United States Letters Patent is:

1. In a telephone system, a trunk line terminating in an automatic selective switch, a manual switching plug and cooperating jack, a called line, means for directively operating the switch over the trunk line to effect a connection from the trunk line to the called line, and automatic means responsive to inserting the plug into the jack for causing the switch to operate to alternatively connect the trunk line with the jack.

2. In a telephone system, a trunk line terminating in an automatic selective switch, a called line accessible from the switch, a manual switching plug, a jack connected with the called line accessible from the plug, means for directively operating the switch over the trunk line to effect a connection from the trunk line to the called line, and automatic means responsive to inserting the plug into the jack for alternatively causing the switch to connect the trunk line through the plug and jack with the called line.

3. In a telephone system, a trunk line leading to an automatic switch, called lines, a plug-ending connecting cord, means for extending a connection from the trunk to a called line through the agency of the switch, means operated consequent upon connecting said plug-ending cord with a called line for disconnecting the said switch from the first called line connected therethrough, and automatic means made effective consequent to the said disconnection for operating the disconnected switch to extend the trunk through the said plug-ending cord to the last called line.

4. In a telephone system, a trunk line leading to an automatic switch, called lines, a plug-ending connecting cord, means for extending a connection from the trunk to a called line through the agency of the switch, means operated consequent upon connecting said plug-ending cord with a called line for disconnecting the said switch from the first called line connected therethrough, and automatic means made effective consequent to the said disconnection for thereupon operating the disconnected switch to extend the trunk through the said plug-ending cord to the last called line.

5. In a telephone system, a trunk line leading to an automatic switch, called lines, a plug-ending connecting cord, means for extending a connection from the trunk to a called line through the agency of the switch and thereupon signal upon the called line, means operated consequent upon connecting said plug-ending cord with a called line for disconnecting the said switch from the called line connected therethrough, and automatic means responsive to said disconnecting for then operating the disconnected switch to extend the trunk through the said plug-ending cord to the last called line and signal upon same.

6. In a telephone system, a trunk line leading to an automatic switch, called lines, a plug-ending connecting cord, means made operative consequent to seizing the trunk for automatically extending a connection from the trunk to a called line through the agency of the switch, means automatically operated consequent upon connecting said plug-ending cord with a called line for disconnecting the said switch from the called line connected therethrough, and automatic means operated responsive to said disconnecting for operating the disconnected switch to extend the trunk through the said plug-ending cord to the last called line.

7. In a telephone system, a trunk line leading to an automatic switch, called lines, a plug-ending connecting cord, means for step directively operating the said switch to extend a connection from the trunk through the switch to a desired called line and forthwith automatically apply signalling current to the called line responsive to effecting said connection to the called line, means automatically operated consequent upon connecting said plug-ending cord with a called line for disconnecting the said switch from the called line connected therethrough, and means responsive to said connecting for then automatically operating the disconnected switch to extend the trunk through the said plug-ending cord to the last called line and automatically signal upon same.

8. In a telephone system, a trunk line leading to an automatic switch, called lines, a plug-ending connecting cord, means for step directively operating the said switch to extend a connection from the trunk through the switch to a desired called line, means automatically operated consequent upon connecting said plug-ending cord with a called line for disconnecting the said switch from the called line connected therethrough, and automatic means operated responsive to said disconnecting for then operating the disconnected switch to extend the trunk through the said plug-ending cord to the last called line.

9. In a telephone system, a trunk line leading to an automatic switch having independently operating elements, called lines, a plug-ending connecting cord, means for step directively operating one of the elements from a last called line to extend a connection from the trunk to a further called line, means automatically operated consequent upon connecting said plug-ending cord with a called line for disconnecting the said element from the said further called line connected therethrough, and means thereupon automatically operated to cause one of said elements of the said switch to extend the trunk through the said plug-ending cord to the last said called line.

10. In a telephone system, a trunk line leading to an automatic switch having independently operative elements, called lines, a plug-ending connecting cord, means for directively operating one of the elements from a last called line to extend a connection from the trunk to a further called line, means operated consequent upon connecting said plug-ending cord with a called line for disconnecting the said element from the said further called line connected therethrough, and means thereupon operated to cause a pre-arranged one of said elements of the said switch to extend the trunk through the said plug-ending cord to the last said called line.

11. In a telephone system, a trunk line leading to an automatic switch having independently operative elements, called lines, a plug-ending connecting cord, means for directively operating one of said elements from a last called line connected through one of said elements to extend a connection from the trunk line to a called line so that the trunk line will be connected through each of two of said elements to two independently called lines to form a Y connection of the lines, means automatically operated consequent upon connecting the said plug-ending cord with a called line for disconnecting the said elements from the connected called lines, and means thereupon automatically operated to cause a pre-arranged one of said elements of the said switch to extend the trunk through the said plug-ending cord to the last said called line.

12. In a telephone system, a trunk line leading to an automatic switch having independently operative elements, called lines, a plug ending connecting cord, means for directively operating one of said elements from a last called line connected through another one of said elements to extend a connection from the trunk line to a called line and apply signaling current thereto, means for disconnecting the signaling current consequent upon a response being obtained on the last said called line, the trunk line being thus connected through each of said elements to two independently called lines, respectively, means automatically operated consequent upon connecting the said plug-ending cord with a called line for disconnecting the said elements from the connected called lines, means thereupon automatically operated to cause a pre-arranged element of the said switch to extend the trunk through the said plug-ending cord to the last said called line and signal upon same, and means manually controlled over the last said called line for disconnecting the signaling current.

13. In a telephone system, a trunk line leading to an automatic switch having independently operative elements, called lines, a plug ending connecting cord, means for directively operating one of said elements from a last called line connected through another one of said elements to extend a connection from the trunk line to a called line and apply signaling current thereto, means for disconnecting the signaling current consequent upon a response being obtained on the called line, the trunk line being thus connected through each of two said elements to an independently called line, respectively, means automatically operative consequent upon connecting the said plug-ending cord with a called line for disconnecting the said elements from the connected called lines, means then automatically operated to cause a pre-arranged element of the said switch to extend the trunk through the said plug-ending cord to the last called line and signal upon same, means manually controlled over the last called line for disconnecting the signaling current, and means controlled over the called line connected through the said plug-ending switching cord as a link for directively operating one of said elements to introduce a further called line into the connection.

14. In a telephone system, a trunk line leading to an automatic switch having independently operative elements, called lines, a plug ending connecting cord, means for directively operating one of said elements from a last called line connected through another one of said elements to extend a connection from the trunk line to a called line and apply signaling current thereto, means for disconnecting the signaling current upon a response being obtained on the called line, the trunk line being thus connected through each of said elements to an independently called line, respectively, means automatically operative consequent upon connecting the said plug-ending cord with a called line for disconnecting the said elements from the connected called lines, means thereupon automatically operated to cause a pre-arranged element of the said switch to extend the trunk through the said plug-ending cord to the last called line and signal upon same, means controlled over the last called line for disconnecting the signaling current, means controlled over the called line connected through the said plug-ending switching cord for directively operating one of said elements to introduce a further called line into the connection, and means on the called line connected through the plug as a link for disconnecting the last operated element from the last said called line.

15. In a telephone system, a trunk line leading to an automatic switch having independently operative elements, called lines, a plug-ending connecting cord, means for directively operating one of said elements from a last called line connected through another one of said elements to extend a connection from the trunk line to a called line and apply signaling current thereto, means for disconnecting the signaling current consequent upon a response being obtained on the called line, the trunk line being thus connected through each of two said elements to an independently called line, respectively, means automatically operative consequent upon connecting the said plug-ending cord with a called line for disconnecting the said elements from the connected called lines, means then automatically operated to cause a pre-arranged element of the said switch to extend the trunk through the said plug-ending cord to the last called line and signal upon same, means controlled over the last called line for disconnecting the signaling current, means controlled over the called line connected through the said plug-ending switching cord for directively operating one of said elements to introduce a further called line into the connection, means on the called line connected through the plug for disconnecting the connected element from the plug-ending cord, and means whereby the line with which the plug-ending cord is still connected may be normally used as if the said plug-ending cord were not connected with last said line after said disconnection.

16. In a telephone system, a trunk line leading to an automatic switch having independently operative elements, called lines, a plug-ending connecting cord, a supervisory signal device, means for directively operating one of said elements from a last called line connected through another one of said elements to extend a connection from the trunk line to a called line so that the trunk will be connected through each of said elements to an independently called line, respectively, means automatically operative consequent upon connecting the said plug-ending cord with a called line for disconnecting the said elements from the connected called lines, means thereupon automatically operated to cause an element of the said switch to extend the trunk through the said plug-ending cord to the last called line, means on the said last called line for disconnecting the element connected with the plug-ending cord, and means for displaying the signal device indicative that the latter said element has been disconnected.

17. In a telephone system, a trunk line having a linking switch at its far end and a selective switch at its near end, a calling line, called lines accessible from the said linking switch, called lines accessible from the said selective switch, means for initiating a call from the calling line and for extending it to the near end of the trunk line, means controlled from the calling line for extending the connection through the linking switch and directively therefrom to a first said called line, means automatically controlled consequent to the called line being seized for causing the said selective switch to automatically operate to hunt for and seize the calling line and disconnect it from the trunk line and then reconnect it thereto with the said selective switch introduced intermediate of the calling line and the trunk line, and means whereby the said selective switch can be forthwith directively operated from the calling line to extend a connection from the trunk line to a second said called line.

18. In a telephone system, a trunk line having a linking switch at its far end and a selective switch at its near end, a connector switch accessible from the linking switch, a calling line, called lines accessible through the connector, called lines accessible through the selective switch, means for initiating a call from the calling line and for directively extending it to the near end of the trunk line and through the linking switch and connector to a called line, means automatically controlled by the connector consequent to the connector seizing the called line for causing the selective switch to be introduced intermediate of the calling line and the trunk line, and means on the calling line for directively controlling the said introduced selective switch to introduce a called line accessible therefrom so the calling line, the called line reached through the connector and the called line reached through the selective switch are in telephonic relation in a Y connection wherein the trunk line is a link of one leg.

19. In a telephone system, a trunk line extending to a connector at its remote end and a selective switch at its near end, a calling line, called lines accessible from the connector and called lines accessible from the selective switch, means for initiating a call from the calling line and for directively extending it over the trunk line and through the connector to a called line, means automatically controlled by the connector consequent to the connector seizing the called line for causing the selective switch to be introduced intermediate of the calling line and the trunk line, and means on the calling line for directively controlling the selective switch to introduce a called line accessible therefrom so the calling line, the called line reached through the connector and the called line reached through the selective switch are in telephonic relation.

20. In a telephone system, a trunk line extending to a connector at its remote end and a selective switch at its near end, a calling line, called lines accessible from the connector and called lines accessible from the selective switch, means for initiating a call from the calling line and for directively extending it over the trunk line and through the connector to a called line, means automatically controlled by the connector consequent to the connector seizing the called line for causing the selective switch to be introduced intermediate of the calling line and the trunk line, means on the calling line for directively controlling the selective switch to introduce a called line accessible therefrom so the calling line, the called line reached through the connector and the called line reached through the selective switch are in telephonic relation, and means controlled from the called line reached through the connector for destroying the connection.

21. In a telephone system, a trunk line extending to a connector at its remote end and a selective switch at its near end, a calling line, called lines accessible from the connector and called lines accessible from the selective switch, means for initiating a call from the calling line and for directively extending it over the trunk line and through the connector to a called line, means automatically controlled by the connector for causing the selective switch to be introduced intermediate of the called line and the trunk line, means on the calling line for directively controlling the selective switch to introduce a called line accessible therefrom so the calling line, the called line reached through the connector and the called line reached through the selective switch are in telephonic relation, and means controlled from the calling line for destroying the connection.

22. In a telephone system, a trunk line extending to a connector at its remote end and a selective switch at its near end, a calling line, called lines accessible from the connector and called lines accessible from the selective switch, means for initiating a call from the calling line and for directively extending it over the trunk line and through the connector to a called line, means automatically controlled by the connector for causing the selective switch to be introduced intermediate of the called line and the trunk line, means on the calling line for directively controlling the selective switch to introduce a called line accessible therefrom so the calling line, the called line reached through the connector and the called line reached through the selective switch are in telephonic relation, and means controlled from the called line reached through the selective switch for destroying the connection.

23. In a telephone system, a calling and a called line, a trunk line having an electromagnetic device connected thereto susceptible to reversed current direction over the trunk line, when prolonged, a connector, means for initiating a call from the calling line and for directively extending the connection over the trunk and through the connector to the called line, means in the connector automatically operative for effecting a momentary reversal of current over the trunk line non-effective to the electro-magnetic device, and means in the connector which is manually controlled from the called line for effecting a prolonged reversal of current over the trunk line operatively effective to the electro-magnetic device.

24. In a telephone system, a calling and a called line, a trunk line having an electromagnetic device connected thereto susceptible to reversed current direction over the trunk line, when prolonged, a connector, means for initiating a call from the calling line and for directively extending the connection over the trunk and through the connector to the called line, means in the connector for effecting a momentary reversal of current over the trunk line non-effective to the electro-magnetic device, and means controlled from the called line for effecting a prolonged reversal of current over the trunk line operatively effective to the electro-magnetic device.

25. In a telephone system, a calling line, a trunk line leading to an automatic switch, called lines, a manual connecting cord, means controlled from the calling line for extending a connection from the calling line over the trunk line and through the switch to a first one of said called lines, means operated consequent to connecting the cord to a second one of said called lines for disconnecting the switch from the connection with the said first called line and for then automatically connecting the switch to the cord so that the calling line will then be connected with the said second called line wherein the switch and the cord are links of the connection.

26. In a telephone system, a calling line, a trunk line leading to an automatic switch, called lines, a manual connecting cord, means controlled from the calling line for extending a connection from the calling line over the trunk line and through the switch to a first one of said called lines and signal the line called, means operated consequent to connecting the cord to a second one of said called lines for disconnecting the switch from the connection with the said first called line and for then automatically connecting the switch to the cord and signal through the cord upon the said second called line so that the calling line will then be connected with the said second called line wherein the switch and the cord are links of the connection.

27. In a telephone system, a trunk line leading to an automatic switch, a first called line accessible from said switch under different operative conditions, a calling signal device corresponding to each said different operative conditions, each said signal device operated over a specific conductor auxiliary to the talking conductors of the called line, a second called line, a calling station, means for connecting the calling station to the trunk line and then extending the trunked connection to the said first called line, means for directively transferring the connection from the first called line to the second called line and then transferring the connection from the second called line to the first called line while maintaining the connection from the calling line to the trunk, and means whereby a different one of said signal devices will operate on the two said calls to the said first called line wherein one said call was a primary call and the other said call was a re-call.

28. In a telephone system, a trunk line leading to an automatic switch, a first called line accessible from said switch under different operative conditions, a calling signal device corresponding to each said different operative conditions, each said signal device operated over a specific conductor auxiliary to the talking conductors of the called line, a second calling line, a calling station, means for connecting the calling station to the trunk line and for then extending the trunked connection to the said first called line automatically consequent to the said calling station being connected to the trunk, means for directively transferring the connection from the first called line to the second called line and for disconnecting the first called line, means for then transferring the connection from the second called line to the first called line, and means whereby a different one of said signal devices will operate on the two said calls to the said first called line wherein one said call was a primary call and the other said call was a re-call.

29. In a telephone system, a calling station, a trunk line, an automatic switch, first and second called lines, means for connecting the calling station to the trunk line to cause the switch to extend the connection to the first called line automatically consequent to effecting the first said connection, means for directively transferring the trunked connection from the said first line to the said second line, means for directively transferring the connection from the said second line to the said first line, and means dependent upon the call being automatically extended to the said first line or directively extended thereto for operating one or the other of the said signal devices.

30. In a telephone system, an automatic switch, a pair of leading-in talking conductors connected to corresponding terminals of the switch, a called line accessible from the switch, means for controlling the switch for setting it into connection with the called line, and means for reciprocating the relationship of the conductors of said pair with respect to the said terminals consequent upon the said connection being established.

31. In a telephone system, an automatic switch, a pair of leading-in talking conductors connected to corresponding terminals of the switch, a called line accessible from the switch, means for controlling the switch for setting it into connection with the called line, the said control being over the leading-in conductors, and means for reciprocating the relationship of the conductors of said pair with respect to the said terminals consequent upon the said connection being established.

32. In a telephone system, an automatic switch, a pair of leading-in talking conductors connected to corresponding terminals of the switch, a called line accessible from the switch, means for controlling the switch for setting it into connection with the called line, and means for momentarily reciprocating the relationship of the conductors of said pair with respect to the said terminals consequent upon the said connection being established.

33. In a telephone system, an automatic switch, a pair of leading-in talking conductors connected to corresponding terminals of the switch, a called line accessible from the switch, means for controlling the switch for setting it into connection with the called line, and means for reciprocating the relationship of the conductors of said pair with respect to the said terminals and then automatically restoring the relationship to that normally existing consequent upon the said connection being established.

34. In a telephone system, an automatic switch, a pair of leading-in talking conductors connected to corresponding terminals of the switch, a called line accessible from the switch, means for controlling the switch for setting it into connection with the called line, means for reciprocating the relationship of the conductors of the said pair with respect to the said terminals consequent upon the said connection being established, and means made operative consequent to the said reciprocation for automatically restoring the said relationship.

35. In a telephone system, an automatic switch, a pair of leading-in talking conductors connected to corresponding terminals of the switch, a line relay including a source of current connected to the said terminals, a called line accessible from the switch, means for controlling the switch for setting it into connection with the called line, means for reciprocating the connection of the line relay relative to the terminals so current from the said source will traverse the leading-in conductors in reversed direction consequent upon setting the switch into connection with the called line.

36. In a telephone system, an automatic switch, a pair of leading-in talking conductors connected to corresponding terminals of the switch, a line relay including a source of current connected to the said terminals, a called line accessible from the switch, means for controlling the switch over the leading-in pair for setting it into connection with the called line, means for momentarily reciprocating the connection of the line relay relative to the terminals so current from the said source will traverse the leading-in conductors in reversed direction consequent upon setting the switch into connection with the called line.

37. In a telephone system, an automatic switch, a pair of leading-in talking conductors connected to corresponding terminals of the switch, a line relay including a source of current connected to the said terminals, a called line accessible from the switch, means for controlling the switch for setting it into connection with the called line, means for reciprocating the connection of the line relay relative to the terminals so current from the said source will traverse the leading-in conductors in reversed direction consequent upon setting the switch into connection with the called line, and means made operative consequent to the said reciprocation for automatically restoring the said relationship.

38. In a telephone system, an automatic switch, a pair of leading-in talking conductors connected to corresponding terminals of the switch, a line relay including a source of current connected to the said terminals, a called line accessible from the switch, means for controlling the switch for setting it into connection with the called line, means for reciprocating the connection of the line relay relative to the terminals so current from the said source will traverse the leading-in conductors in reversed direction consequent upon setting the switch into connection with the called line, means made operative consequent to the said reciprocation for automatically restoring the said relationship, and means manually controlled from the called line for again reciprocating the connection of the line relay.

39. In a telephone system, an automatic switch, a pair of leading-in talking conductors connected to corresponding terminals of the switch, a line relay including a source of current connected to the said terminals, a called line accessible from the switch, means for controlling the switch for setting it into connection with the called line, means for reciprocating the connection of the line relay relative to the terminals so current from the said source will traverse the leading-in conductors in reversed direction consequent upon setting the switch into connection with the called line, means made operative consequent to the said reciprocation for automatically restoring the said relationship, and means manually controlled from the called line for again reciprocating the connection of the line relay and for maintaining the latter said reciprocated connection.

40. In a telephone system, an automatic switch, a pair of leading-in talking conductors connected to corresponding terminals of the switch, a line relay including a source of current connected to the said terminals, called lines of a plurality of classes accessible from the switch, means for controlling the switch for setting it into connection with a called line belonging to any of said plurality of classes, means for momentarily reciprocating the connection of the line relay relative to the terminals so the current from the said source will traverse the said leading-in conductors in reversed direction consequent upon setting the switch into connection with the called line, and means manually controlled from the called line of a specific one of said classes but not of any other class for again reciprocating the connection of the line relay.

41. In a telephone system, an automatic switch, a pair of leading-in talking conductors connected to corresponding terminals of the switch, a line relay including a source of current connected to the said terminals, called lines of two classes accessible from the switch, means for controlling the switch for setting it into connection with a line of either of said classes, means for momentarily reciprocating the connection of the line relay relative to the terminals so the current from the said source will traverse the said leading-in conductors in reversed direction consequent upon setting the switch into connection with the called line, and means manually controlled from the called line if the connection is to a called line of a specific class and not controlled if the call is to a called line of the other class for again reciprocating the connection of the line relay.

42. In a telephone system, an automatic switch, a pair of leading-in talking conductors connected to corresponding terminals of the switch, a line relay including a source of current connected to the said terminals, called lines of two classes accessible from the switch, means for controlling the switch over the said pair for setting it into connection with a line of either of said classes, means for momentarily reciprocating the connection of the line relay relative to the terminals so the current from the said source will traverse the said leading-in conductors in reversed direction consequent upon setting the switch into connection with the called line, and means manually controlled from the called line if the connection is to a called line of a specific class and not controlled if the call is to a called line of the other class for again reciprocating the connection of the line relay.

43. In a telephone system, a trunk line having a linking switch at its far end and a finder switch at its near end, a calling line, lines accessible through the said linking switch, means for initiating a call from the calling line and for extending it to the near end of the trunk line, means controlled from the calling line for directively extending the connection through the linking switch to a called one of said lines, means automatically controlled consequent to the called line being seized for causing the said finder switch to automatically operate and seize the calling line and disconnect it from the trunk line and then reconnect it thereto with the said finder switch introduced intermediate of the calling line and the trunk line.

44. In a telephone system, a trunk line having a linking switch at its far end and a finder switch at its near end, a calling line, lines accessible through the said linking switch, means for initiating a call from the calling line and for extending it to the near end of the trunk line, means for directively extending the connection through the linking switch to a called one of said lines, means automatically controlled consequent to the called line being seized for causing the said finder switch to automatically operate and seize the calling line and disconnect it from the trunk line and then reconnect it thereto with the said finder switch introduced intermediate of the calling line and the trunk line.

45. In a telephone system, a trunk line having an automatic switch at the near and far ends respectively, a first called line reached through the switch at the said far end and a second called line reached through the switch at the said near end, a calling line, means for directively connecting the calling line with the trunk line and for thereafter directively extending the connection from the trunk line to the first called line by said switch at the far end, and means for then directively extending the connection from the trunk line to the second called line by said switch at the near end before a response is obtained on the first called line.

46. In a telephone system, a trunk line having an automatic switch at the near and far ends respectively, a first called line reached through the switch at the said far end and a second called line reached through the switch at the said near end, a calling line, means for directively connecting the calling line with the trunk line controlled from the calling line and for thereafter directively extending the connection from the trunk line to the first called line by said switch at the far end, and means for then directively extending the connection from the trunk line by said switch at the near end to the second called line before a response is obtained on the first called line.

47. In a telephone system, a trunk line having an automatic switch at the near and far ends respectively, a first called line reached through the switch at the said far end and a second called line reached through the switch at the said near end, a calling line, means for directively connecting the calling line with the trunk line and for thereafter directively extending the connection from the trunk line to the first called line by said switch at the far end, and means for then directively extending the connection from the trunk line to the second called line by said switch at the near end before a response is obtained on the first called line wherein all the said directive control is over the calling line.

48. In a telephone system, a trunk line having an automatic switch at the near and far ends respectively, a first called line reached through the switch at the said far end and a second called line reached through the switch at the said near end, a calling line, means for directively connecting the calling line with the trunk line and for thereafter directively extending the connection from the trunk line to the first called line by said switch at the far end, and means for then directively extending the connection from the trunk line to the second called line by said switch at the near end before a response is obtained on the first called line wherein all the said directive control is over the calling line whereby a Y connection will exist between the calling and said called lines, the trunk line being a link of one branch thereof.

49. In an automatic telephone system, a trunk line, a calling line, a first and a second switch mechanism on the near and remote ends of the trunk line respectively, first and second called lines accessible from the switch mechanism respectively, means for directively connecting the calling line to the near end of the trunk line and for then directively operating the second switch mechanism to extend the calling line to the second called line, and means made operative consequent to the said operation of the said second switch mechanism for enabling the said first switch mechanism to be directively controlled from the calling line to extend a connection from the trunk line to the said first called line whereby a Y connection will exist between the calling and first and second called lines regardless of any manual control from the said second called line.

50. In an automatic telephone system, a trunk line, a calling line, a first and a second switch mechanism on the near and remote ends of the trunk line respectively, first and second called lines accessible from the switch mechanism respectively, means for directively connecting the calling line to the near end of the trunk line controlled from the calling line and for then directively operating the second switch mechanism from the calling line to extend the calling line to the second called line, and means made operative consequent to the said operation of the said second switch mechanism for enabling the said first switch mechanism to be directively controlled from the calling line to extend a connection from the trunk line to the said first called line whereby a Y connection will exist between the calling and first and second called lines regardless of any manual control from the said second called line.

51. In a telephone system, a trunk line having a switch mechanism at the near end comprising two linking elements, a switch mechanism at the far end of the trunk, called lines, means for connecting the calling line to the near end of the trunk line directively controlled over the talking conductors of the calling line, means for operating the switch mechanism at the far end of the trunk line to extend the connection from the trunk line to a called line controlled over the talking conductors of the calling line, means responsive to effecting the connection to the said called line for including one of said linking elements in the said extended connection intermediate of the calling line and the trunk line, and means made effective consequent to the said including of the said linking element for enabling the call to be directively extended under directive control over the talking conductors of the calling line to include a second called line in a Y connection with the calling and first called line wherein the other one of said two linking elements is a link of the connection and wherein manual control over the first line called is not essential.

52. In a telephone system, an automatic switch, a leading-in trunk to the switch, a current source for application to the trunk, a relay operated for altering the flow of current on the trunk, a called line, means for operating the switch to set it into connection with the called line, means for momentarily operating the relay and restoring it consequent to the switch being set into connection with the called line, and means controlled manually from the called line for again operating the relay.

53. In a telephone system, an automatic switch, a leading-in trunk to the switch, a current source for application to the trunk, a relay operated for altering the flow of current on the trunk, a called line, means for operating the switch to set it into connection with the called line, means for momentarily operating the relay and restoring it consequent to the switch being set into connection with the called line, and means controlled manually from the called line for again operating the relay and for maintaining it operated.

54. In a telephone system, an automatic switch, a leading-in trunk to the switch, a current source for application to the trunk, a relay operated for altering the flow of current on the trunk, called lines of two classes, means for operating the switch to set it into connection with a called line of either of said classes, means for momentarily operating the relay and restoring it consequent to the switch being set into connection with the called line, and means controlled manually from the called line for again operating the relay dependent upon the switch being set upon a line of a specific one of said classes.

55. In a telephone system, an automatic switch, a leading-in trunk to the switch, a current source for application to the trunk, a relay operated for altering the flow of current on the trunk, called lines of a plurality of classes, means for operating the switch to set it into connection with a called line of any of said classes, means for momentarily operating the relay and restoring it consequent to the switch being set into connection with the called line, and means controlled manually from the called line for again operating the relay dependent upon the switch being set upon a line of a specific one of said classes.

56. In a telephone system, an automatic switch, a pair of leading-in talking conductors connected to corresponding terminals of the switch, a line relay including a source of current connected to the said terminals, called lines of a plurality of classes accessible from the switch, means for controlling the switch for setting it into connection with a called line belonging to one of said plurality of classes, means for momentarily reciprocating the connection of the line relay relative to the terminals so the current from the said source will traverse the said leading-in conductors in reversed direction consequent upon setting the switch into connection with the called line, and means manually controlled from the called line of a specific one of said classes, but not of any other class for again reciprocating the connection of the line relay.

57. In a telephone system, an automatic switch, a pair of leading-in talking conductors connected to corresponding terminals of the switch, a line relay including a source of current connected to the said terminals, called lines of a plurality of classes accessible from the switch, means for controlling the switch over the said leading-in conductors for setting it into connection with a called line belonging to one of said plurality of classes, means for momentarily reciprocating the connection of the line relay relative to the terminals so the current from the said source will traverse the said leading-in conductors in reversed direction consequent upon setting the switch into connection with the called line, and means manually controlled from the called line of a specific one of said classes, but not of any other class for again reciprocating the connection of the line relay.

58. In a telephone system, a trunk line having a linking switch at its far end and a selective switch at its near end, a connector switch accessible from the linking switch, a calling line, called lines accessible through the connector, called lines accessible through the selective switch, means for initiating a call from the calling line and for directively extending it to the near end of the trunk line and through the linking switch and connector to a called line, means automatically controlled by the connector for causing the selective switch to be introduced intermediate of the calling line and the trunk line, and means on the calling line for directively controlling the said introduced selective switch to introduce a called line accessible therefrom so the calling line and the called line reached through the selective switch are in telephonic relation in a Y connection wherein the trunk line is included in one leg.

59. In a telephone system, a trunk line extending to a connector at its remote end and a selective switch at its near end, a calling line, called lines accessible from the connector and called lines accessible from the selective switch, means for initiating a call from the calling line and for directively extending it over the trunk line and through the connector to a called line, means automatically controlled by the connector for causing the selective switch to be introduced intermediate of the calling line and the trunk line, means on the calling line for directively controlling the selective switch to introduce a called line accessible therefrom so the calling line, the called line reached through the connector and the called line reached through the selective switch are in telephonic relation, and means controlled from the called line reached through the connector for destroying the connection.

60. In a telephone system, a trunk line extending to a connector at its remote end and a selective switch at its near end, a calling line, called lines accessible from the connector and called lines accessible from the selective switch, means for initiating a call from the calling line and for directively extending it over the trunk line and through the connector to a called line, means automatically controlled by the connector for causing the selective switch to be introduced intermediate of the called line and the trunk line, means on the calling line for directively controlling the selective switch to introduce a called line accessible therefrom so the calling line, the called line reached through the connector and the called line reached through the selective switch are in telephonic relation, and means controlled from any line of the connection for destroying the connection.

61. In a telephone system, a trunk line, a first switch mechanism terminating the near end of the trunk line, a second switch mechanism terminating the far end of the trunk line, a calling line, a called line, means directively controlled over the calling line for connecting the calling line with the trunk line and for then operating the said second switch mechanism to extend a connection to the called line, and means automatically controlled by the said second switch mechanism for establishing an alternative connection from the trunk line through the said first switch mechanism to the calling line without causing an effective lapse of connection between the calling line and the trunk line.

62. In a telephone system, a trunk line, a first switch mechanism terminating the near end of the trunk line, a second switch mechanism terminating the far end of the trunk line, a calling line, a called line, means directively controlled over the calling line for connecting the calling line with the trunk line and for then operating the said second switch mechanism to extend a connection to the called line, and means automatically controlled by the said second switch mechanism for establishing an alternative connection from the trunk line through the said first switch mechanism to the calling line without destroying the progressed call.

63. In a telephone system, a trunk line, a first switch mechanism terminating the near end of the trunk line, a second switch mechanism terminating the far end of the trunk line, a first called line accessible from the said first switch mechanism, a second called line accessible from the second switch mechanism, means controlled over the calling line for connecting the calling line with the trunk line and for then directively step operating the said second switch mechanism to extend a connection to the second called line, and means automatically controlled by the said second mechanism for establishing an alternative connection from the trunk line through the said first switch mechanism to the calling line without destroying the progressed call and for transferring the calling station directive step control of the said second mechanism from the latter said mechanism to the said first mechanism whereby the calling station is in directive step control of the said first mechanism for operation to extend a connection to the said first called line, whereby a Y connection will exist between the calling line and the said first called line branched from the trunk line extended to the said second called line.

64. In a telephone system, a trunk line, a first switch mechanism terminating the near end of the trunk line, a second switch mechanism terminating the far end of the trunk line, first and third called lines accessible from the said first switch mechanism, a second called line accessible from the second switch mechanism, means controlled over the calling line for connecting the calling line with the trunk line and for then directively step operating the said second switch mechanism to extend a connection to tne second called line, means automatically controlled by the said second mechanism for establishing an alternative connection from the trunk line through the said first switch mechanism to the calling line without destroying the progressed call and for transferring the calling station directive step control of the said second mechanism from the latter said mechanism to the said first mechanism whereby the calling station is in directive step control of the said first mechanism for operation to extend a connection to the said first called line, whereby a Y connection will exist between the calling line and the said first called line branched from the trunk line extended to the said second called line, and means whereby directive step control of the said first mechanism can be effected from the said first called line to thereafter substitute the said third called line for the said calling line in a Y connection without destroying the call to the said second called line.

65. In a telephone system, a trunk line, a first switch mechanism terminating the near end of the trunk line, a second switch mechanism terminating the far end of the trunk line, first and third called lines accessible from the said first switch mechanism, a second called line accessible from the second switch mechanism, means controlled over the calling line for connecting the calling line with the trunk line and for then directively step operating the said second switch mechanism to extend a connection to the second called line, means automatically controlled by the said second mechanism for establishing an alternative connection from the trunk line through the said first switch mechanism to the calling line without destroying the progressed call and for transferring the calling station directive step control of the said second mechanism from the latter said mechanism to the said first mechanism whereby the calling station is in directive step control of the said first mechanism for operation to extend a connection to the said first called line, whereby a Y connection will exist between the calling line and the said first called line branched from the trunk line extended to the said second called line, and means whereby directive step control of the said first mechanism can be effected from the said calling line to thereafter substitute the said third called line for the said first called line in a Y connection without destroying the call to the said second called line.

66. In a telephone system, a trunk line, a first switch mechanism terminating the near end of the trunk line, a second switch mechanism terminating the far end of the trunk line, a first called line accessible from the said first switch mechanism, a second called line accessible from the second switch mechanism, means controlled over the calling line for connecting the calling line with the trunk line and for then directively step operating the said second switch mechanism to extend a connection to the second called line, means automatically controlled by the said second mechanism for establishing an alternative connection from the trunk line through the said first switch mechanism to the calling line without destroying the progressed call and for transferring the calling station directive step control of the said second mechanism from the latter said mechanism to the said first mechanism whereby the calling station is in directive step control of the said first mechanism for operation to extend a connection to the said first called line, whereby a Y connection will exist between the calling line and the said first called line branched from the trunk line extended to the said second called line, and means controlled from either the calling or the first called line for destroying the connection between all the said lines.

67. In a telephone system, a trunk line, a first switch mechanism terminating the near end of the trunk line, a second switch mechanism terminating the far end of the trunk line, a first called line accessible from the said first switch mechanism, a second called line accessible from the second switch mechanism, means controlled over the calling line for connecting the calling line with the trunk line and for then directively step operating the said second switch mechanism to extend a connection to the second called line, means automatically controlled by the said second mechanism for establishing an alternative connection from the trunk line through the said first switch mechanism to the calling line without destroying the progressed call and for transferring the calling station directive step control of the said second mechanism from the latter said mechanism to the said first mechanism whereby the calling station is in directive step control of the said first mechanism for operation to extend a connection to the said first called line, whereby a Y connection will exist between the calling line and the said first called line branched from the trunk line extended to the said second called line, and means controlled from a called line for destroying the connection between all the said lines.

68. In a telephone system, a trunk line, a first switch mechanism terminating the near end of the trunk line, a second switch mechanism terminating the far end of the trunk line, a first called line accessible from the said first switch mechanism, a second called line accessible from the second switch mechanism, means controlled over the calling line for connecting the calling line with the trunk line and for then directively step operating the said second switch mechanism to extend a connection to the second called line, means automatically controlled by the said second mechanism for establishing an alternative connection from the trunk line through the said first switch mechanism to the calling line without destroying the progressed call and for transferring the calling station directive step control of the said second mechanism from the latter said mechanism to the said first mechanism whereby the calling station is in directive step control of the said first mechanism for operation to extend a connection to the said first called line, whereby a Y connection will exist between the calling line and the said first called line branched from the trunk line extended to the said second called line, and means controlled from any said line to the Y connection for destroying the connection between all the said lines.

69. In a telephone system, a trunk line, a calling line, a first connecting means for connecting the calling line with the near end of the trunk line, a called line reached from the far end of the trunk line through switch mechanism directively controlled from the calling line, a second connecting means for connecting the near end of the trunk line with the calling line, and other means controlled over the trunk line automatically by the said switch mechanism for effectively operating the second means and for breaking down the connection established by the first means.

70. In a telephone system, a called trunk line, a calling subscriber line, a first connecting means operated over the calling line for connecting the calling line with the trunk line, a second connecting means for connecting the trunk line with the calling line, and self operating means in the said second connecting means operated over the trunk line for breaking down the connection established by the first means.

71. In a telephone system, a called trunk line, a calling subscriber line, a first connecting means operated over the calling line for connecting the calling line with the trunk line, a second connecting means for connecting the trunk line with the calling line, and self operating means in the said second connecting means operated over the trunk line for breaking down the connection established by the first means and for operating the said second means.

72. In a telephone system, a trunk line, a pair of switch elements terminating the trunk line, called lines accessible from the said elements, a signal device companion to a first one of said called lines and non-companion to the trunk line, means for extending a connection from the trunk line through a first one of said elements to said first one of said called lines, means operated over the connected said first called line for operating the second said element to extend a connection to a second of said called lines forming a Y connection between the trunk line and the said first and second called lines, means for operating the signal device, and means controlled over said second called line for effacing the operated state of the signal device.

73. In a telephone system, a trunk line, a pair of switch elements terminating the trunk line, called lines accessible from the said elements, a signal device companion to a first one of said called lines and non-companion to the trunk line, means for extending a connection from the trunk line through a first one of said elements to said first one of said called lines, means operated over the connected said first called line for operating the second said element to extend a connection to a second of said called lines forming a Y connection between the trunk line and the said first and second called lines, means for operating the signal device, and means controlled over said second called line for effacing the operated state of the signal device and for disconnecting said first element from said first called line.

74. In a telephone system, a trunk line, switch mechanism terminating the trunk line, called lines accessible from the switch mechanism, a signal device companion to a first one of said called lines and non-companion to the trunk line, means for extending a connection from the trunk line through said switch mechanism to said first one of said called lines, means for responding on said called line by closing a circuit path by a manually operated switch to effect a talking relation between the trunk line and said called line, means operated over the connected said called line for operating the switch mechanism to extend a connection to a second one of said called lines, means for restoring said operated manual switch without destroying the said connection to said second called line, means for operating the signal device, and means for responding on said second called line by closing a circuit path by a manually operated switch to effect a talking relation between the trunk line and said second called line and for destroying the said connection to said first called line and for effacing the operated state of the said signal device.

75. In a telephone system, a trunk line, switch mechanism terminating the trunk line, called lines accessible from the switch mechanism, a signal device companion to a first one of said called lines and non-companion to the trunk line, means for extending a connection from the trunk line through said switch mechanism to said first one of said called lines, means for responding on said called line by closing a circuit path by a manually operated switch to effect a talking relation between the trunk line and said called line, means operated over the connected said called line for operating the switch mechanism to extend a connection to a second one of said called lines, means for restoring said operated manual switch without destroying the said connection to said second called line, means for operating the signal device, means for responding on said second called line by closing a circuit path by a manually operated switch to effect a talking relation between the trunk line and said second called line and for destroying the said connection to said first called line and for effacing the operated state of the said signal device, means for re-responding on said first called line before the response occurs on said second called line to prevent the response on the said second called line from destroying first said connection, means operated over the first called line for destroying the connection to said second called line, and means operated over said first called line for at will re-operating said switch mechanism into connection with another of said called lines in lieu of said second called line.

76. In a telephone system, a trunk line, a pair of automatic switches terminating the trunk line, a called line accessible to each of said switches, means for operating the switches into coincident connection with the called lines to form a Y connection of said trunk line and called lines, an energized holding circuit in series with a talking conductor of one of said called lines, a signal device on last said called line held operated dependent upon the holding circuit remaining energized, a manual switch on the other of said called lines for closing a holding circuit including a talking conductor of the last said called line, and means responsive to last said holding circuit becoming closed for disconnecting first said holding circuit from the connection and for effacing the operated state of the signal device.

77. In a telephone system, a trunk line, automatic switch mechanism terminating the trunk line, two called lines accessible from the said switch mechanism, means for automatically operating said switch mechanism into coincident connection with said called lines to form a Y connection of said trunk line and called lines, an energized holding circuit including a relay winding in series with a talking conductor of one of said called lines, a signal device in a local circuit of the relay held operated dependent upon the holding circuit remaining energized, a manual switch on the other of said called lines for closing another holding circuit including a talking conductor of the last said called line, and means responsive to last said holding circuit becoming closed for disconnecting first said holding circuit from the connection and for effacing the operated state of the signal device.

78. In a telephone system, an automatic switch, a trunk line leading-in to the switch, a called line, means for operating the switch into connection with the called line, a holding circuit for connection to said trunk line to maintain the switch operated, and automatic means controlled over the called line for opening the holding circuit and for transferring said maintaining of the switch from the trunk line to the called line.

79. In a telephone system, an automatic switch, a trunk line leading-in to the switch, a called line, means for operating the switch into connection with the called line, a holding circuit for connection to said trunk line automatically responsive to the switch connecting to the called line to maintain the switch operated, and automatic means controlled over the called line for opening the holding circuit and for transferring said maintaining of the switch from the trunk line to the called line.

80. In a telephone system, an automatic switch, a trunk line leading-in to the switch, a called line, means for operating the switch into connection with the called line, a holding circuit for connection in bridge between the talking conductors of said trunk line automatically responsive to the switch connecting the called line to maintain the switch operated, and automatic means controlled over the called line for opening the holding circuit and for transferring said maintaining of the switch from the trunk line to the called line.

81. In a telephone system, an automatic switch, a trunk line leading-in to the switch, a called line, means for operating the switch into connection with the called line, a holding circuit for connection to the trunk line to maintain the switch operated, current traversing the trunk line, means for reversing the direction of current traversing the trunk line to effect said connection of the holding circuit to the trunk line, and means responsive to closing a circuit of the called line for again reversing the current traversing the trunk line for disconnecting the holding circuit.

82. In a telephone system, an automatic switch, a trunk line leading-in to the switch, a called line, means for operating the switch into connection with the called line, a holding circuit for connection to the trunk line to maintain the switch operated, current traversing the trunk line, means for reversing the direction of current traversing the trunk line to effect said connection of the holding circuit to the trunk line, and means responsive to closing a circuit of the called line for again reversing the current traversing the trunk line for disconnecting the holding circuit and for transferring said maintaining of the switch from the holding circuit to the called line.

83. In a telephone system, an automatic switch, lines accessible from the switch, a leading-in line to the switch, current traversing the leading-in line, automatic means for operating the switch over the leading-in line to select one of said lines, and means responsive to selecting a said line for reversing the direction of current traversing the leading-in line.

84. In a telephone system, an automatic switch, lines accessible from the switch, a leading-in line to the switch, current traversing the leading-in line, a relay on the leading-in line remote from the switch energized by said currrent, means for operating the relay responsive to changing the direction of current flow over the leading-in line, automatic means for operating the switch over the leading-in line to select one of said lines, and means responsive to selecting a said accessible line for reversing the direction of current traversing the leading-in line and for thereby operating the relay.

85. In a telephone system, an automatic switch, lines accessible from the switch, a leading-in line to the switch, current traversing the leading-in line, a relay on the leading-in line remote from the switch energized by said current, means for operating the relay responsive to changing the characteristic of the current, automatic means for step by step directively operating the switch over the leading-in line, and means responsive to selecting a said accessible line for changing the characteristic of the current and for thereby operating the relay.

86. In a telephone system, an automatic switch, a pair of leading-in talking line conductors for the switch, a line relay of the switch, a source of current, the line conductors the winding of the relay and the source of current being in series, a called line accessible from the switch, automatic means for operating the relay over a said line conductor, means for operating the switch into connection with the called line responsive to the said operation of the relay, and means for reversing the direction of current traversing the leading-in line conductors responsive to effecting said connection.

87. In a telephone system, an automatic switch, a pair of leading-in talking line conductors for the switch, a line relay for the switch, a source of current, the line conductors the winding of the relay and the source of current being in series, a called line accessible from the switch, automatic means for operating the relay over a said line conductor, means for operating the switch into connection with the called line responsive to the said operation of the relay, and means for reversing the direction of current traversing the leading-in line conductors but not the current traversing said winding responsive to effecting said connection.

88. In a telephone system, an automatic switch, a called line accessible from the switch, a trunk line leading-in to the switch, a visual signal device on the trunk line, means for automatically operating the switch into connection with the called line, and automatic means self controlled by the switch and applied over a talking conductor of the trunk line for operating the signal device responsive to the switch seizing the called line.

89. In a telephone system, an automatic switch, a called line accessible from the switch, a trunk line leading-in to the switch, a relay connected to the trunk line, means for sending impulses over a talking conductor of the trunk line to operate the switch into connection with the called line, and automatic means self controlled by the switch and applied over a talking conductor of the trunk line for operating the relay responsive to the switch seizing the called line.

90. In a telephone system, an automatic switch, a called line accessible from the switch, a trunk line leading-in to the switch, a relay connected to the trunk line, means for sending impulses out over the trunk line into the switch to operate the switch step by step directively in accordance with the number of said impulses and the rate of sending certain ones of them, and automatic means self controlled by the switch and applied over a talking conductor of the trunk line for operating the relay responsive to the switch seizing the called line.

91. In a telephone system, an automatic switch, a called line accessible from the switch, a trunk line leading-in to the switch, a relay connected to the trunk line, means for sending impulses out over a talking conductor of the trunk line into the switch for directively operating the switch into selective relation with the called line, means for barring the selected called line against seizure if busy, means for causing the selected called line to be connected with by the switch if idle, and automatic means self controlled by the switch and applied over a talking conductor of the trunk line for operating the relay responsive to the switch connecting with the called line.

92. In a telephone system, an automatic switch, a called line accessible from the switch, a trunk line leading-in to the switch, a signal device connected to the trunk line, means for sending impulses out over a talking conductor of the trunk line into the switch for directively operating the switch into selective relation with the called line, means for barring the selected called line against seizure if busy, means for causing the selected called line to be connected with by the switch if idle, and automatic means self controlled by the switch and applied over a talking conductor of the trunk line for operating the signal device responsive to the switch connecting with the called line to apprise of the said connected condition.

93. In a telephone system, a calling station, a trunk line, an automatic switch terminating the trunk line, a called line accessible from the switch, signal devices for the called line, a calling device for the trunk line, means responsive to only connecting the calling station to the trunk line for causing the switch to hunt for and effect a connection to the called line and operate a first one of said signal devices, means for disconnecting the switch from connection with the called line without disconnecting the calling station from the trunk line, and automatic means directively operated over the trunk line by the calling device for setting the switch in connection with the called line and operate another of said signal devices whereby depending upon if the called line is connected through the switch the first time or a subsequent time while maintaining the calling station connected with the trunk line will determine which said signal device will be operated.

94. In a telephone system, a trunk line, an automatic switch terminating the trunk line, a called line accessible from the switch operating as a non-numerical switch and also when alternatively operating as a numerical switch, two signal devices on the called line, means controlled over the trunk for causing the switch to operate as a non-numerical switch and also to operate as a numerical switch to effect alternative connection with the called line, and means dependent upon which said operation the switch effects in connecting with the called line for determining which said signal device will be operated responsive to effecting the connection.

95. In a telephone system, a trunk line, an automatic switch terminating the trunk line, a called line accessible from the switch operating as a non-numerical switch and also when alternatively operating as a numerical switch, signal apparatus on the called line, means controlled over the trunk line for causing the switch to operate as a non-numerical switch and also as a numerical switch to effect alternative connection with the called line, and means dependent upon which said operation the switch effects in connecting with the called line for determining the character of signal effected by said signal apparatus.

96. In a telephone system, a trunk line, an automatic switch mechanism terminating the trunk line, a called line accessible from the switch mechanism, a signal apparatus on the called line, means for initiating a call on the calling line, means controlled over the trunk line for causing the switch mechanism to operate to initially connect with the called line, automatic means for disconnecting said connection, means for again effecting connection with the called line while maintaining the said initiation of the call, and means dependent upon whether the connection to the called line by the switch is the initial connection or is a subsequent connection for determining the character of signal effected by the said signal apparatus.

97. In a telephone system, an operator's switching cord and terminating connecting plug, a called line, a first and a second supervisory signal device permanently companioned to said cord, a manual switch on the called line operated for closing a circuit path including a talking conductor of the called line, means responsive to connecting said plug to said called line for causing said first signal device to display, means thereafter responsive to the said operation of the switch for effacing said display, and means responsive to restoring said switch from its operated position for causing the second said signal device to display whereby the operator will know by the display of either of said signal devices that the said switch is in non-operated position and that the display of the said second signal device will specifically index that the switch has been operated and restored after the said plug was connected and thereafter maintained connected with the called line.

98. In a telephone system, an operator's switching cord and terminating connecting plug, a called line, a trunk line, a first and a second supervisory signal device permanently companioned to said cord, a manual switch on the called line operated for closing a circuit path including a talking conductor of the called line, means responsive to connecting said plug to said called line for causing said first signal device to display and for connecting said trunk line to the switching cord, means thereafter responsive to the said operation of said switch for effacing said display, and means responsive to restoring said switch from its operated position for causing the second said signal device to display whereby the operator will know by the display of either of said signal devices that the said switch is in non-operated position and that the display of the said second signal device will specifically index that the switch has been operated and restored after the said plug was connected and thereafter maintained connected with the called line.

99. In a telephone system, a trunk line extending from a near to a far exchange, a first called line in the far exchange, a second called line in the near exchange, a calling line in the near exchange, switch mechanism at each said exchanges, a calling device on the calling line for sending impulses for directively selectively operating the said mechanisms, automatic means controlled over the calling line for effecting connection from the calling line to the trunk line at the near exchange, means responsive to the calling device for directively operating said mechanism in the far exchange to complete a connection from the calling line over the trunk line to the said first called line, and automatic means for at will directively selectively operating said switch mechanism in the near exchange responsive to the calling device in lieu of said switch mechanism in the far exchange.

100. In a telephone system, a trunk line extending from a near to a far exchange, a first called line in the far exchange, a second called line in the near exchange, a calling line in the near exchange, switch mechanism at each said exchanges, a calling device on the calling line for sending impulses for directively selectively operating the said mechanisms, automatic means controlled over the calling line for effecting connection from the calling line to the trunk line at the near exchange, means responsive to the calling device for directively operating said mechanism in the far exchange to complete a connection from the calling line over the trunk line to the said first called line, and automatic means responsive to completing the connection to said first called line for disabling the switch mechanism in the far exchange for responding to said calling device and for thereupon rendering the switch mechanism in the near exchange responsive to the calling device to effect a connection from the near exchange end of the trunk line to the said second called line.

101. In a telephone system, a trunk line extending from a near to a far exchange, a first called line in the far exchange, a second called line in the near exchange, a calling line in the near exchange, switch mechanism at each said exchanges, a calling device on the calling line for sending impulses for directively selectively operating the said mechanisms, automatic means controlled over the calling line for effecting connection from the calling line to the trunk line at the near exchange, means responsive to the calling device for directively operating said mechanism in the far exchange to complete a connection from the calling line over the trunk line to the said first called line, automatic means responsive to completing the connection to said first called line for disabling the switch mechanism in the far exchange for responding to said calling device and for thereupon rendering the switch mechanism in the near exchange responsive to the calling device to effect a connection from the near exchange end of the trunk line to the said second called line whereby the calling line and said called lines will form branches of a Y connection wherein the trunk line is a link of the branch to the said first called line, and automatic means involved in the said switch mechanism in the near exchange controlled over one said line branch in the near exchange for substituting another line in the near exchange for its alternate said line in the near exchange.

102. In a telephone system, a trunk line extending from a near to a far exchange, a first called line in the far exchange, a second called line in the near exchange, a calling line in the near exchange, switch mechanism at each said exchanges, a calling device on the calling line for sending impulses for directively selectively operating the said mechanisms, automatic means controlled over the calling line for effecting connection from the calling line to the trunk line at the near exchange, means responsive to the calling device for directively operating said mechanism in the far exchange to complete a connection from the calling line over the trunk line to the said first called line, automatic means responsive to completing the connection to said first called line for disabling the switch mechanism in the far exchange for responding to said calling device and for thereupon rendering the switch mechanism in the near exchange responsive to the calling device to effect a connection from the near exchange end of the trunk line to the said second called line whereby the calling line and said called lines will form branches of a Y connection wherein the trunk line is a link of the branch to the said first called line, another called line in the near exchange, automatic means for disconnecting the respective said branches in the near exchange controlled over the branch disconnected while the other branches remain connected, and automatic means involving said switch mechanism in the near exchange controlled over the said remaining connected branch in the near exchange for operating last said mechanism to substitute another called line in the near exchange for the disconnected line of the said Y connection.

103. In a telephone system, a trunk line, an automatic switch terminating the trunk line, movable terminals of the switch, sets of fixed terminals of the switch cooperative with the movable terminals, an operator's switching plug-ending cord corresponding to a set of said fixed terminals, a plurality of other lines each terminating in a jack cooperative with the plug of said cord, and means for causing the switch to operate its movable terminals to hunt for and seize the fixed terminals corresponding to the said cord responsive to cooperating said plug with a random one of said jacks to complete a connection from the trunk line to the line corresponding to the random jack.

104. In a telephone system, a trunk line, an automatic switch terminating the trunk line, movable terminals of the switch, sets of fixed terminals of the switch cooperative with the movable terminals, an operator's switching plug-ending cord corresponding to a set of said fixed terminals, a plurality of other lines each terminating in a jack cooperative with the plug of said cord, and means for causing the switch to operate its movable terminals to hunt for and seize the fixed terminals corresponding to the said cord responsive to cooperating said plug with a random one of said jacks to complete a connection from the trunk line to the line corresponding to the random jack regardless of the position of said movable terminals with respect to a cooperating set of said fixed terminals when the said plug is cooperated with a said jack.

105. In a telephone system, a trunk line, an automatic switch terminating the trunk line, movable terminals of the switch, a set of fixed terminals of the switch cooperative with the movable terminals, an operator's switching plug-ending cord corresponding to the set of said fixed terminals, a line terminating in a jack cooperative with the plug of said cord, and means for causing the switch to operate its movable terminals to seize the fixed terminals responsive to cooperating said plug with said jack to complete a connection from the trunk line to the line corresponding to the jack wherein the said cord is a link of the connection.

106. In a telephone system, a trunk line, automatic switch mechanism at the opposite ends of the trunk line, a line accessible to the said mechanisms respectively, automatic means for operating the switch mechanism at the far end of the trunk line over the trunk line from the near end thereof to connect to its corresponding said line, and means responsive to a specific operation of last said switch mechanism for automatically operating the switch mechanism at the near end of the trunk line to connect to its corresponding said line.

107. In a telephone system, an operator's switching cord and terminating connecting plug, a called line, an automatic switch, a source of current to which a condenser is transparent, means responsive to connecting the said cord to said called line for causing the said switch to select said cord and apply said source of current from the switch through said cord to the called line, and automatic means controlled over the called line for at will disconnecting the said current without disconnecting the said switch from the said cord.

108. In a telephone system, a calling line, a called line, a trunk line, an automatic step by step selective switch at the near end of the trunk line, lines selectively accessible from the selective switch, an automatic selective switch at the far end of the trunk line, means for connecting the calling line to the trunk line, means directively controlled over the trunk line for operating second said automatic switch to select and connect with the called line, and automatic means operated over the trunk line responsive only to second said automatic switch connecting with the called line for causing first said automatic switch to step by step selectively operate regardless of control over the called line.

109. In a telephone system, a trunk line, a switch on the near end of the trunk line, a calling line, means for connecting the calling line to the trunk line, and means automatically operated over the trunk line from its far end for causing the switch to operate to seize the calling line.

110. In a telephone system, a trunk line, a switch on the near end of the trunk line, a calling line, means for connecting the calling line to the trunk line, and means automatically operated over the trunk line from its far end for causing the switch to operate to seize the calling line to effect an alternative connection between the calling line and the trunk line whereby the switch will become a tandem link in the connection between the calling line and the trunk line.

111. In a telephone system, a line, a call meter device on the line, means for applying current to the meter device for operating the meter device to register a call, a timing device, and means involving the timing device for rendering the meter device incapable of registering a call responsive to current application until an application of said current has endured a predetermined length of time as determined by the characteristic of the time device.

112. In a telephone system, two called lines, a pair of impulse controlled selective switches having a common talking path, a trunk line comprising leading-in talking conductors for said common path, a relay common to said switches, automatic means controlled over said trunk line for operating said relay for in turn operating a first one of said switches and then the other of said switches at will to connect said common talking path with the two said called lines to form a Y talking connection of the trunk line and the two said called lines, and automatic means for at will directively restoring either or both said operated switches from the respective connected called line without deenergizing the relay regardless of control over the connected called line.

113. In a telephone system, two called lines, a trunk line, a pair of switches terminating the far end of the trunk line, means for initiating a call on the trunk line, means for thereafter at will operating first one and then the other of said switches to effect a Y connection of the trunk line and called lines, means for restoring said switches by abandoning the said call, and automatic means for restoring either said switch from its connected called line at will without abandoning the call.

114. In a telephone system, a calling line, a called line, automatic switch mechanism, means controlled over the calling line for operating the switch mechanism to extend a connection from the calling line to the called line, and means controlled over the called line at will be a manual operation for restoring the operated switch mechanism regardless of the condition maintained on the calling line.

115. In a telephone system, automatic switches, a called line, a calling line, means for initiating a call on the calling line, means controlled over the calling line for linking a plurality of said switches to establish a connection from the calling line to the called line, and means controlled over the called line at will by a manual operation for destroying the connection linked by each said switch regardless of maintaining the call on the called line initiated.

116. In a telephone system, a trunk line, an operator's line, means for seizing the trunk line, means operated responsive to seizing the trunk line for connecting the operator's line to the trunk line, subscribers' lines, a link circuit for connecting with any one of said subscribers' lines, means operated responsive to connecting said link circuit to one of the subscriber's lines to connect the link circuit with the trunk line, and means automatically responsive to effecting said connection to the subscriber's line for automatically ringing on the latter said line.

117. In a telephone system, a trunk line, an operator's line, means for seizing the trunk line, means operated responsive to seizing the trunk line for connecting the operator's line to the trunk line, subscribers' lines, a link circuit for connecting with any one of said subscribers' lines, means operated responsive to connecting said link circuit to one of the subscriber's lines to connect the link circuit with the trunk line, means automatically responsive to effecting said connection to the subscriber's line for automatically ringing on the latter said line, automatic means manually controlled over a talking conductor of the connected subscriber's line for terminating the said ringing, and means responsive to transferring the said link from first said subscriber's line to another said subscriber's line to initiate ringing on the latter said subscriber's line.

118. In a telephone system comprising a trunk line terminating at one end in a jack, a link circuit having a plug adapted for connection with the jack of said trunk line, an automatic switch in which the other end of said trunk line terminates, a second link circuit terminating at one end in said switch and at the other end in a plug, subscribers' lines having jacks for the connection with the plug of the link circuit, an operator's telephone equipment, means including a switch for connecting automatically the operator's telephone equipment with the trunk line having been seized by said first mentioned link circuit, and means associated with said second link circuit for operating said first mentioned switch to connect this link circuit with said seized trunk line when the said link circuit has seized a subscriber's line.

119. A telephone system comprising trunk lines, an operator's telephone set, means for seizing any one of said trunks, means operative when a trunk is seized to connect the operator's telephone set thereto, subscribers' lines, a link circuit for connecting with any one of said subscribers' lines, means operative responsive to the seizure of said trunk line and said subscriber's line to connect the link circuit with the trunk line, and means associated with the link circuit operative when the subscriber's line is seized to indicate to the operator that the subscriber's line is not otherwise engaged.

120. A telephone system comprising trunk lines, an operator's telephone set, means for seizing any one of said trunks, means operative when a trunk is seized to connect the operator's telephone set thereto, subscribers' lines, a link circuit for connecting with any one of said subscribers' lines, means operative when the trunk line and a subscriber's line are seized to connect the link circuit with the trunk line, and a visual signal in said link circuit operated when a subscriber's line is seized to indicate that the subscriber's line is not otherwise engaged.

121. A telephone system comprising trunk lines, an operator's telephone set, means for seizing any one of said trunks, means operative when a trunk is seized to connect the operator's telephone set thereto, subscribers' lines, a link circuit for connecting with any one of said subscribers' lines, means operative when the trunk line and a subscriber's line are seized to connect the link circuit with the trunk line, and a visual signal in said link circuit operated when a subscriber's line is seized and before the trunk line is connected to the link circuit.

122. A telephone system comprising trunk lines, an operator's telephone set, means for seizing any one of said trunks, means operative when a trunk is seized to connect the operator's telephone set thereto, subscribers' lines, a link circuit for connecting with any one of said subscribers' lines, means operative responsive to the connection of said link circuit to one of said subscribers' lines to connect the link circuit with said trunk circuit, and means responsive thereto for automatically ringing the seized subscriber's line.

123. A telephone system comprising trunk lines, an operator's telephone set, means for seizing any one of said trunks, means operative when a trunk is seized to connect the operator's telephone set thereto, subscribers' lines, a link circuit for connecting with any one of said subscribers' lines, means operative responsive to the connection of said link circuit to one of said subscribers' circuits to connect the link circuit with said trunk circuit, and means responsive thereto for automatically ringing over said seized subscriber's line, and for automatically reringing over a second subscriber's line if the link circuit is transferred thereto from the first subscriber's line.

124. A telephone system comprising trunk lines, an operator's telephone set, means for seizing any one of said trunks, means operative when a trunk is seized to connect the operator's set thereto, subscribers' lines, a link circuit for connecting with any one of said subscribers' lines, means operative when the trunk line and a subscriber's line are seized to connect the link circuit with the trunk line, means for disconnecting the link circuit from the trunk line when it is no longer seized, and signaling means operative to give a distinctive signal indication when the link circuit is no longer connected to the trunk line and another distinctive signal when the subscriber on the connected subscriber's line hangs up his receiver.

125. In a telephone system, a trunk line, a called line, an operator's link circuit for effecting connection to terminals of the called line, a connective switch mechanism, and automatic means operated responsive to effecting said connection for causing the connective switch mechanism to operate to link the operator's link circuit with the trunk line to thereby complete a connection from the trunk line to said terminals of the called line, via the connective switch mechanism and the operator's link circuit as tandem links of the connection.

126. In a telephone system, a trunk line, a called line, an operator's link circuit for effecting connection to terminals of the called line, a selective switch mechanism, and automatic means operated responsive to effecting said connection for causing the selective switch mechanism to operate to link the operator's link circuit with the trunk line to thereby complete a connection from the trunk line to said terminals of the called line, via the selective switch mechanism and the operator's link circuit as tandem links of the connection.

127. In a telephone system, a trunk line, a called line, an operator's link circuit for effecting connection to terminals of the called line, a selective switch mechanism, and automatic means operated responsive to effecting said connection for causing the selective switch mechanism to operate in a hunting operation to link the operator's link circuit with the trunk line to thereby complete a connection from the trunk line to said terminals of the called line, via the selective switch mechanism and the operator's link circuit as tandem links of the connection.

128. In a telephone system, a trunk line, a called line, an operator's link circuit for effecting connection to terminals of the called line, a selective switch mechanism, automatic means operated responsive to effecting said connection for causing the selective switch mechanism to operate to link the operator's link circuit with the trunk line to thereby complete a connection from the trunk line to said terminals of the called line, via the selective switch mechanism and the operator's link circuit as tandem links of the connection, other automatic means operated responsive to effecting said connection to the terminals of the called line by the operator's link circuit, for projecting signaling current to the called line via its said terminals, and automatic means operated responsive to control over the called line for disconnecting the signaling current.

129. In a telephone system, a trunk line, a called line, an operator's link circuit for effecting connection to terminals of the called line, a selective switch mechanism, automatic means operated responsive to effecting said connection for causing the selective switch mechanism to operate to link the operator's link circuit with the trunk line to thereby complete a connection from the trunk line to said terminals of the called line, via the selective switch mechanism and the operator's link circuit as tandem links of the connection, means automatically operated responsive to the selective switch mechanism completing its operation for projecting signaling current to the called line via its said terminals, and automatic means operated responsive to control over the called line for disconnecting the signaling current.

130. In a telephone system, a trunk line, a called line, an operator's link circuit for effecting connection to terminals of the called line, a selective switch mechanism, automatic means operated responsive to effecting said connection for causing the selective switch mechanism to operate to link the operator's link circuit with the trunk line to thereby complete a connection from the trunk line to said terminals of the called line, via the selective switch mechanism and the operator's link circuit as tandem links of the connection, means automatically operated responsive to the selective switch mechanism completing its operation for projecting signaling current to the called line via its said terminals, automatic means operated responsive to control over the called line for disconnecting the signaling current, and automatic means operated responsive to thereafter breaking down the connection effected by the operator's link circuit to said terminals, and then reestablishing such connection to called line terminals for again applying signaling current to the line to which connection is last made, subject to being disconnected in the manner as before.

131. In a telephone system, a trunk line, an operator's link circuit, a selective switch mechanism, and automatic means operated over a conductor specific to and individual to the operator's link circuit for causing the selective switch mechanism to operate and thereby link a connection by the selective switch mechanism between the talking conductors of the operator's link circuit and the talking conductors of the trunk line.

In witness whereof, I hereunto subscribe my name this 24th day of January, A. D. 1922.

HERBERT M. FRIENDLY.